United States Patent
Tsivin

(10) Patent No.: US 10,587,916 B2
(45) Date of Patent: Mar. 10, 2020

(54) ANALYSIS OF TELEVISION VIEWERSHIP DATA FOR CREATING ELECTRONIC CONTENT SCHEDULES

(71) Applicant: AMC Network Entertainment LLC, New York, NY (US)

(72) Inventor: Vitaly Tsivin, New York, NY (US)

(73) Assignee: AMC Network Entertainment LLC, New York, NY (US)

( * ) Notice: Subject to any disclaimer, the term of this patent is extended or adjusted under 35 U.S.C. 154(b) by 0 days.

(21) Appl. No.: 16/151,016

(22) Filed: Oct. 3, 2018

(65) Prior Publication Data
US 2019/0104339 A1 Apr. 4, 2019

Related U.S. Application Data

(60) Provisional application No. 62/567,960, filed on Oct. 4, 2017.

(51) Int. Cl.
*H04N 21/262* (2011.01)
*H04N 21/442* (2011.01)
(Continued)

(52) U.S. Cl.
CPC .......... *H04N 21/442* (2013.01); *G06F 17/18* (2013.01); *G06Q 10/06393* (2013.01);
(Continued)

(58) Field of Classification Search
CPC .......... H04N 21/442; H04N 21/26241; H04N 21/812; H04N 21/26283; G06Q 30/0202;
(Continued)

(56) References Cited

U.S. PATENT DOCUMENTS

| 5,659,350 A | 8/1997 | Hendricks et al. |
| 6,286,005 B1 | 9/2001 | Cannon |
(Continued)

FOREIGN PATENT DOCUMENTS

| CN | 103425755 | 12/2013 |
| WO | 2016/076863 A1 | 5/2016 |

OTHER PUBLICATIONS

Faultline. (Jan. 16, 2017) "Nielsen, eat your heart out: TiVo woos admen with prediction engine—Bringing more audience data to TV advertising," located at https://www.theregister.co.uk/2017/01/16/tivo_prediction_engine/ (6 pages).
(Continued)

*Primary Examiner* — Junior O Mendoza
(74) *Attorney, Agent, or Firm* — Morrison & Foerster LLP

(57) ABSTRACT

System and method embodiments are described that enable generation of an electronic content schedule. In a method embodiment, one or more data files including TV viewing data and descriptive data of a plurality of individuals are received. Target audience criteria, target TV content, and criteria for key performance indicators (KPIs) are received. KPIs for a target segment are tracked. Spot watching probabilities for each individual in the target segment are calculated. A plurality of spot packages is generated based on the target TV content. For each spot package, a probabilistic segment is generated based on the spot watching probabilities and a plurality of KPIs are calculated. Scores corresponding to the spot packages are generated based on the plurality of KPIs and based on tracked KPIs of the target segment. The content schedule is generated by selecting a spot package selected from the plurality of spot packages based on the scores.

18 Claims, 42 Drawing Sheets

(51) Int. Cl.
*G06F 17/18* (2006.01)
*G06Q 10/06* (2012.01)
*H04N 21/81* (2011.01)
*G06Q 30/02* (2012.01)

(52) U.S. Cl.
CPC ..... *G06Q 30/0202* (2013.01); *G06Q 30/0242* (2013.01); *H04N 21/26241* (2013.01); *H04N 21/26283* (2013.01); *H04N 21/812* (2013.01)

(58) Field of Classification Search
CPC .......... G06Q 30/0242; G06Q 10/06393; G06F 17/18
See application file for complete search history.

(56) References Cited

U.S. PATENT DOCUMENTS

| | | |
|---|---|---|
| 8,060,398 B2 | 11/2011 | Canning et al. |
| 8,676,597 B2 | 3/2014 | Buehler et al. |
| 8,731,966 B2 | 5/2014 | Breitenstein et al. |
| 8,909,771 B2 | 12/2014 | Heath |
| 9,213,733 B2 | 12/2015 | Sanchez et al. |
| 9,245,279 B2 | 1/2016 | Hsiao et al. |
| 9,357,023 B2 | 5/2016 | Glommen et al. |
| 9,392,310 B2 | 7/2016 | Volovich et al. |
| 9,396,483 B2 | 7/2016 | Hamedi |
| 9,432,714 B2 | 8/2016 | Kitts et al. |
| 9,521,960 B2 | 12/2016 | Lee et al. |
| 9,641,882 B2 | 5/2017 | Kitts et al. |
| 2003/0220860 A1 | 11/2003 | Heytens et al. |
| 2007/0027756 A1 | 2/2007 | Collins et al. |
| 2007/0168254 A1* | 7/2007 | Steelberg ........... G06Q 30/0264 705/14.61 |
| 2008/0319829 A1 | 12/2008 | Hunt et al. |
| 2009/0006156 A1 | 1/2009 | Hunt et al. |
| 2009/0030780 A1 | 1/2009 | York et al. |
| 2013/0205339 A1* | 8/2013 | Haberman ........... H04N 21/812 725/35 |
| 2014/0058826 A1 | 2/2014 | Ogawa |
| 2015/0189351 A1* | 7/2015 | Kitts .................. G06Q 30/0242 725/19 |
| 2016/0037197 A1* | 2/2016 | Kitts ................ H04N 21/25883 725/35 |
| 2016/0117718 A1* | 4/2016 | Hood ................. G06Q 30/0247 725/14 |
| 2016/0117719 A1 | 4/2016 | Hood et al. |
| 2016/0117720 A1 | 4/2016 | Hood et al. |
| 2016/0189174 A1 | 6/2016 | Heath |
| 2016/0196564 A1 | 7/2016 | Dadia et al. |
| 2016/0364770 A1 | 12/2016 | Denton et al. |
| 2016/0379243 A1 | 12/2016 | Kalish et al. |
| 2017/0034594 A1 | 2/2017 | Francis et al. |
| 2017/0064395 A1 | 3/2017 | Chaar et al. |
| 2017/0094337 A1 | 3/2017 | Fu et al. |
| 2017/0116549 A1 | 4/2017 | Sunshine et al. |

OTHER PUBLICATIONS

Montagnuolo et al. "The RaiNewsbook: Browsing Worldwide Multimodal News Stories by Facts, Entities and Dates," WWW 2012 Companion, Apr. 16-20, 2012, Lyon, France; pp. 389-392.
International Search Report and Written Opinion dated Jan. 18, 2019, directed to International Application No. PCT/US2018/054207; 15 pages.

* cited by examiner

ANALYSIS OF TELEVISION VIEWERSHIP DATA FOR CREATING ELECTRONIC CONTENT SCHEDULES

CROSS-REFERENCE TO RELATED APPLICATIONS

This application claims the benefit of U.S. Provisional Application No. 62/567,960, filed on Oct. 4, 2017, which is herein incorporated by reference and for all purposes.

FIELD

The present disclosure relates generally to analyzing television (TV) viewership data.

BACKGROUND

Television (TV) has been and remains an important medium for providing a large population of people with content related to entertainment, education, news, politics, and advertising. Companies recognize the reach and influence of TV and purchase one or more spots on TV programs to broadcast their advertising content to specific TV viewers. The characteristics of TV viewers differ across TV programs, times of day, among a host of other factors. Therefore, an important goal of a company is to identify the spots that allow the company to reach the right type of person, with specific characteristics, who may be interested in the message provided by the company.

To help companies better reach their target audience, research firms such as Nielsen measure what some TV viewers are watching and track the preferences and behaviors of these TV viewers. These research firms then generate large data files of TV viewership data that may enable a planner at a company to generate an electronic content schedule. However, there are currently no graphical tools that enable the planner to intuitively and rapidly process the large amounts of TV viewership data to generate the electronic content schedule.

SUMMARY

In some embodiments, a method implemented on a processor to generate an electronic content schedule, comprises: receiving one or more data files comprising television (TV) viewing data for a first plurality of individuals and descriptive data for the first plurality of individuals, the descriptive data comprising demographic and behavioral data for each individual; receiving, from a user, target audience criteria, target TV content, and criteria for key performance indicators (KPIs); tracking KPIs for a target segment including a second plurality of individuals selected from the first plurality of individuals based on matching the target audience criteria to the descriptive data; calculating spot watching probabilities for each individual in the target segment; generating a plurality of spot packages based on the target TV content; for each spot package in the plurality of spot packages: generating a probabilistic segment by statistically selecting a third plurality of individuals from the target segment based on the spot watching probabilities, and calculating a plurality of KPIs for the probabilistic segment; generating a plurality of scores corresponding to the plurality of spot packages based on the plurality of KPIs calculated for each spot package and based on the tracked KPIs for the target segment; generating a content schedule that includes a spot package selected from the plurality of spot packages based on the plurality of scores; and outputting the electronic content schedule to a display.

In some embodiments, the KPIs comprise a frequency distribution, a reach, gross impressions, a cost per thousand impressions (CPM), or a combination thereof.

In some embodiments, the spot package from the plurality of spot packages comprises a predefined number of spots in a plurality of spots, and wherein creating the probabilistic segment for the spot package comprises: generating a plurality of simulated segments, wherein each simulated segment is generated by: randomly selecting the predefined number of spots from the plurality of spots, and statistically selecting a fourth plurality of individuals from the target segment based on the spot watching probabilities; generating statistics for the plurality of simulated segments; and creating the probabilistic segment by selecting the third plurality of individuals to correspond to the statistics.

In some embodiments, the TV viewing data comprises minute-by-minute viewing behavior or second-by-second viewing behavior of each individual from the first plurality of individuals.

In some embodiments, the criteria for KPIs comprise weights corresponding to the KPIs, and wherein a weighted decision matrix is used to generate a score for the spot package.

In some embodiments, calculating the plurality of KPIs for each spot package comprises: calculating the plurality of KPIs based on one or more spot packages currently selected for the content schedule.

System and non-transitory computer readable medium embodiments are similarly disclosed.

Further embodiments, features, and advantages, as well as the structure and operation of the various embodiments, are described in detail below with reference to accompanying drawings.

DESCRIPTION OF THE FIGURES

FIGS. 7A-D are example diagrams that illustrates how a GUI configures a target audience segment, according to some embodiments.

FIGS. 11A-D are example diagrams that illustrates how a GUI enables a user to configure a plan for an advertisement campaign, according to some embodiments.

FIGS. 14B-H are example diagrams that illustrates how a GUI configures a plurality of charts for graphically displaying performance differences between two plans for an advertisement campaign, according to some embodiments.

DETAILED DESCRIPTION

Figure 1:
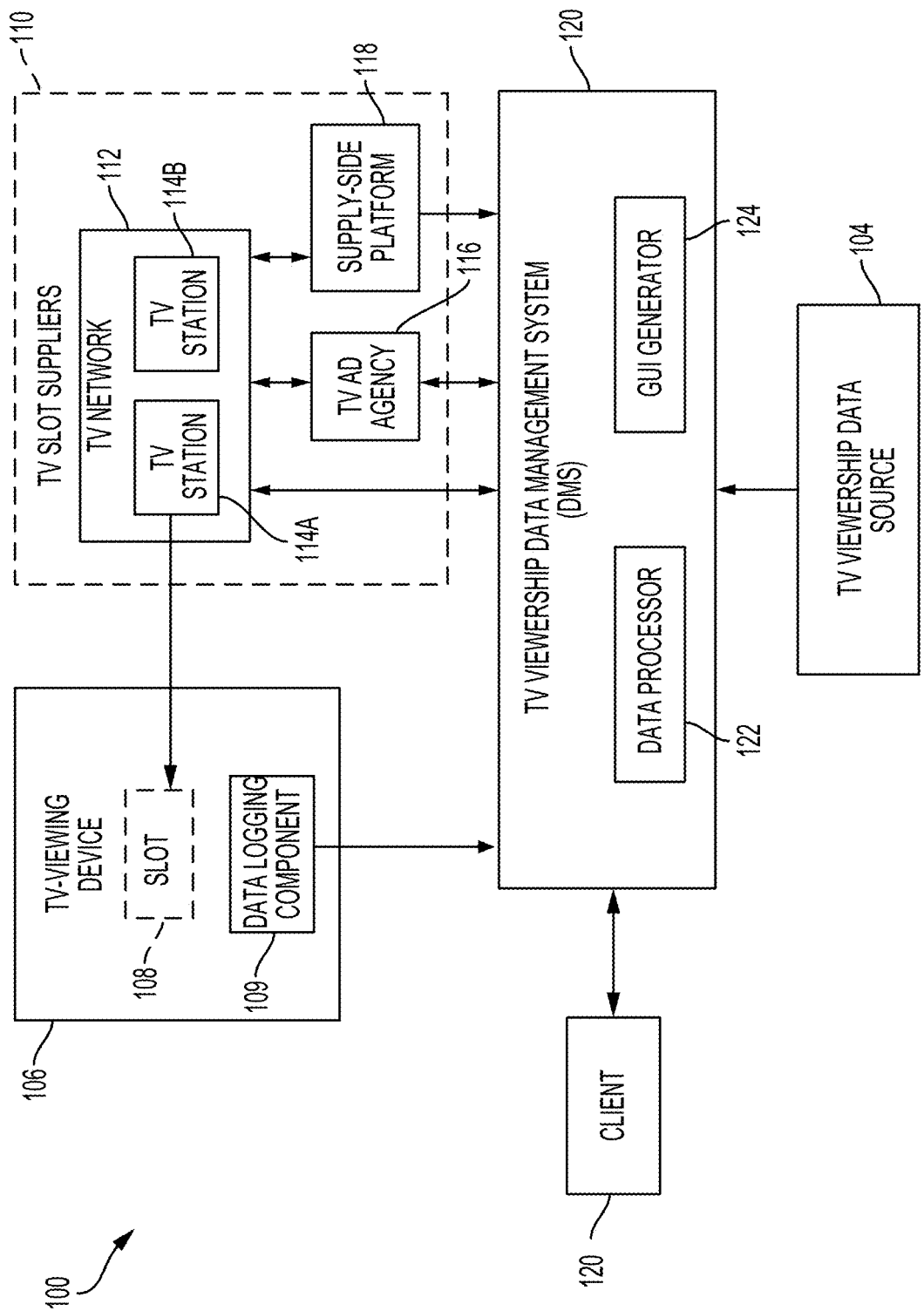
FIG. 1 is a diagram of a system for graphically displaying television (TV) viewership data, according to some embodiments.

For ease of referring to various components and features within the present disclosure, the following definitions are provided.

A Spot—refers to a single broadcast of an ad.

A Spot Package—refers to a plurality of spots.

A Pod—refers to a plurality of spots that are sequentially aired. Sometimes a pod may be referred to as an advertising pod, a commercial interruption, or a commercial break.

Ad Placement—refers to placing an ad in one or more spots.

Ad Campaign—refers to a plurality of ad placements.

Media Cost—refers to a price for the ad placement. Generally, the media cost excludes a cost for creating the advertisement. In some embodiments, media cost may be quantified by points, impressions, clicks, leads, actions, days, weeks, months, etc.

A TV viewer—refers to a person, household, or any group of persons that watch the same programming, e.g., ad.

Media Market—refers to a set of TV viewers that could potentially be exposed to the ad. For example, in a Nielsen dataset, the media market is described using Designated Market Areas (DMAs).

Population—refers to a total number of TV viewers in the media market.

Rating—refers to a percentage of the media market that may likely be exposed to the ad. In some embodiments, the rating can be estimated based on past performance sourced from one or more surveys.

Average Persons—refers to a number of people that, on average, may be exposed to each spot. For example, the average persons can be calculated by multiplying population by rating then dividing by 100.

Gross Rating Point (GRP)—refers to a measure of a size of the ad campaign by a specific medium or schedule. For example, the GRP may be calculated by multiplying the number of Spots by Rating.

Cost per Point (CPP)—refers to a measure of cost efficiency for the ad campaign and calculated by dividing the media cost by the GRPs. CCP may enable cost comparisons between two or more ads.

Impressions—refer to a total number of exposures/views to the ad. One person can receive multiple exposures over time. If one person was exposed to an ad five times, this would count as five impressions. Impressions may be calculated by multiplying the number of spots by average persons.

Cost per Thousand Impressions (CPM)—refers to a measure of cost efficiency for the ad campaign and calculated by diving media cost by impressions and then dividing by 1,000.

Reach—refers to a number of people in the media market that will likely be exposed to one spot. As described above, an ad may be seen multiple times by one person resulting in many impressions for that person. However, with respect to calculating reach, that person would only be counted once. In some embodiments, reach can be expressed as a percentage, which indicates the percentage of the population that is exposed to at least one spot.

Frequency—refers to an average number of times an ad will be presented to the reached population. In some embodiments, the frequency can be calculated by dividing the number of impressions by the reach. In some embodiments, the frequency can be calculated by dividing GRPs by the reach percentage.

Key Performance Indicators (KPIs)—refers to a plurality of metrics to evaluate an effectiveness of an ad campaign. In some embodiments, as described herein, the KPIs may include a sales number, a number of social media hits, GRPs, CPP, impressions, CPM, reach, frequency, or a combination thereof.

Embodiments described herein provide a graphical user interface (GUI) that enables a user to more easily visualize large TV viewership data according to selected parameters.

FIG. 1 is a diagram of a system 100 for graphically displaying television (TV) viewership data, according to some embodiments. System 100 includes a data management system (DMS) 120 (including data processor 122 and GUI generator 124) that interacts with client 102, TV viewership data source 104, and one or more TV slot suppliers 110. Client 102 includes network-enabled devices operated by a user to access a GUI generated and provided by DMS 120 for graphically displaying TV viewership data. For example, client 102 may include without limitation laptops, desktop computers, smartphones, tablets, or other mobile devices. In some embodiments, client 102 implements a browser for accessing the GUI provided by DMS 120.

In some embodiments, TV slot suppliers 110 include: TV network 112 (including one or more TV stations 114A and 114B), TV ad agency 116, or supply side platform (SSP) 118. TV ad agency 116 can be a media or TV agency that interfaces with TV network 112 or one or more TV stations 114A-B to provide slots. In some embodiments, TV network 112 can be systems that broadcast TV programming content to TV viewers on TV-viewing device 106. In particular, TV network 112, often referred to as cable television network or cable network, offers TV programming on one or more TV networks. Broadcasting TV programming content may include broadcast via cable, satellite, terrestrial, or internet protocol (IP). As shown in system 100, TV network 112 may include one or more TV stations 114A-B. In some embodiments, TV stations 114A-B can be entities that select a specific content, e.g., an ad, to place in, for example, slot 108 of TV programming run on TV-viewing device 106. In some embodiments, SSP 118 can be programmatic buying platforms that automate the process of matching slot 108 buyers with TV stations 114A-B providing slot 108. In some embodiments, SSP 118 interfaces with demand side platforms (DSPs) that present metrics associated with a TV program (e.g., audience data, engagement metrics, or purchase data etc.) to buyers of slot 108, such as advertisers or ad campaign planners.

In some embodiments, TV-viewing device 106 includes any device capable of receiving broadcasted signals, e.g., TV programming content, from TV slot suppliers 110 for displaying to TV viewers. For example, TV-viewing device 106 may include a TV set, a set-top box, and the like. As shown in system 100, TV-viewing device 106 may receive slot 108 having content, e.g., an advertisement, selected by TV station 114A. In some embodiments, TV-viewing device 106 includes data logging component 109 that monitors how a TV viewer uses TV-viewing device 106. For example, data logging component 109 may monitor a TV network selected by the TV viewer, a time spent watching the selected channel, one or more timestamps associated with the selected TV network, etc. Then, data logging component 109 may transmit the monitored TV viewer information to DMS 120 or a third-party that aggregates TV viewership data, such as TV viewership data source 104.

In some embodiments, TV viewership data source 104 can be entities that aggregates information related to TV viewers of each TV station, TV network, or a combination thereof. In some embodiments, TV viewership data source 104 monitors a statistically representative sample of households over a period of time to aggregate TV viewership data. In some embodiments, TV viewership data source 104 aggregates the TV viewership data based on information logged by data logging component 109 of TV-viewing device 106. TV viewership data source 104 may include third-party suppliers of TV viewership data such as Nielsen, Rentrak, comScore, FourthWall Media, or Allent.

In general, TV viewership data source 104 periodically generates large data files of TV viewership data including, for example, TV viewers' behaviors, characteristics, or a combination thereof. For example, TV viewer's behaviors may include a TV network being watched by a TV viewer in every predetermined period of time, (e.g., 10 seconds, 1 minute, five minutes, 15 minutes, etc.). In some embodiments, TV viewers' characteristics include demographics information, living habits, or a combination thereof. For example, demographics information may include without limitation ethnicity, age, gender, education level, geography, etc. For example, living habits may include without limitation cell phone usage amounts, movie-going frequency, car usage, fast food preferences, etc.

As described above, DMS 120 includes data processor 122 and GUI generator 124. In some embodiments, each of data processor 122 and GUI generator 124 can be components implemented by one or more processors within one or more servers. Further, the one or more servers may be co-located, located at different locations, or provided by cloud computing and storage solutions. In some embodiments, DMS 120 generates electronic content schedules based on criteria set by client 102.

In some embodiments, data processor 122 receives TV viewership data from TV viewership data 104 and ad slot information from TV slot suppliers 110. For example, ad slot information may include sales for a slot associated with a TV program on a specific TV network. The slot may be associated with a length of time, a specific placement within the TV program, a time of day, etc. In some embodiments, data processor 122 sorts the data received from TV viewership data source 104 and TV slot suppliers 110 for fast data visualization. Further, data processor 122 may filter the received data based on one or more selections or interactions provided by client 102, as will be further described herein.

In some embodiments, data processor 122 generates an electronic content schedule based on analyzing TV viewership data provided by TV viewership data source 104, a plurality of spot packages received from TV slot suppliers 110, and various criteria received from client 102. As will be further described below, the various criteria may include target audience criteria, criteria for KPIs, a schedule period, or a combination thereof. In some embodiments, data processor 122 selectively processes the TV viewership data and the plurality of spot packages, as will be further described with respect to FIGS. 16-20. In some embodiments, upon generating the electronic content schedule, data processor 122 can enable the user of client 102 to interactively and graphically view the electronic content schedule via GUI generator 124.

In some embodiments, GUI generator 124 provides a GUI to client 102 for graphically displaying TV viewership data or the electronic content schedule processed by data processor 122. In some embodiments, the provided GUI implements many useful features that allow a user of client 102 to visually and interactively analyze portions of the TV viewership data that are of interest to the user. In some embodiments, the GUI can allow the user to interactively and graphically compare a plurality of electronic content schedules to aid in selecting the best electronic content schedule. FIGS. 2-14 show example operations performed by the GUI provided by GUI generator 124.

Figure 2A:
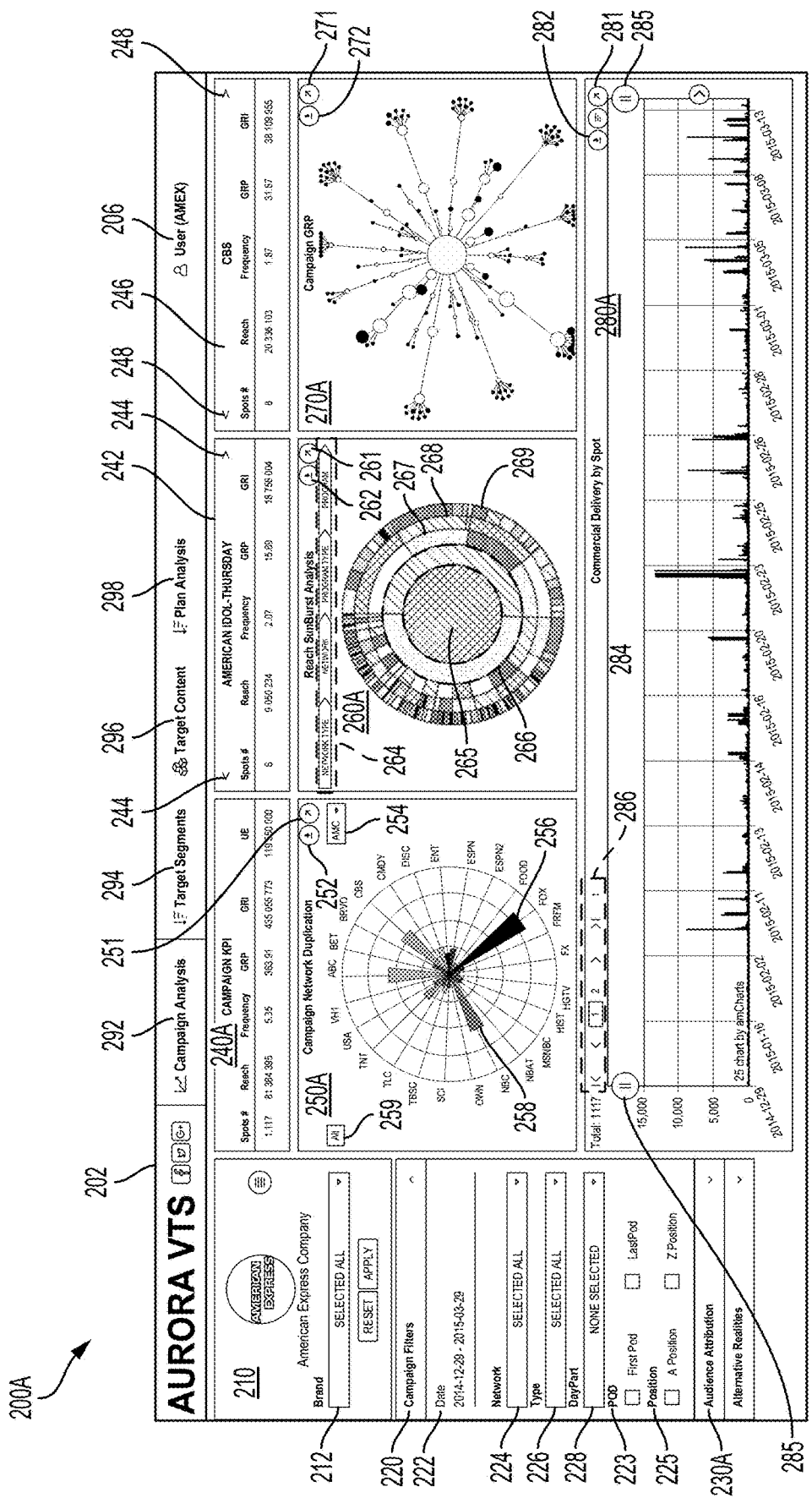
FIGS. 2A-B are example diagrams that illustrates how a graphical user interface (GUI) displays TV viewership data with respect to a plurality of key performance indicators (KPIs), according to some embodiments.
Figure 2B:
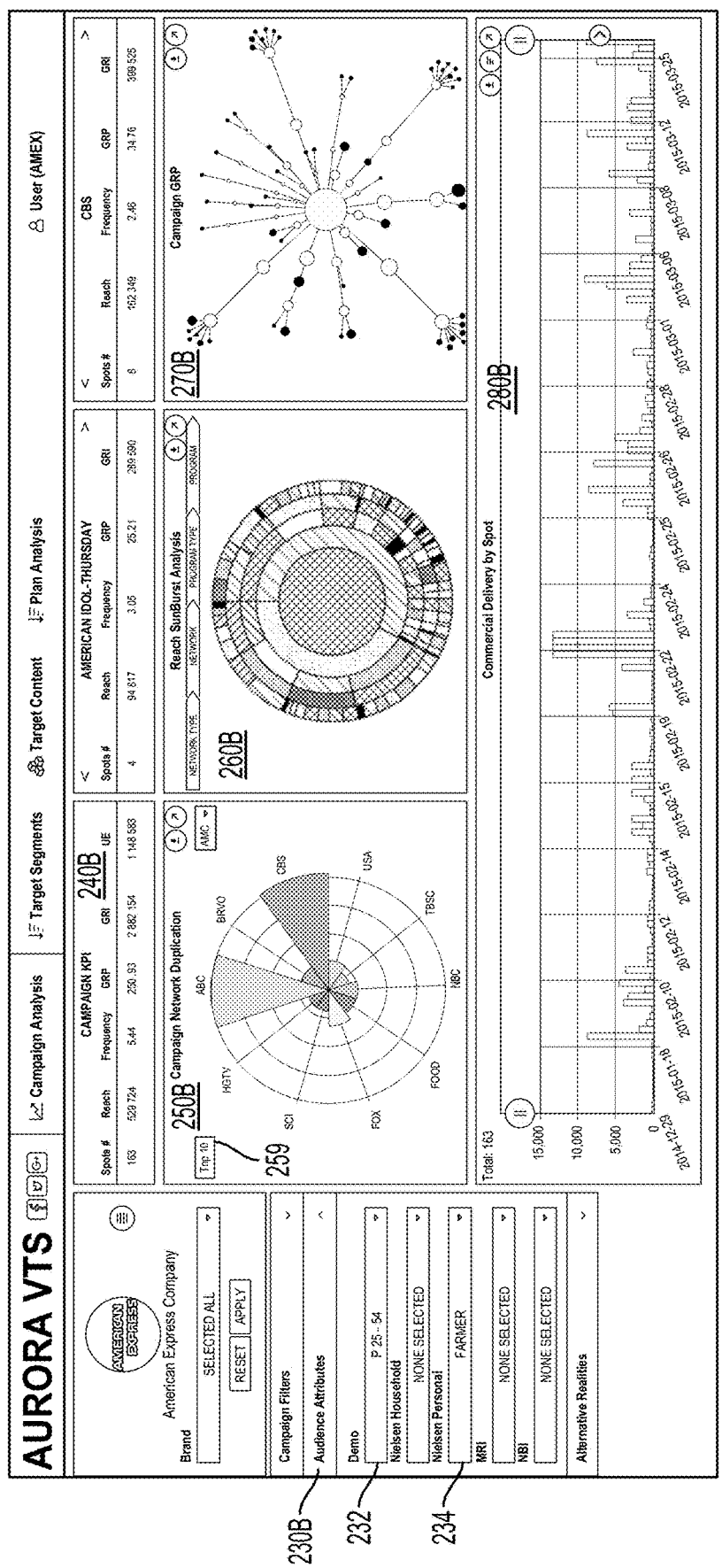

In some embodiments, the GUI enables the user to graphically view the TV viewership data with respect to a plurality of key performance indicators (KPIs) based on one or more content attributes, one or more audience attributes, or a combination thereof selected by the user. FIGS. 2A-B are example diagrams 200A-B that illustrate how the GUI displays TV viewership data with respect to a plurality of KPIs. FIG. 2A shows a diagram 200A that that includes a menu 202 that includes tabs: campaign analysis 292, target segments 294, target content 296, and plan analysis 298. In some embodiments, as discussed above, the GUI may present diagram 200A to a user operating client 102 via a browser. The user may be prompted with a login name and a password. Name 206 in menu 202 identifies the user.

Diagram 200A, as generated by the GUI, displays a plurality of parameters that are selectable by the user to filter the TV viewership data. In some embodiments, the plurality of parameters includes content attributes 210, campaign attributes 220, and audience attributes 230A.

In some embodiments, content attributes 210 indicate the entity associated with the user, e.g., American Express Company and a selectable brand 212. Upon receiving the user's selection of brand 212, the GUI presents the user with a plurality of advertisements associated with the entity from which the user can select one or more advertisements. In some embodiments, the plurality of advertisements includes advertisements that are detected by data processor 122 from the TV viewership data provided by TV viewership data source 104. In effect, the GUI graphically shows the TV viewership data for the one or more advertisements selected by the user.

In some embodiments, campaign attributes 220 may include date ranges 220, network type 224, daypart 228, pod selections 223, and position selections 225. Selecting date ranges 220 may prompt the user to input a custom date range or select one or more years, one or more quarters, one or more months, one or more weeks, or a combination thereof. Selecting network 224 may prompt the user to select one or more TV networks from cable networks or broadcast networks. Selecting daypart 228 may prompt the user to select one or more of the following TV programming designations: daytime, fringe, late night, prime, and weekend. Pod selections 223 may enable the user to select the first pod and/or the last pod. Position selections 225 may enable the user to select the first position (i.e., A position) and/or the last position (i.e., Z position) within a pod. In some embodiments, upon receiving one or more selections of campaign attributes 220 by the user, data processor 122 filters the TV viewership data to be displayed by the GUI. For example, as shown in diagram 200A, the user has selected the first quarter of 2015 in date range 222.

In some embodiments, upon receiving the user's selection of content attributes 210, campaign attributes 220, audience attributes 230A (as will be further described with respect to FIG. 2B), or a combination thereof, GUI 206 generates a plurality of charts (including channel duplication chart 250A, reach chart 260A, GRP chart 270A, and spot-impressions chart 280A) for graphically displaying a plurality of KPIs. Further, as shown in diagram 200A, the GUI displays a statistics table 240A summarizing the KPIs for the TV viewership data filtered according to the user's selections. In some embodiments, table 240A include KPIs such as a number of spots, a reach, a frequency, a GRP, a number of impressions (i.e., gross impressions), or a population (i.e., universe estimate). Further, as shone in diagram 200A, the GUI may display tables 244 and 246 showing statistics similar to that of table 240A but for each TV program (e.g., American Idol-Thursday) and TV network (e.g., CBS), respectively. Table 244 includes arrow icons 244 that allow the user to cycle through the statistics computed for other TV programs. Similarly, table 246 includes arrow icons 248 that allow the user to cycle through the statistics computed for other TV networks.

Figure 3A:
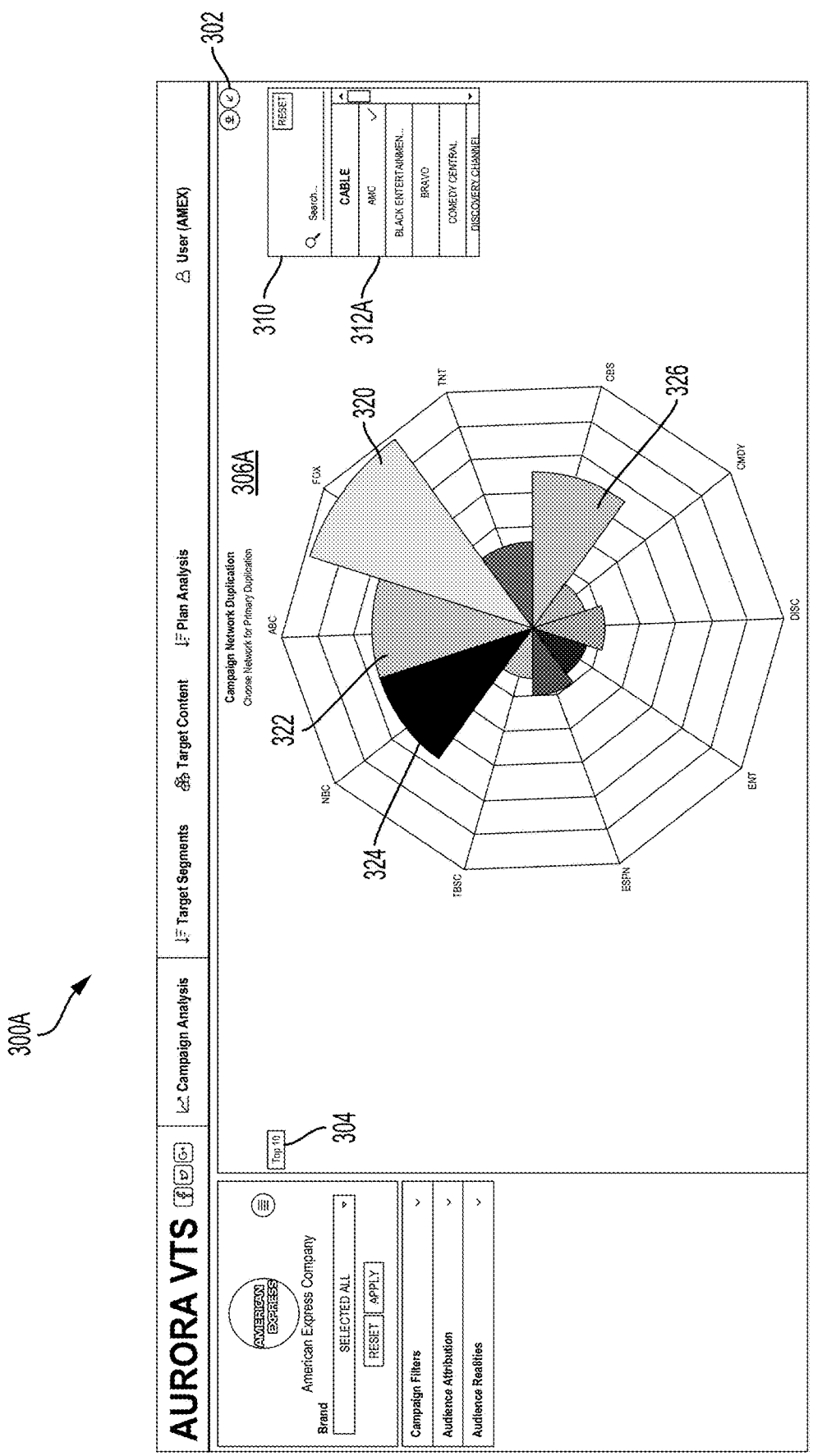
FIGS. 3A-B are example diagrams that illustrates how a GUI configures a polar area diagram for graphically displaying duplication across a plurality of TV networks, according to some embodiments.
Figure 3B:
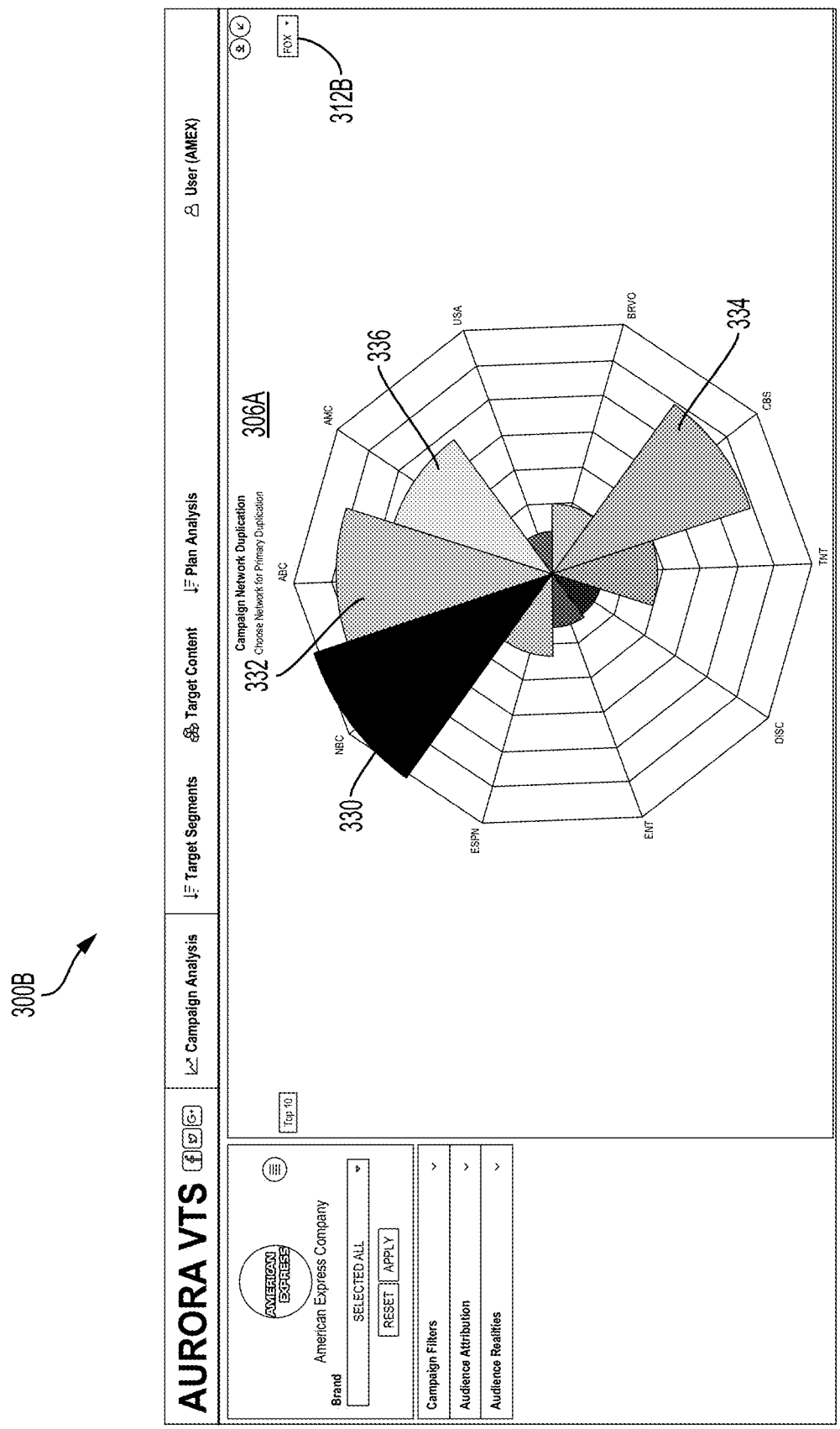

In some embodiments, duplication chart 250A, as generated by the GUI, includes a polar area diagram (or a Coxcomb chart) for graphically displaying the duplication of impressions across a plurality of TV networks with respect to a selected TV network 254, as will be further described with respect to FIGS. 3A-B. For example, as depicted in duplication chart 250A, sector 256 shows that 33% of the impressions counted for the selected TV network 254, AMC, are also counted for the FOX TV network. Also, sector 258 shows that 23% of the impressions counted for the selected TV network 254 are also counted for the NBC TV network. In some embodiments, as depicted in diagram 200A, the GUI implements a channels toggle button 259 that upon user's selection causes the GUI to display duplication data for selected TV network 254 for a predetermined number of TV networks (e.g., 5, 10, 15, etc.). For example, the GUI may show duplication data across 10 TV networks as opposed to the 25 TV networks currently shown in duplication chart 250A of diagram 200A.

In some embodiments, duplication chart 250A includes a download button 252 that upon a user's selection causes the GUI to prompt the user to select a file format (e.g., excel, pdf, html, etc.) for downloading the duplication data. Then, the GUI may download the duplication data in a table format according to the selected file format. In some embodiments, to increase readability of the displayed duplication data, duplication chart 250A includes an expand/collapse button 252 that upon a user's selection causes the GUI to collapse the other charts (e.g., reach chart 260A, GRP chart 270A, and impressions chart 280A) and enlarge duplication chart 250A.

Figure 4A:
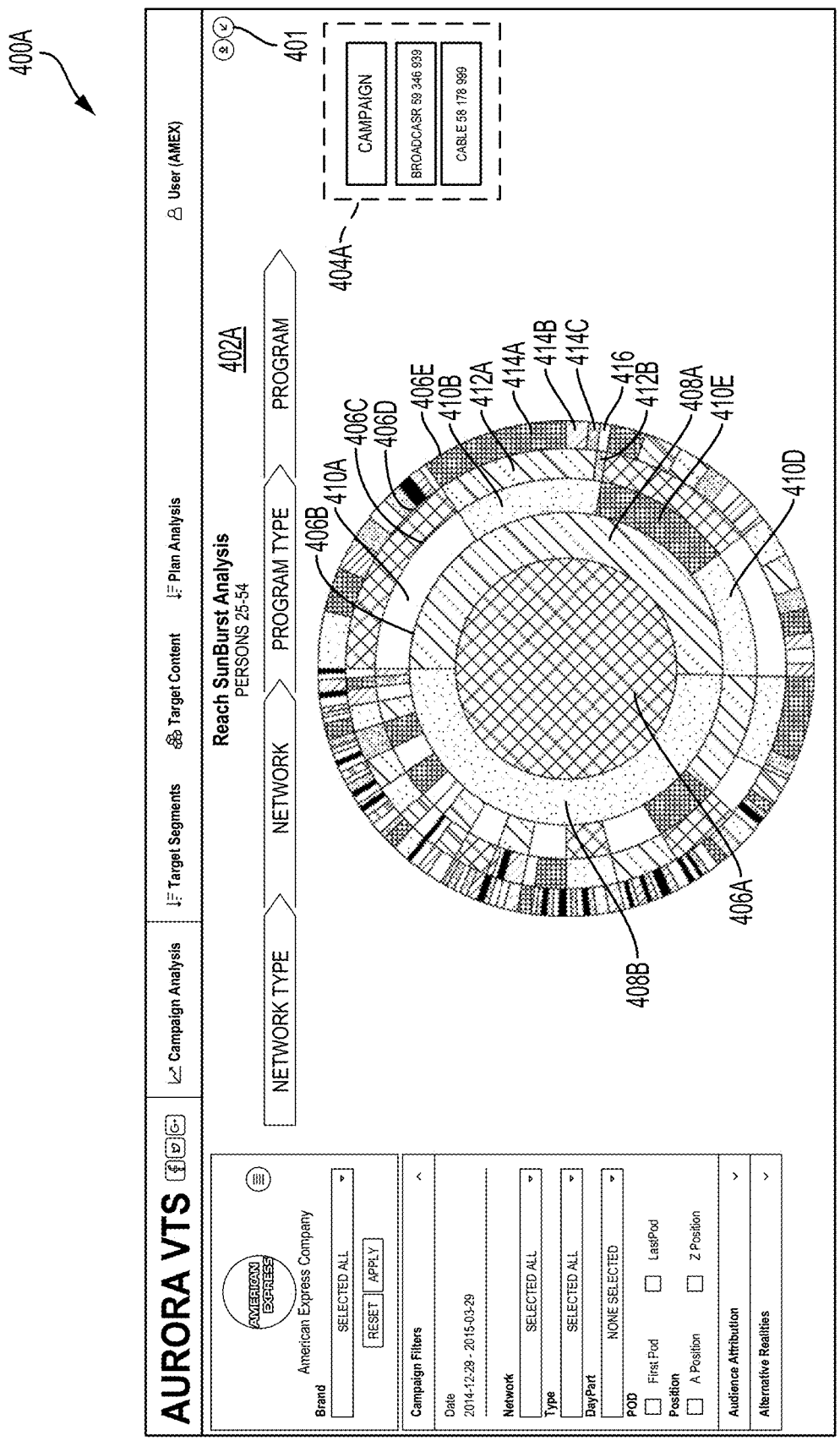
FIGS. 4A-C are example diagrams that illustrates how a GUI configures a multilevel pie chart for graphically displaying a reach across groupings of TV programs at various granularities, according to some embodiments.
Figure 4B:
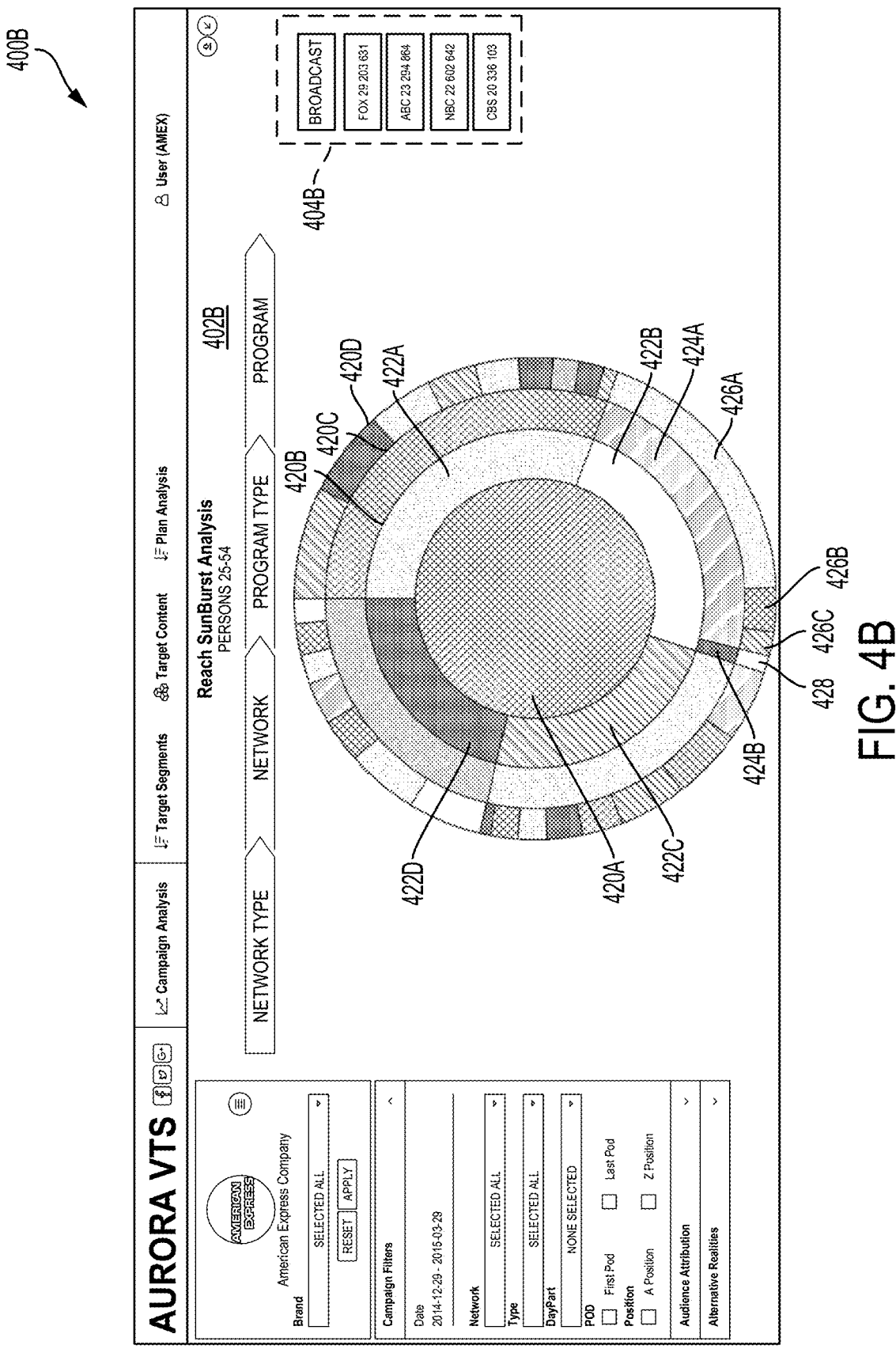
Figure 4C:
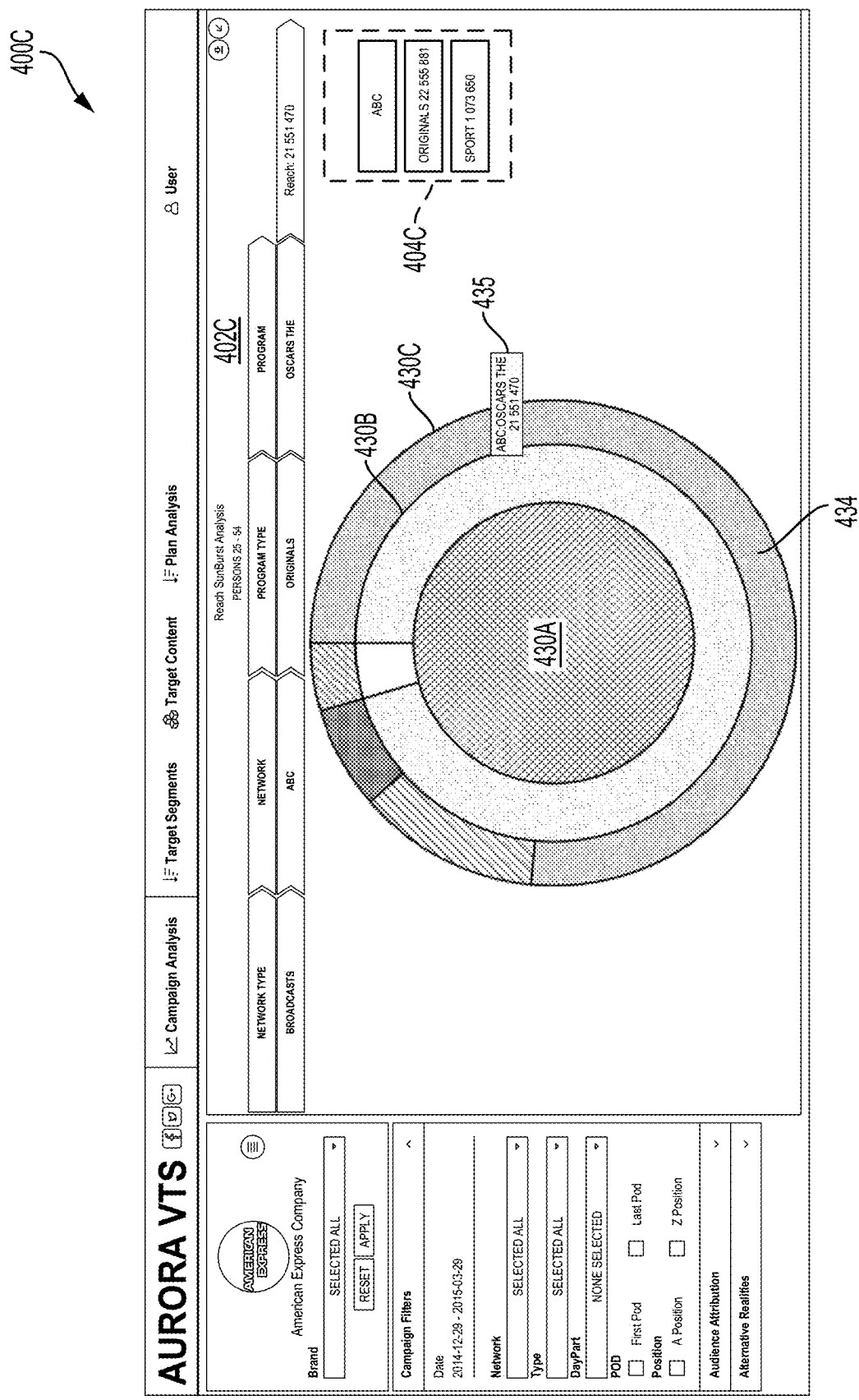
Figure 5A:
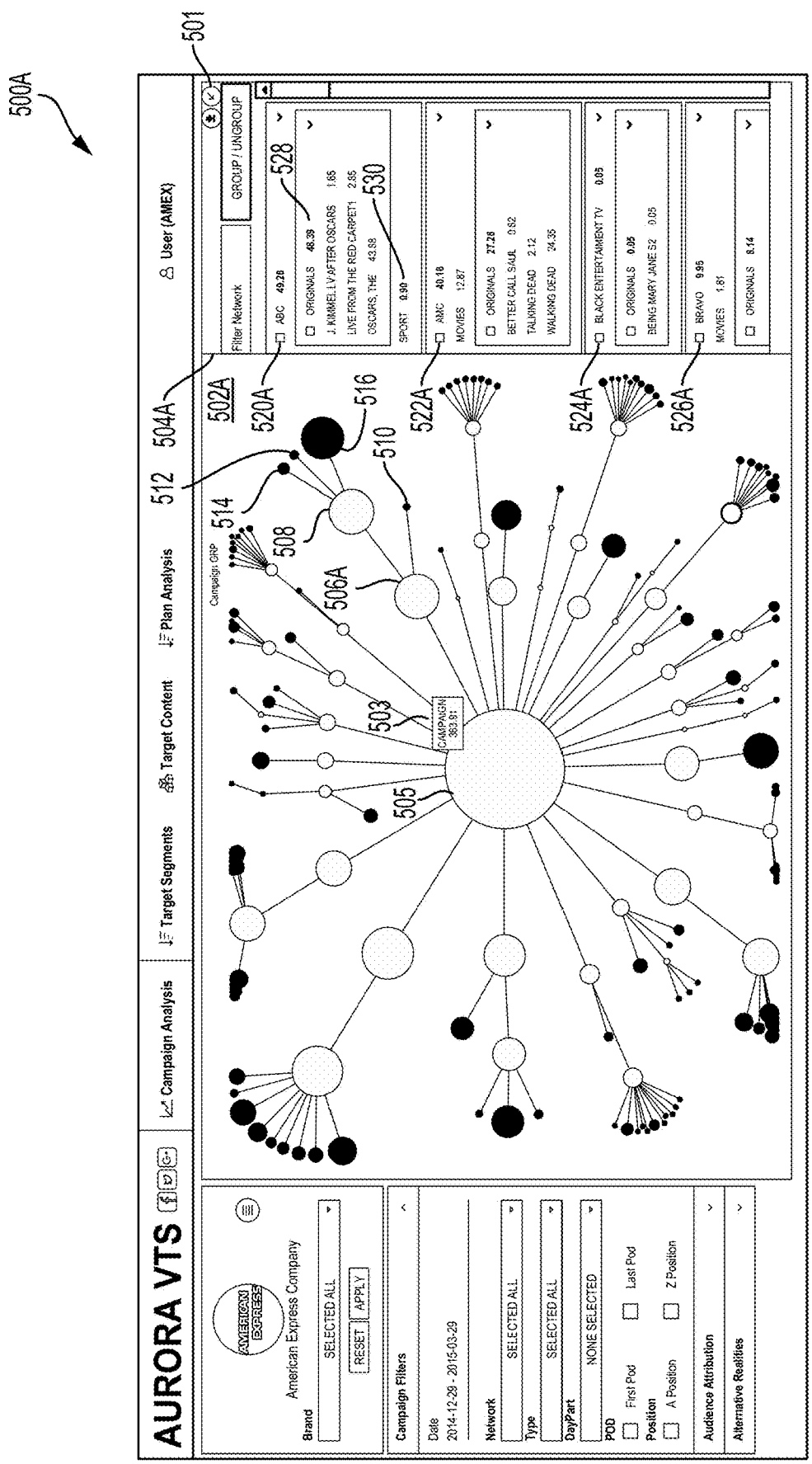
FIGS. 5A-D are example diagrams that illustrates how a GUI configures a radial tree diagram for graphically displaying gross rating points (GRPs) across groupings of TV programs at various granularities, according to some embodiments.
Figure 5B:
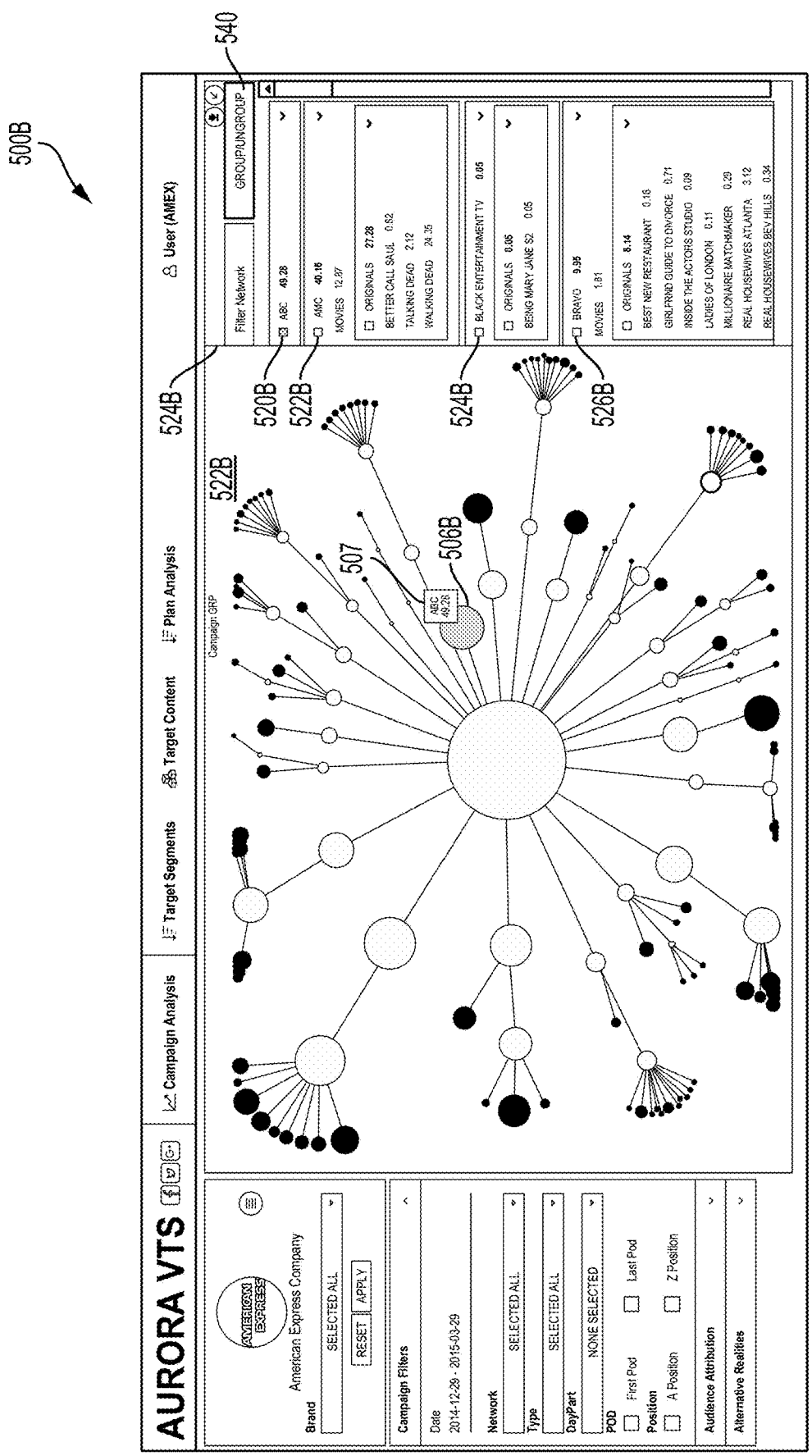
Figure 5C:
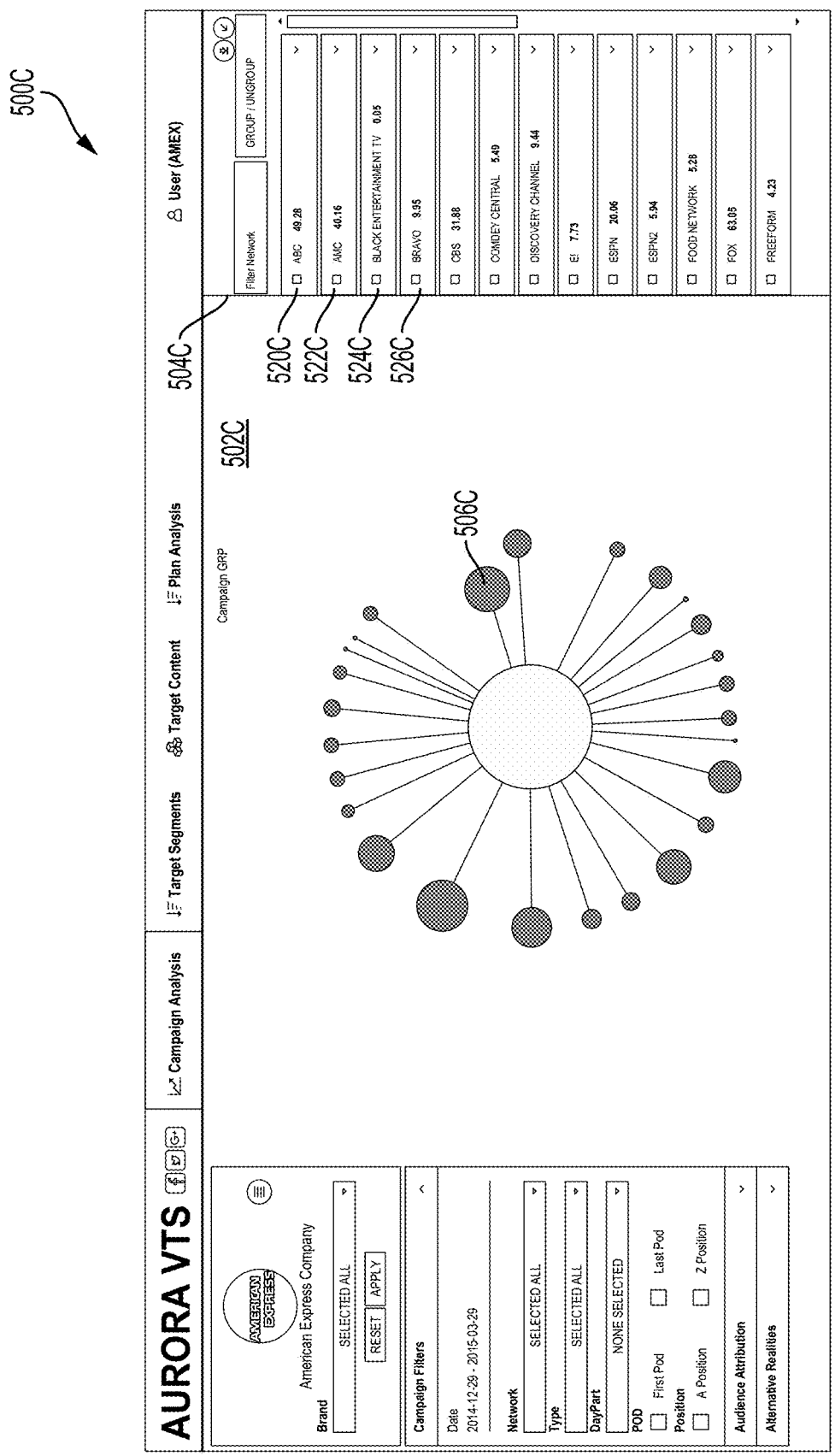
Figure 5D:
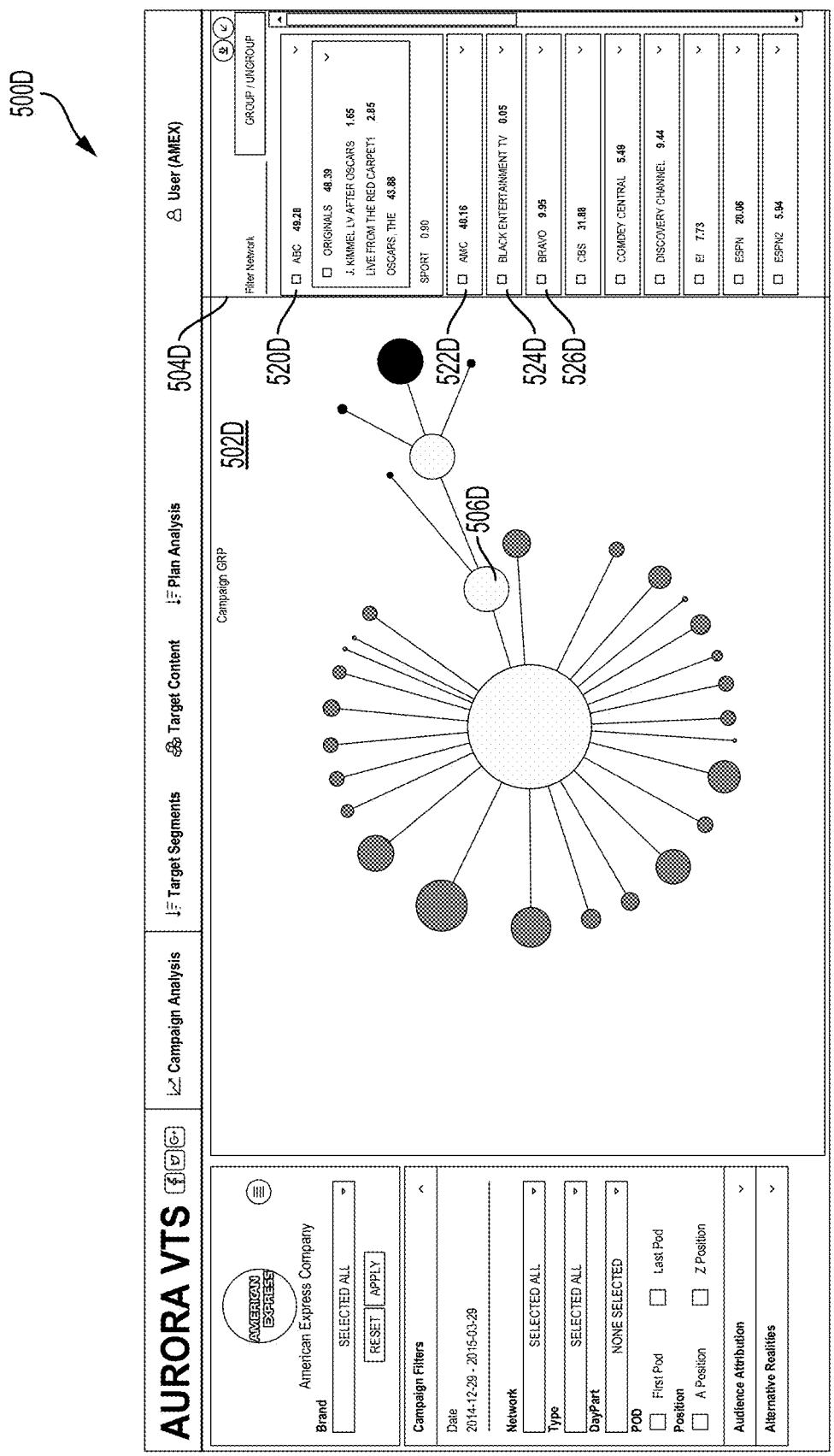

In some embodiments, reach chart 260A, as generated by the GUI, includes a multilevel pie chart (or ring chart or sunburst chart) for graphically displaying a reach across groupings of TV programs at various granularities where each concentric circle in the multilevel pie chart represents a level of granularity, as will be further described with respect to FIGS. 4A-C. The GUI displays levels of granularity 264 where the specific TV programs are the highest level of granularity, followed by a program type, a TV network, and a network type (e.g., cable or broadcast). In some embodiments, a segment of an inner circle has a hierarchical relationship to those segments of the outer circles which lie within an angular sweep of the parent segment. For example, center circle 265 represents a total reach across all TV networks, first circle 266 includes a number of segments representing reach across a number of network types, second circle 267 includes a number of segments representing reach across a number of TV networks for each network type, third circle 268 includes a number of segments representing reach across a number of program types for each network, and fourth circle 269 includes a number of segments representing reach across a number of TV programs for each program type. In some embodiments, reach chart 260A includes download button 262 and expand/collapse button 261 that operate similar to download button 252 and expand/collapse button 252, respectively.

In some embodiments, GRP chart 270A, as generated by the GUI, includes a radial tree diagram for graphically displaying GRP across groupings of TV programs at various granularities where a size of a node quantifies the GRP for a specific grouping of TV programs, as will be further described with respect to FIGS. 5A-D. In some embodiments, GRP chart 270A includes download button 272 and expand/collapse button 271 that operate similar to download button 252 and expand/collapse button 252, respectively.

Figure 6A:
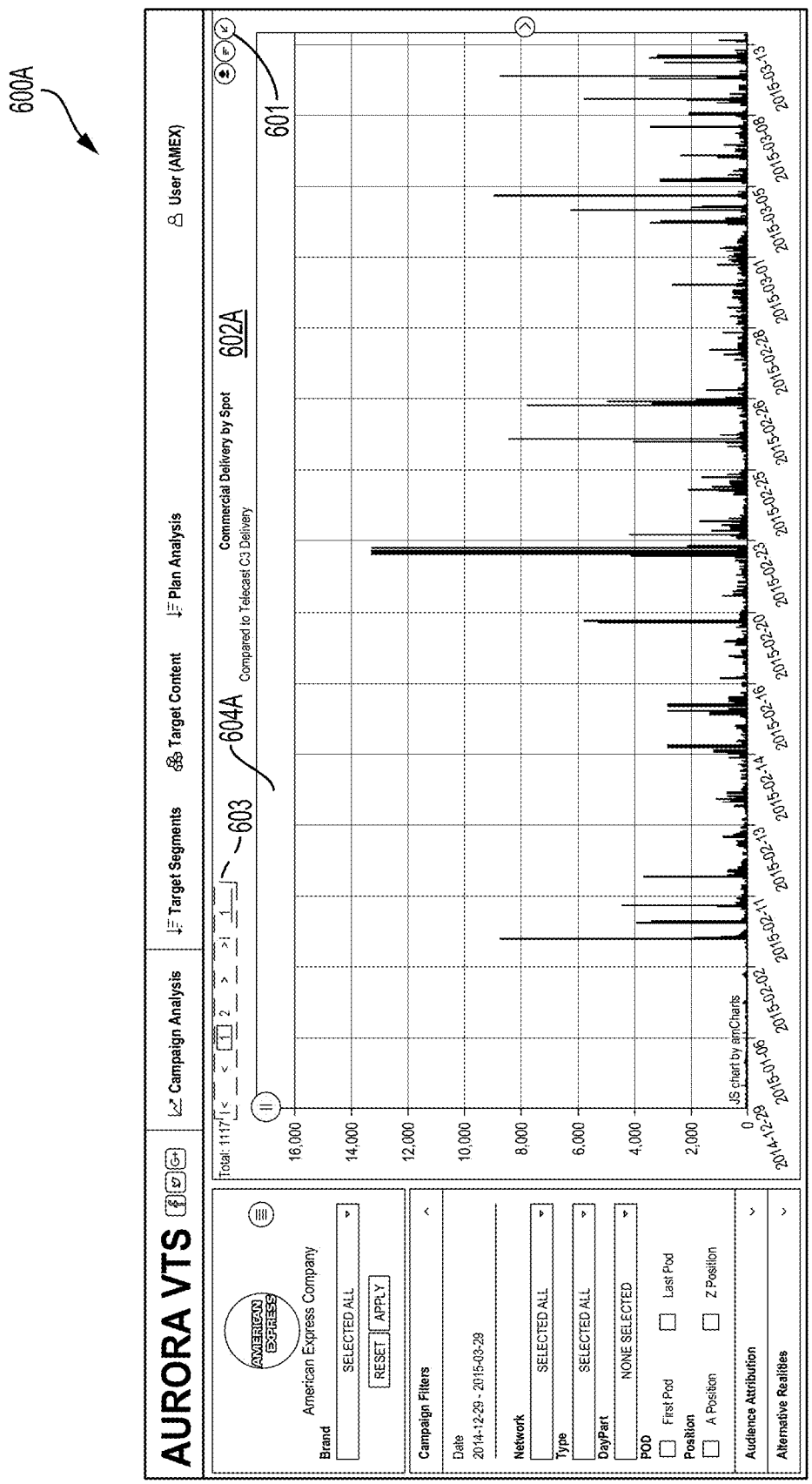
FIGS. 6A-B are example diagrams that illustrates how a GUI configures a bar chart for graphically displaying impressions for a plurality of spots, according to some embodiments.
Figure 6B:
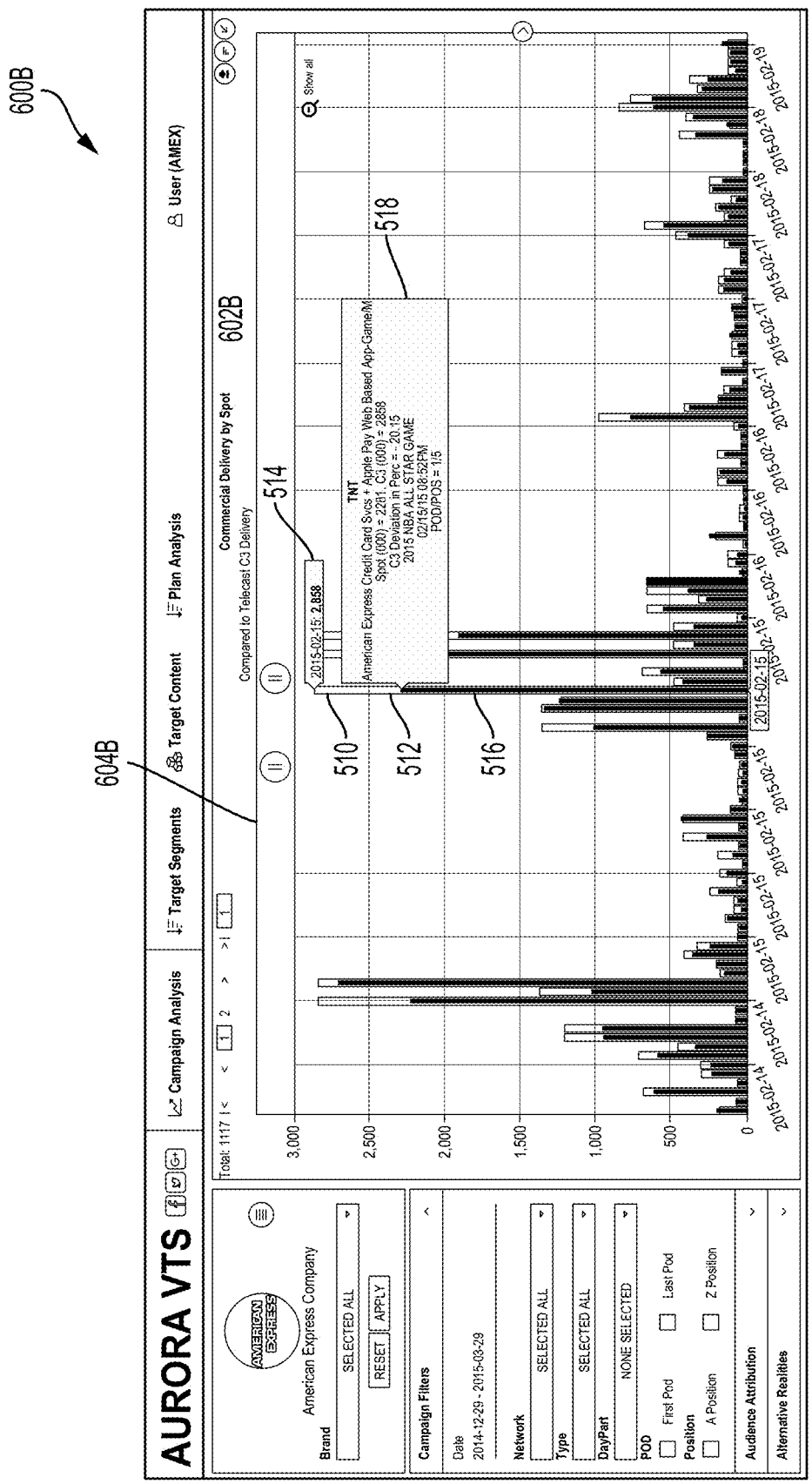

In some embodiments, impressions chart 280A, as generated by the GUI, includes a bar chart for graphically displaying impressions data for a plurality of spots over date range 222 selected by the user, as will be further described with respect to FIGS. 6A-B. For example, impressions data may include without limitation an expected number of impressions and an actual number of actual impressions. In some embodiments, each bar in the bar chart represents a spot when a specific advertisement aired on a specific day on a specific TV program in a specific position of a specific pod. The height of a bar may represent a number of expected impressions or actual impressions for the spot. Accordingly, the x-axis of impressions chart 280A represents spots ordered according to a date that the spot aired. The y-axis of impressions chart 280A represents a number of impressions in the thousands. Impressions chart 280A may include options 286 for selecting a portion of the chart for graphically displaying. Further, impressions chart 280A may include a bar 284 having adjustable left and right icons 285 for selecting a more granular date range on the x-axis. In some embodiments, impressions chart 280A includes download button 282 and expand/collapse button 281 that operate similar to download button 252 and expand/collapse button 252, respectively.

In some embodiments, as described above, the GUI dynamically generates a plurality of charts based on a user's selection of content attributes 210, campaign attributes 220, audience attributes 230A, or a combination thereof. For example, upon receiving a user's selection of audience attributes 230A, the GUI may present the user with a plurality of selectable attributes of the TV viewers of interest to the user. Then, the GUI may re-generate the plurality of charts based on one or more selected audience attributes 230A. This is shown in diagram 200B of FIG. 2B that illustrates how the GUI displays TV viewership data with respect to a plurality of KPIs, according to some embodiments. In some embodiments, as shown in diagram 200B, the GUI displays audience attributes 230B upon receiving the user's selection of audience attributes 230A from FIG. 2A. Audience attributes 230B includes TV viewers' characteristics such as demographics information, living habits, or a combination thereof. For example, demographics information may include without limitation an age range, an education level, a geographic location, an income range, a spoken language, an occupation, an ethnicity, a gender, or a time zone.

Living habits may include without limitation ownership information or usage/preference information. For example, ownership information may relate to owning video games, wired cable, or a telephone. For example, usage/preference information may relate to a usage amounts of public transportation, consumption of baby goods, consumption of alcoholic beverages, consumption of sodas, usage amounts or frequency of cell phones, candy consumption, a number of doctor appointments in a predetermined time period, eating habits, types of insurances, movie-going frequency, tobacco usage, travel patterns, etc.

As shown in diagram 200B, the user may have selected an age range of 25 to 44 years 232 and an occupation of farmer 234 for audience attributes 230B. Upon receiving the user's selection of one or more attributes, the GUI generates an updated summary table 240B along with updated versions of the following charts: duplication chart 250B, reach chart 260B, GRP chart 270B, and impressions chart 280B. Note that, comparing summary tables 240A and 240B shows that the gross impressions for the filtered TV viewership audience has been reduced from 455 million to about 3 million impressions. Additionally, as shown in duplication chart 250B, channels toggle button 259 from diagram 200A has been toggled and is depicted as "Top 10" TV networks in diagram 200B. In contrast to the broader TV viewership audience where duplication with respect to selected TV network 254 (i.e., AMC) is highest for FOX and NBC TV networks, duplication chart 250B shows that duplication for farmers between 25 and 54 years old is highest for ABC and CBS TV networks.

FIGS. 3A-B are example diagrams 300A-B that illustrate on the GUI configures respective polar area diagrams for graphically displaying duplication across a plurality of TV networks, according to some embodiments. In some embodiments, upon receiving a user's selection of expand/collapse button 251 in duplication graph 250A, as shown in diagram 300A, the GUI displays duplication chart 306A that expands duplication chart 250A. Upon receiving a user's selection of expand/collapse button 302, the GUI may collapse duplication chart 306A to duplication chart 250A as depicted in diagram 200A. In some embodiments, the GUI described with respect to diagrams 300A-B may configure other types of plots such as circular plots or a circular histograms for graphically displaying duplication data.

In some embodiments, duplication chart 306A includes selectable TV networks 310 from which the user's current TV network selection 312A is AMC. Further, selectable TV networks 310 may include a search field that enables the user to search for a specific TV network. In response to receiving the user's selection of channels toggle button 259 from FIG. 2A, as shone in diagram 300A, the GUI dynamically displays the polar area diagram showing only duplication values for a predetermined number (e.g., ten) of TV networks. As shown in FIG. 3A, the four TV networks FOX, ABC, NBC, and CBS have the highest duplication with respect to currently selected TV network 312A of AMC and are represented as sectors 320, 322, 324, and 326, respectively. In some embodiments, when the user hovers over a sector such as sector 320, the GUI displays the duplication value, e.g., 32.86% representing the proportion of impressions counted with respect to AMC TV network that are duplicated for the FOX TV network.

In some embodiments, the GUI provides enhanced flexibility in TV network selection by enabling each sector, e.g., sector 320 corresponding to FOX, to be selectable. Upon receiving the user's selection of, for example, sector 320, as shown in diagram 300B, the GUI dynamically updates duplication chart 306A to display duplication chart 306B in FIG. 3B. Duplication chart 306B shows duplication across a plurality of TV networks for the TV network corresponding to the selected sector 320 from diagram 300A. Further, as depicted in diagram 300B, the GUI updates selected TV network 312A to selected TV network 312B showing FOX corresponding to sector 320 selected in FIG. 3A. As shown in FIG. 3B, duplication chart 306B shows the four TV networks NBC, ABC, CBS, and AMC as having duplication with respect to currently selected TV network 312B of FOX and are represented as sectors 330, 332, 334, and 336, respectively. Upon detecting that a user is hovering over sector 336, the GUI displays a duplication value of 22.53% representing a proportion of impressions with respect to FOX that are duplicated for the AMC TV network. In comparison to the duplication value of 32.86% described with respect to chart 306A, a higher proportion of viewers that watch AMC also watch FOX than vice versa.

FIGS. 4A-C are examples of diagrams 400A-C that illustrate how the GUI configures respective multilevel pie charts for graphically displaying a reach across groupings of TV programs at various granularities, according to some embodiments. In some embodiments, as shown in diagram 400A, upon receiving a user's selection of expand/collapse button 261 in reach graph 260A, the GUI displays reach chart 402A that expands reach chart 260A. Accordingly, the graphical elements in reach chart 420A correspond to the graphical elements described with respect to reach chart 260A. Upon receiving a user's selection of expand/collapse button 401, the GUI may collapse reach chart 402A as shown in diagram 200A of FIG. 2.

As described with respect to reach chart 260A, reach chart 402A includes a multilevel pie chart that includes concentric circles 406A, 406B, 406C, 406D, and 406E depicting reach for various groupings of TV programs. In particular, the innermost circle 406A represents a total reach, about 81 million, across all TV programs. Each successive circle moving outwards from circle 406A depicts reach subdivided by an additional grouping of TV programs with respect to the grouping of TV programs in the next inscribed circle. For example, circle 406B inscribing circle 406A may depict reach for TV programs grouped by a network type such as broadcast or cable. Circle 406B includes sectors 408A and 408B representing the network types of broadcast and cable, respectively. In some embodiments, within each circle, a larger sector represents a higher reach. For example, the reach for sector 408A representing the broadcast network type is higher than the reach for sector 408B representing the cable network type.

In some embodiments, circle 406C inscribing circle 406B may depict reach for TV programs grouped by TV networks. The finer granularity of TV networks may subdivide the network type represented in circle 406B inscribed by circle 406C. Circle 406C may display sectors 410A-D of TV networks that correspond to sector 408A representative of the broadcast network type. In particular, sectors 410A, 410B, 410C, and 410D may correspond to the TV networks of FOX, ABC, NBC, and CBS, respectively.

In some embodiments, circle 406D inscribing circle 406C may depict reach for TV programs grouped by TV program types. The finer granularity of TV program types may subdivide the TV network groupings represented in circle 406C inscribed by circle 406D. Circle 406D may display sectors 412A-B of TV program types that correspond to sector 410B representative of the ABC TV network. In particular, sectors 412A and 412B may correspond to the TV programming type of original programming and sports, respectively.

In some embodiments, circle 406E inscribing circle 406D may depict reach for TV programs grouped by TV programs. The finer granularity of TV programs may subdivide the TV program type groupings represented in circle 406D inscribed by circle 406E. Circle 406E may display sectors 414A-C of TV programs that correspond to sector 412A representative of the ABC original program type. In particular, sectors 414A, 414B, and 414C may correspond to the TV programs the Oscars, Live from the Red Carpet, and J. Kimmel Live, respectively. Similarly, sector 416 may correspond to the TV program of NBA Showcase, which is a type of ABC-broadcasted sport program as represented by sector 412B.

In some embodiments, the GUI can be programmed to display a reach summary 404A of reach subdivided according to the first concentric circle inscribing innermost circle 406A. Accordingly, reach summary 404A shows the reach for a plurality of network types (e.g., broadcast and cable), which corresponds to circle 406B inscribing circle 406A. In some embodiments, to provide the user the capability to visually analyze reach for a specific grouping of TV programs, the GUI provides reach summary 404A as selectable icons. For example, upon receiving a user's selection of the broadcast network type in reach summary 404A, the GUI dynamically updates reach chart 402A that limits reach to the selected broadcast network type, shown as reach chart 402B in diagram 400B of FIG. 4B.

Reach chart 402B, as generated by the GUI, includes a multilevel pie chart that includes concentric circles 420A-D depicting reach for various groupings of TV programs. In particular, the innermost circle 420A may represent reach for a broadcast network type, which may be selected in FIG. 4A. Similar to circles 406C-E described with respect to FIG. 4A, circles 420B-D may represent TV program groupings of TV networks, TV program type, and TV programs, respectively. Accordingly, sectors 422A-D may correspond to sectors 410A-410D, respectively, and representing the TV networks FOX, ABC, NBC, and CBS, respectively. Similarly, sector 422B, representing the ABC TV network, may correspond to sectors 424A and 424B. Sectors 424A and 424B may represent the ABC original TV programming type and the ABC sport TV programming type, respectively. Similarly, sectors 426A-C may correspond to respective sectors 414A-C described with respect to reach chart 402A. Similarly, sector 428 may correspond to sector 416 described with respect to reach chart 402A.

In some embodiments, similarly to diagram 400A, diagram 400B shows that the GUI can be programmed to display a reach summary 404B of reach subdivided according to the first concentric circle inscribing innermost circle 420A. Accordingly, reach summary 404B shows the reach for a plurality of TV networks (e.g., FOX, ABC, NBC, and CBS), which corresponds to circle 420B inscribing circle 420A. In some embodiments, as depicted in diagram 400B, to provide the user the capability to visually analyze reach for a specific grouping of TV programs, the GUI provides reach summary 404B as selectable icons. For example, upon receiving a user's selection of the ABC TV network in reach summary 404B, the GUI dynamically updates reach chart 402B that limits reach to the selected TV network, shown as reach chart 402C in diagram 400C of FIG. 4C.

Reach chart 402C, as generated by the GUI, includes a multilevel pie chart that includes concentric circles 430A-C depicting reach for various groupings of TV programs. In particular, the innermost circle 430A may represent reach for the ABC TV network, which may be selected in FIG. 4B. Similar to circles 420C-D described with respect to FIG. 4A, circles 430B-C may represent TV program groupings of TV program type and TV programs, respectively. Accordingly, sector 434 within circle 430C may correspond to sector 426A of FIG. 4B and representing the Oscars TV program. In some embodiments, upon detecting a user hovering over any sector such as sector 434, the GUI displays text box 435 showing information related to the sector such as a name of the sector, e.g., the Oscars TV Program, and an associated reach, e.g., 21 million. In some embodiments, upon detecting a user hovering over a sector such as sector 434, the GUI displays the hierarchical sectors corresponding to the detected sector. For example, the GUI may display an indication of the broadcast network type, the ABC TV network, the originals TV program type, and the Oscars TV program in a banner above the multilevel pie chart of reach chart 402C.

In some embodiments, similarly to diagrams 400A-B, diagram 400C shows that the GUI can be programmed to display a reach summary 404C of reach subdivided according to the first concentric circle inscribing innermost circle 430A. Accordingly, reach summary 404C shows the reach for a plurality of TV program types (e.g., original and sport), which corresponds to circle 430B inscribing circle 430A.

Returning to FIG. 4A, the GUI may be programmed to allow the user to select any sector within reach chart 402A to generate an updated reach chart, in accordance with some embodiments. For example, upon detecting a user's selection of sector 408A in reach chart 402A, the GUI may generate reach chart 402B in FIG. 4B. In another example, upon detecting a user's selection of sector 410B in reach chart 402A, the GUI may generate reach chart 402C in FIG. 4C. In a similar example, upon detecting a user's selection of sector 422B in reach chart 402B of FIG. 4B, the GUI may generate reach chart 402C in FIG. 4C.

FIGS. 5A-D are example diagrams 500A-D that illustrate how the GUI configures respective radial tree diagrams for graphically displaying gross point ratings (GRPs) across groupings of TV programs at various granularities, according to some embodiments. In some embodiments, upon receiving a user's selection of expand/collapse button 271 in GRP chart 270A of diagram 500A, the GUI displays GRP chart 502A that expands GRP chart 270A. Accordingly, the graphical elements in reach chart 502A correspond to the graphical elements described with respect to reach chart 270A. Upon receiving a user's selection of expand/collapse button 501, the GUI may collapse GRP chart 502A as shown in diagram 200A of FIG. 2A.

In some embodiments, GRP chart 502A includes a radial tree diagram having a plurality of nodes representing a corresponding plurality of TV program groupings. The radial tree diagram includes a central node 505 representing all TV programs. Further, the radial tree diagram has a plurality of levels where a first level of nodes includes nodes, such as node 506A, that represent TV programs grouped by TV networks. For example, node 506A represents TV programs of the ABC TV network. Each successive level of nodes may further subdivide the grouped TV networks of the previous level of nodes. For example, node 506A include children nodes 508 and 510 that further group the TV programs represented by node 506A into different TV programming types. For example, nodes 508 and 510 represent ABC TV programs that are of the original and sports TV program types, respectively. Node 508 may have children nodes 512, 514, and 516 corresponding to specific TV programs such as J. Kimmel Live, Live from the Red Carpet, and the Oscars, respectively. In some embodiments, a size of a node quantifies the GRP where a larger node represents a greater GRP.

In some embodiments, diagram 500A includes a GRP column 504A that shows the GRPs corresponding to the nodes in a tabular, textual format. In particular, GRP column 504A may include TV network graphical elements 520A, 522A, 524A, and 526A corresponding to TV networks ABC, AMC, Black Entertainment TV, and Bravo, respectively. As shown in diagram 500A, the GUI may generate TV network graphical element 520A that corresponds to node 506A. Similarly, TV program type graphical elements 528 and 530 may correspond to respective nodes 508 and 510.

In some embodiments, upon receiving a user hovering over a node in the radial tree diagram, the GUI displays information identifying the hovered node and an associated GRP. For example, the GUI generates text box 503 indicating that the user is hovering over node 505 having about 363 GRPs.

In some embodiments, one or more nodes in GRP chart 522A can be user-selectable graphical elements that upon a user's selection cause the GUI to collapse the selected node. For example, upon receiving a user's selection of node 506A, the GUI collapses node 506A to become node 506B shown in GRP chart 502B of FIG. 5B. In some embodiments, as shown in diagram 500B of FIG. 5B, the GUI updates GRP column 524B. For example, in response to displaying collapsed node 506B, the GUI may collapse TV program type graphical elements 528 and 530 of TV network graphical elements 520A to display a collapsed TV network graphical element 520B.

In some embodiments, the GUI implements a group/ungroup button 540 that upon selection may simultaneously collapse/expand a plurality of nodes in GRP chart 522B. For example, upon receiving a user's selection of group/ungroup button 540, the GUI may collapse all of the nodes to display GRP chart 502C as depicted in diagram 500C of FIG. 5C. Note that node 506C remains collapsed as the corresponding node 506B in diagram 500B is collapsed. In some embodiments, the GUI matches the layout of GRP column 504C to the corresponding nodes in GRP chart 502C. In particular, the GUI may collapse each of TV network graphical elements 520B, 522B, 524B, and 526B from diagram 500B to become corresponding TV network graphical elements 520C, 522C, 524C, and 526C.

In some embodiments, similar to the nodes in GRP chart 502C, one or more of the graphical elements within GRP column 504C may be user-selectable graphical elements. For example, upon receiving a user's selection of TV network graphical element 520C that is shown as collapsed in diagram 500C, the GUI may expand TV network graphical element 520C, the corresponding node 506C, or a combination thereof. For example, as depicted in diagram 500D of FIG. 5D, the GUI has expanded TV network graphical element 520C to become TV network graphical element 520D that also includes TV program types and specific TV programs. The GUI may also similarly expand node 506C from FIG. 5C to become node 506D having a plurality of children nodes. TV network graphical elements 522D, 524D, and 526D may remain collapsed if the GUI did not receive a user's selection of corresponding graphical elements in diagram 500C. As discussed above, the corresponding graphical elements may include a corresponding TV network graphical element from GRP column 504C or a corresponding node in GRP chart 502C of FIG. 5C.

FIGS. 6A-B are example diagrams 600A-B that illustrate how the GUI configures respective bar charts for graphically displaying impressions for a plurality of spots, according to some embodiments. In some embodiments, as depicted in diagram 600A, upon receiving a user's selection of expand/collapse button 281 in impressions chart 280A of diagram 200A, the GUI displays impressions chart 602A that expands impressions chart 280A. Accordingly, the graphical elements in impressions chart 602A correspond to the graphical elements described with respect to impressions chart 280A of diagram 200A in FIG. 2A. Upon receiving a user's selection of expand/collapse button 601, the GUI may collapse impressions chart 602A to impressions chart 280A as shown in diagram 200A of FIG. 2A. As described with respect to impressions chart 280A of FIG. 2A, impressions chart 602A also includes options 603 and bar 604A for filtering a date range on the x-axis of the bar chart. For example, upon receiving a user's adjustment of the left and right icons of bar 604A, the GUI shrinks the date range of the bar chart from Dec. 29, 2014-Mar. 13, 2015 to Feb. 14, 2015-Feb. 19, 2015 as shown in impressions chart 602B of diagram 600B of FIG. 6B.

In some embodiments, diagram 600B shows bar 604B with adjusted left and right icons corresponding to the narrower date range. In some embodiments, the bar chart of impressions chart 602B compares an expected number of impressions with actual impressions for a plurality of spots spanning the selected date range. In some embodiments, the GUI shows the comparison by overlapping an expected bar 512 representing expected impressions and an actual bar 516 representing actual impressions for a specific spot. In some embodiments, upon detecting that a user is hovering over a specific spot shown by line 510, the GUI displays text boxes 514 and 518 showing additional information related to the specific spot. For example, text box 514 may display the date that the spot aired and a corresponding number of expected impressions. In some embodiments, text box 518 displays characteristics of the specific spot. For example, the characteristics may include the TV network for the spot, the specific ad that aired during the spot, the TV program for the spot, a POD number of the spot, a position of the spot within the POD, a timestamp of the spot, or a combination thereof. Further, text box 518 may display the expected number of impressions, the actual number of impressions, and a deviation (e.g., a percent difference) between the expected and actual number of impressions for the spot.

FIGS. 7A-D are example diagrams 700A-D that illustrate how the GUI configures a target audience segment, according to some embodiments. In some embodiments, as depicted in diagram 700A, upon receiving a user's selection of drop-down menu target segments 294 tab and a create target segment from FIG. 2A, the GUI displays a prompt 702 to the user to create a target audience segment. In some embodiments, as shown in diagram 700A, prompt 702 may include options to select one or more demographics characteristics of the target audience such as one or more genders, one or more age ranges, a custom age range, or a combination thereof. In some embodiments, the one or more demographic characteristics may include one or more of the demographics attributes described with respect to audience attributes 230A-B in FIGS. 2A-B.

Figure 7A:
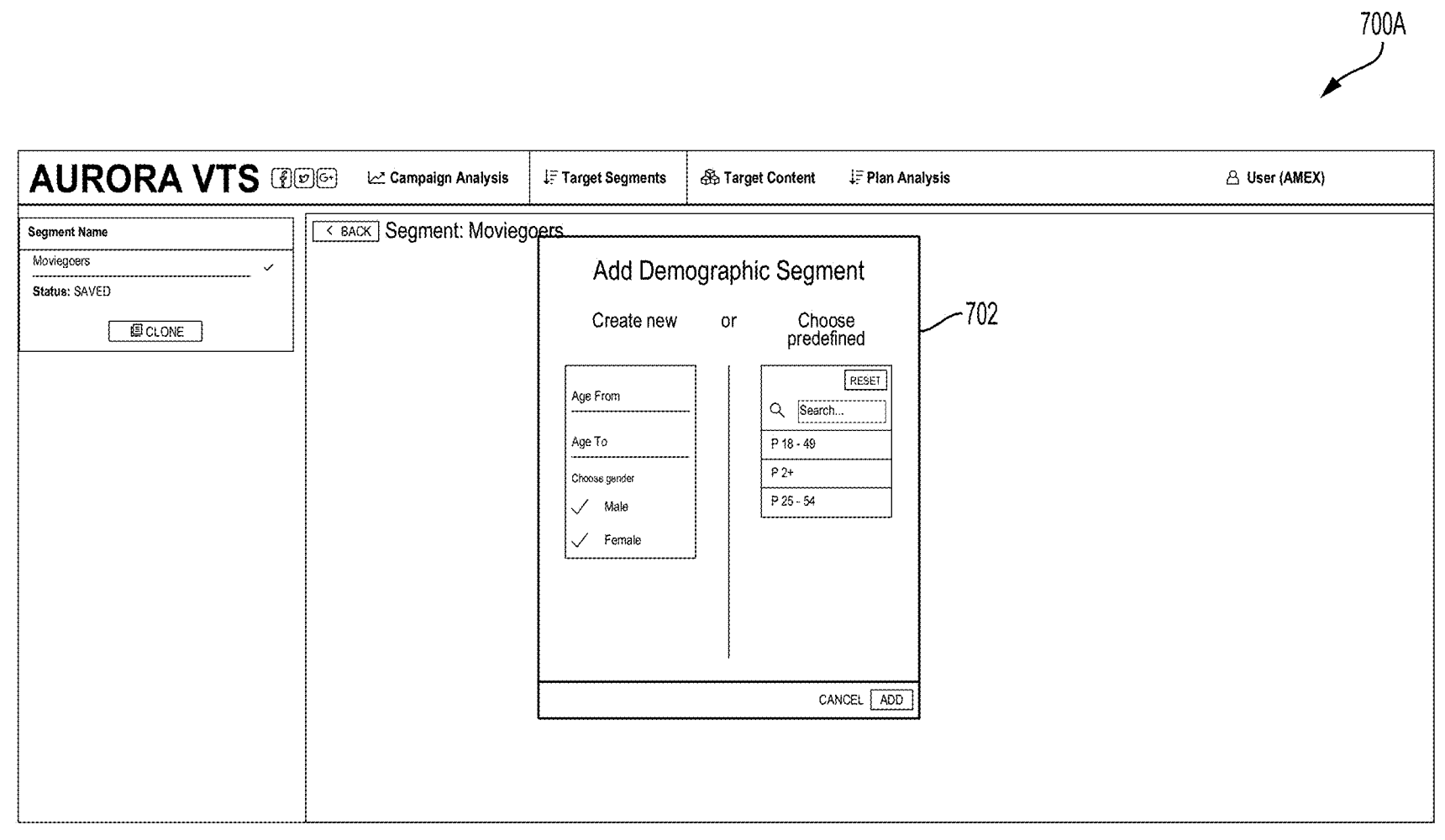
Figure 7B:
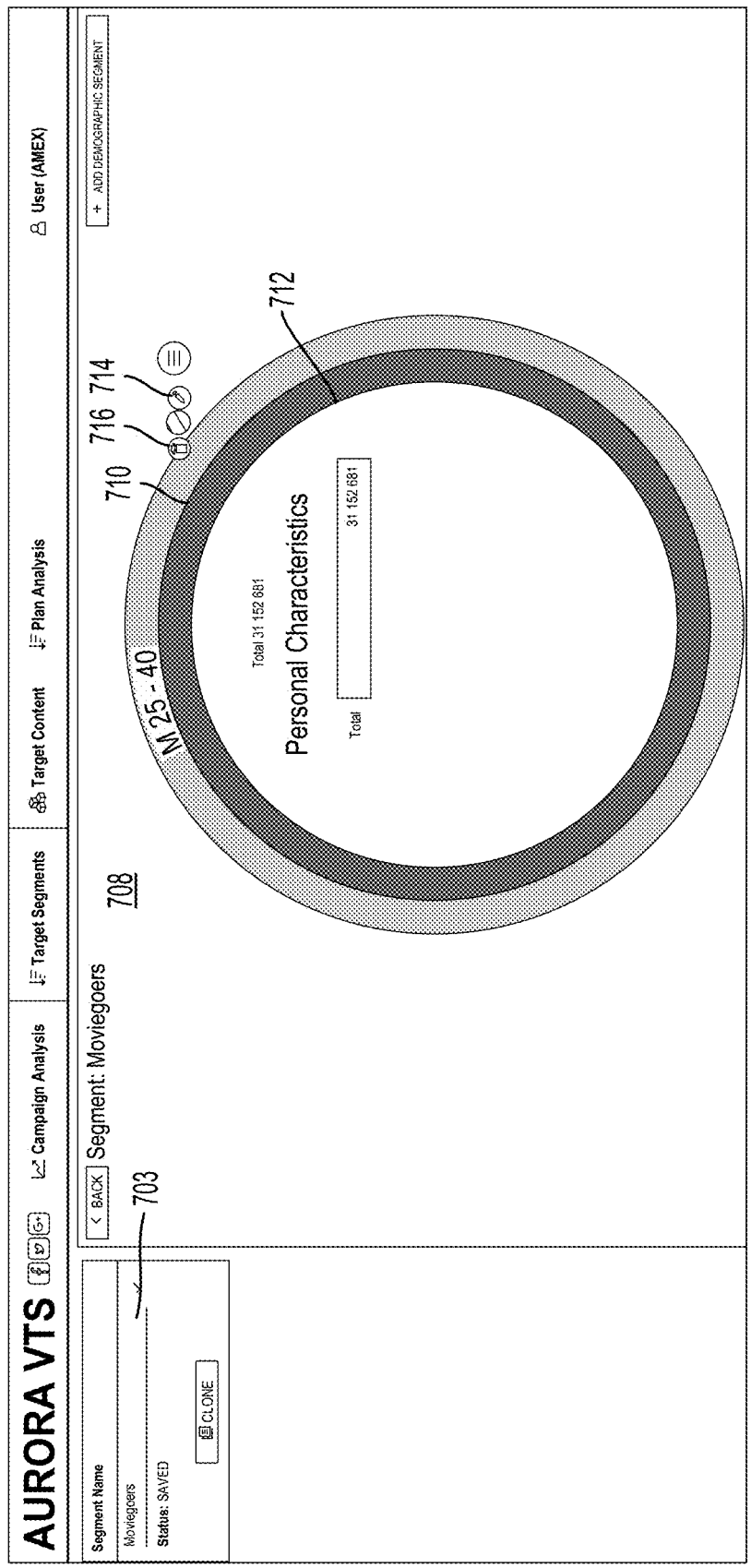

In some embodiments, in response to receiving a user's confirmation of selected options in prompt 702, the GUI configures an enclosure diagram 708 for displaying the selected characteristics of the target audience segment as depicted in diagram 700B of FIG. 7B. Enclosure diagram 708 may be associated with segment name 703 depicting a name assigned by the user to the target audience segment. In some embodiments, enclosure diagram 708 includes configuration options: delete option 716 for deleting text box chart 708, and edit option 714 for adding one or more characteristics to text box chart 708.

In some embodiments, enclosure diagram 708 can be implemented by the GUI using a recursive circle packing algorithm for graphically displaying one or more characteristics of the target audience segment grouped hierarchically. In particular, the GUI may create a circle of a specific size for each hierarchically grouped one or more characteristics where the size is proportional to a number of TV viewers. As depicted in enclosure diagram 708, the GUI may generate circle 710 to represent a demographics segment configured by the user in diagram 700A of FIG. 7A. The GUI may enclose circle 712 within circle 710 where circle 712 represents one or more characteristics selected for the demographic segment represented by circle 710. In some embodiments, upon receiving a user's selection of edit options 714, the GUI enables the user to select one or more characteristics for the demographic segment represented by circle 710.

Figure 7C:
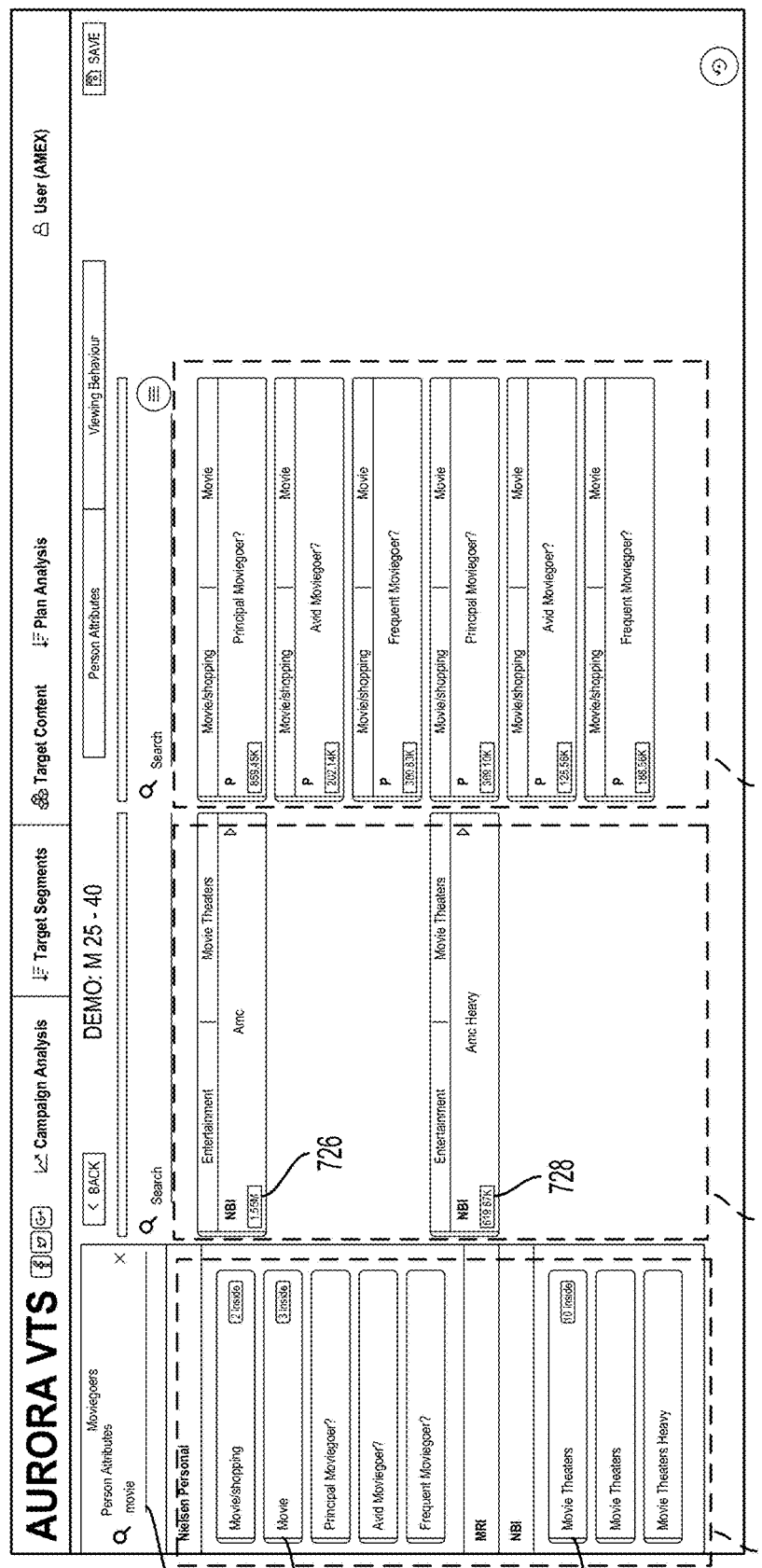

In some embodiment, the GUI provides the user the ability to add one or more characteristics to circle 710 as shown in columns 730A-B of diagram 700C of FIG. 7C. In some embodiments, the GUI enables the user to search for one or more characteristics including one or more audience attributes 230A-B as described with respect to FIGS. 2A-B. In some embodiments, upon receiving a user's search term, e.g., "movie", in search field 716, the GUI provides one or more selectable characteristics 718 detected within the TV viewership dataset. For example, selecting movie theater option 720 enables the user to select TV viewers that attend specific movie theaters such as AMC theaters as shown in column 730A. In particular, column 730A indicates one or more selected characteristics and associated numbers of TV viewers 726 and 728.

In some embodiments, the one or more characteristics of column 730A may be further modified by one or more selectable characteristics 718 such as moviegoer behavior option 724. In some embodiments, column 730B depicts the breakdown of moviegoer behavior for TV viewers that attend AMC theaters and that attend AMC theaters heavily. In some embodiments, as shown in diagram 700B, the GUI enables the user to construct a specific demographic segment with one or more characteristics. In some embodiment, the GUI modifies enclosure diagram 708 of diagram 700B to add one or more circles to represent the one or more characteristics added in column 730A in diagram 700C of FIG. 7C. In some embodiments, the GUI enables the user to exclude one or more selectable characteristics 718 from the target audience.

Figure 7D:
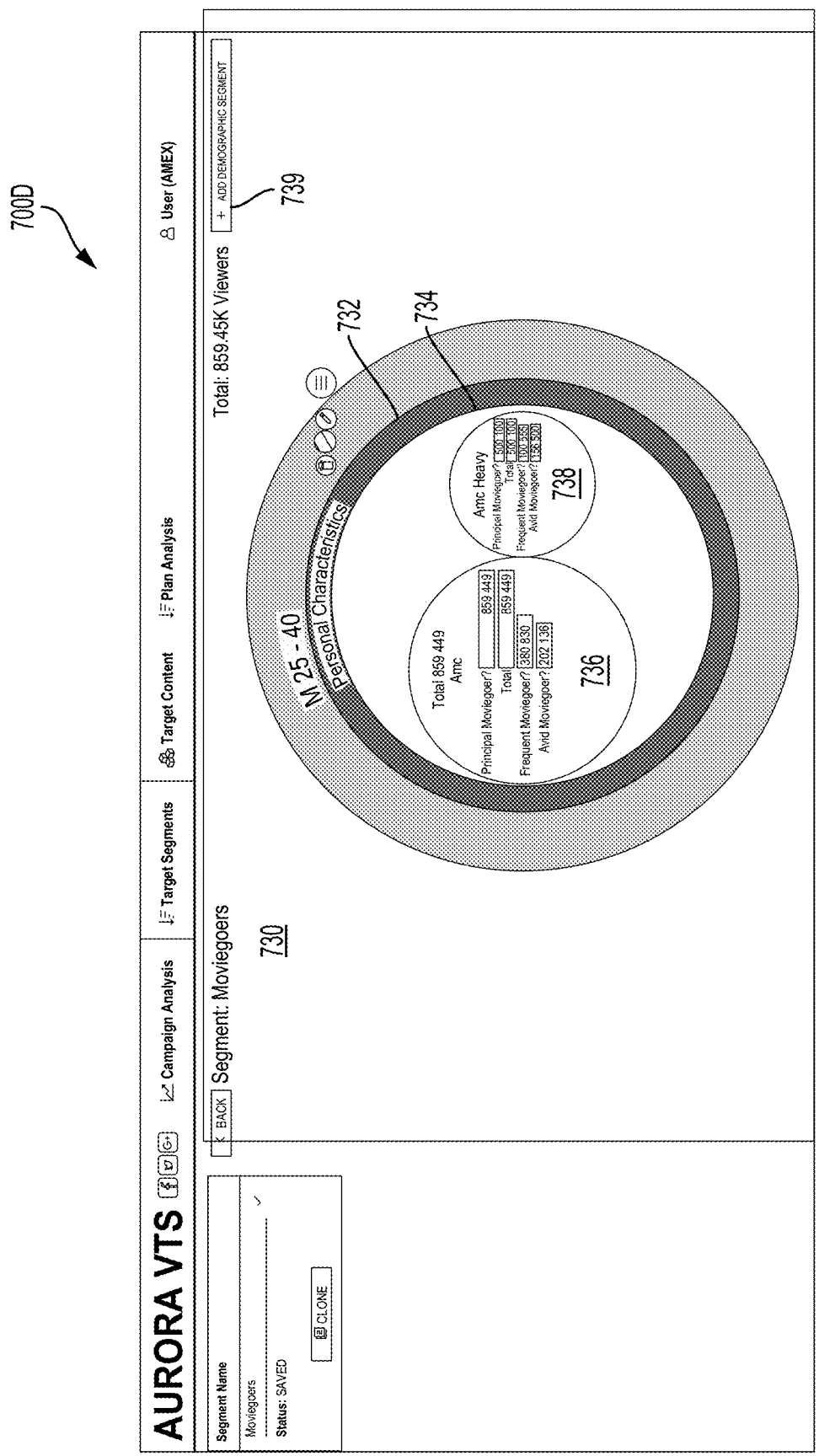

In some embodiments, the modified enclosure diagram is depicted as enclosure diagram 730 in diagram 700D of FIG. 7D. Like enclosure diagram 700B, enclosure diagram 730 includes circle 732 to represent a demographics segment configured by the user in diagram 700A of FIG. 7A. However, unlike enclosure diagram 700B, enclosure diagram 730 includes circles 736 and 738 to represent the one or more characteristics added in column 730A in diagram 700C of FIG. 7C. Further, the one or more characteristics in column 730B in diagram 700C may be represented in a bar chart in circles 736 and 738.

In some embodiments, enclosure diagram 730 includes add demographic segment option 739 that upon a user's selection causes the GUI to prompt the user to create another demographic segment within enclosure diagram 730. For example, the GUI may display a prompt similar to prompt 702 displayed in diagram 700A of FIG. 7A. In some embodiments, upon creation of a new demographic segment, the GUI may add another circle within enclosure diagram 730 to represent the newly created demographic segment.

Figure 8:
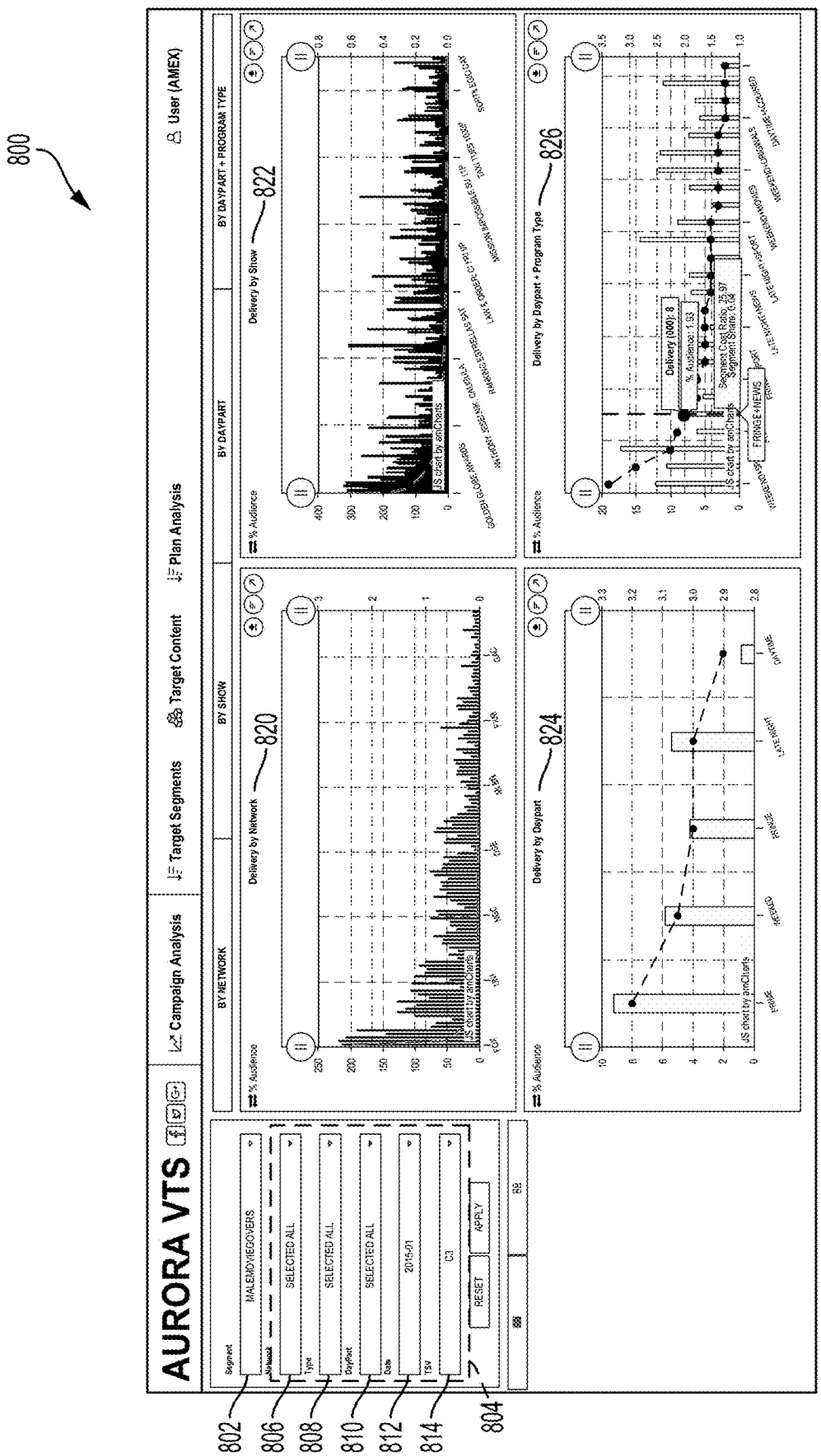
FIG. 8 is an example diagram that illustrates how a GUI configures a plurality of charts for graphically displaying KPIs for a target audience segment, according to some embodiments.

FIG. 8 is an example diagram 800 that illustrates how the GUI configures a plurality of charts for graphically displaying KPIs for a selected target audience segment 802, according to some embodiments. In some embodiments, target audience segment 802 may be selected from one of the segment configured by the user as described with respect to FIGS. 7A-D. In some embodiments, the GUI configures a delivery-by-network chart 820, a delivery-by-show chart 822, a delivery-by-daypart chart 824, and a delivery-by-daypart+program-type chart 826. In some embodiments, each chart graphically depicts a plurality of KPIs across a specific grouping of TV programs. In some embodiments, each chart may superimpose a bar chart showing a first KPI and a line chart showing a second KPI. For example, the bar chart may show audience percentages representing a percentage of the audience that matches the target audience segment, and the line chart may show a delivery value representing the audience size per average minute. Accordingly, each bar in delivery-by-network chart 820 may graphically depict audience percentages for TV programs grouped by a TV network (e.g., FOX); each bar in delivery-by-show chart 822 may graphically depict audience percentages for specific TV programs; each bar in delivery-by-daypart chart 824 may graphically depict audience percentages TV programs grouped by daypart type; and each bar in delivery-by-daypart+program-type chart 826 may graphically depict audience percentages TV programs grouped by a combination of daypart and program type. In some embodiments, upon detecting a user's hovering action over a point on the line chart or a bar in the bar chart, the GUI displays corresponding KPI information. For example, as shown in delivery-by-daypart+program-type chart 826, the GUI shows a delivery value of 8, an audience percentage of 1.93%, segment cost ratio of 25.97, and a segment share of 0.04 for the specific daypart+program type of "Fringe+ News."

In some embodiments, the GUI presents filtering options 804 to enable the user to select a portion of the TV viewership data used to generate the plurality of charts. In some embodiments, filtering options 804 include a TV network selection 806, program type selection 808, daypart selection 810, a date range section 812, and a time shifted viewing (TSV) selection 814. For example, the user may select AMC in the network selection 806. Upon receiving the user's selection of AMC, the GUI may regenerate the plurality of charts. For example, delivery-by-network chart 820 may be reconfigured to show a single bar representing an audience percentage of the AMC TV network and a single point representing a delivery quantity for the AMC TV network. Similarly, delivery-by-show chart 822 may be reconfigured to show a plurality of bars corresponding to the TV programs shown on the AMC TV network.

Figure 9:
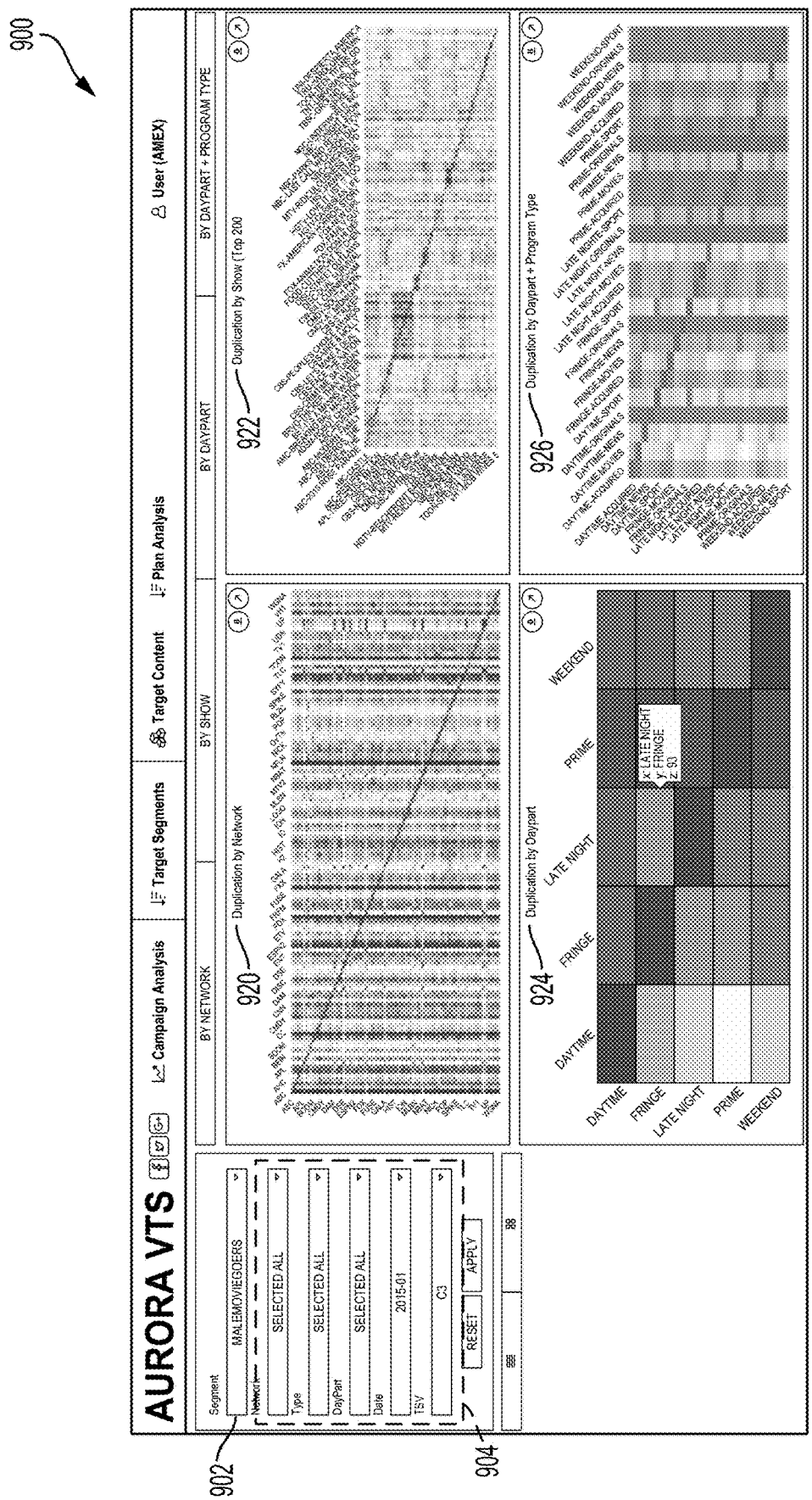
FIG. 9 is an example diagram that illustrates how a GUI configures a plurality of heat maps for graphically displaying TV viewership duplication for a selected target audience segment, according to some embodiments.

FIG. 9 is an example diagram 900 that illustrates how the GUI configures a plurality of heat maps for graphically displaying TV viewership duplication for a selected target audience segment 902, according to some embodiments. In some embodiments, target audience segment 902 may be selected from one of the segment configured by the user as described with respect to FIGS. 7A-D. In some embodiments, the GUI configures a delivery-by-network heat map 920, a delivery-by-show heat map 922, a delivery-by-daypart heat map 924, and a delivery-by-daypart+program-type heat map 926. In some embodiments, each heat map graphically depicts duplication across a specific grouping of TV programs. For example, delivery-by-network heat map 920 graphically depicts duplication among TV programs grouped by a TV network; delivery-by-show heat map 922 graphically depicts duplication among TV programs; delivery-by-daypart heat map 924 graphically depicts duplication among TV programs grouped by daypart type; and daypart+ program-type heat map 926 graphically depicts duplication among TV programs grouped by a combination of daypart and program type.

In some embodiments, each heat map includes a plurality of rectangles where intensity or a color value of a rectangle represents a duplication amount. For example, as shown in diagram 900, a darker shade of gray represents higher duplication. In some embodiments, upon detecting a user's hovering action over a rectangle in a heat map, the GUI displays corresponding duplication information. For example, as shown in delivery-by-daypart heat map 924, the GUI shows a duplication value of 93% between the daypart types of "Late Night" and "Fringe."

In some embodiments, the GUI presents filtering options 904 to enable the user to select a portion of the TV viewership data used to generate the plurality of heat maps. Filtering options 904 may correspond to filtering options 804 of FIG. 8 and include, for example, a TV network selection, a program type selection, a daypart selection, a date range section, and a TSV selection. For example, the user may select AMC for network selection. Upon receiving the user's selection of AMC, the GUI may regenerate the plurality of heat maps. For example, delivery-by-network heat map 920 may be reconfigured to show a single rectangle representing a duplication of 100% between the AMC TV network and itself. Similarly, delivery-by-show chart 922 may be reconfigured to show duplication among a plurality of TV programs shown on the AMC TV network.

Figure 10:
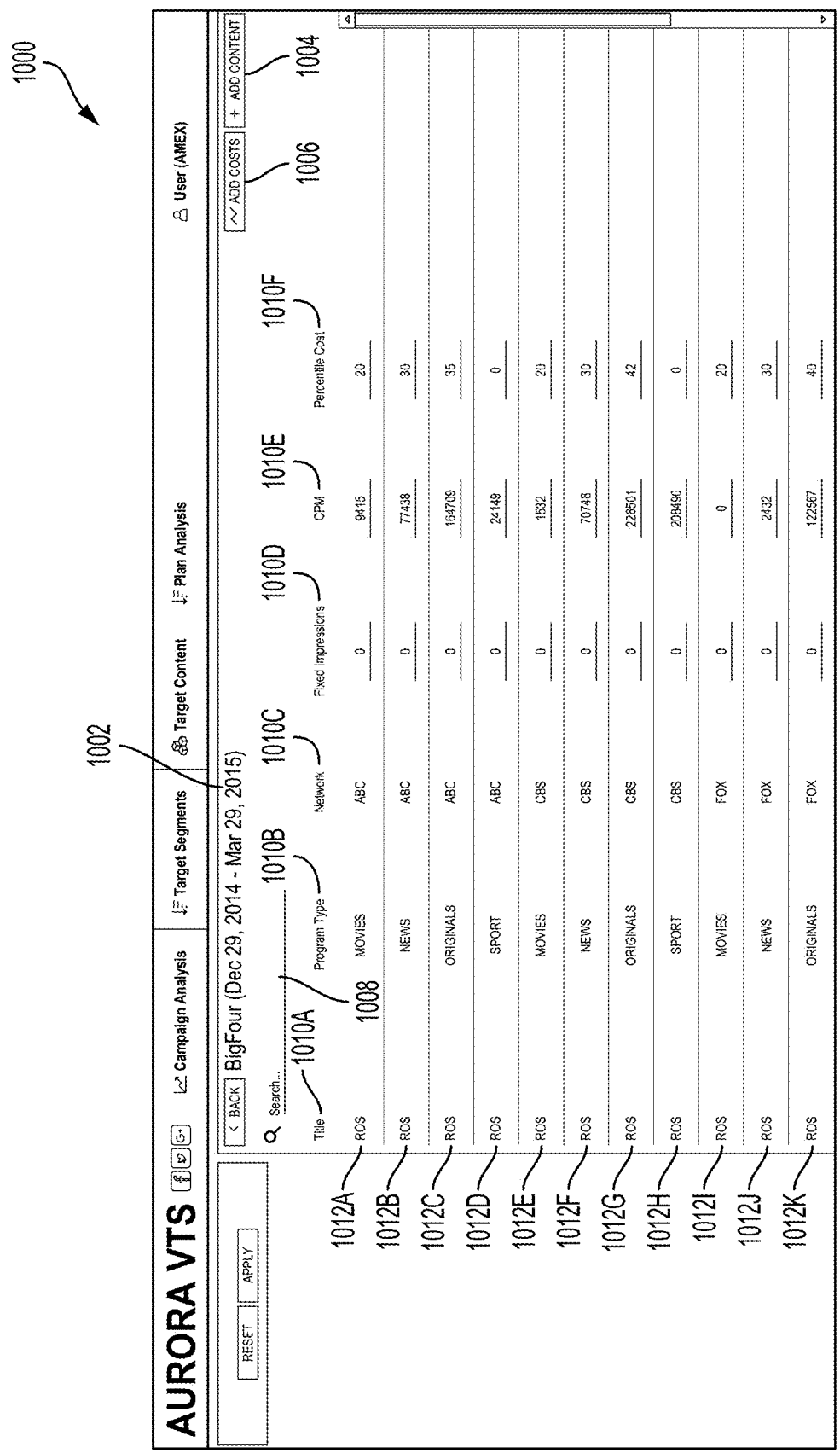
FIG. 10 is an example diagram that illustrates how a GUI configures a target content, according to some embodiments.

FIG. 10 is an example diagram 1000 that illustrates how the GUI configures a target content 1002, according to some embodiments. Target content 1002 may represent a plurality of TV networks, a plurality of program types, a plurality of TV programs, or a combination thereof selected by the user for broadcasting one or more content-of-interest, e.g., one or more advertisements selected in brand 212 of FIG. 2A. In some embodiments, the GUI may prompt the user to select one or more TV networks. In some embodiments, add content option 1004 may be a selectable graphical element that enables the user to select one or more TV networks. In response to the user's selection, the GUI displays a chart of TV programs 1012A-K for the one or more selected TV networks. The chart may include columns: title 1010A of a TV program, program type 1010B of the TV program, and TV network 1010C on which the TV program airs. In some embodiments, the chart includes user-configurable columns: fixed impressions 1010D, CPM 1010E, and percentile cost 1010F representing an approximate CPM. In some embodiments, the GUI configures CPM 1010E or percentile cost 1010F based on a user's selection of add costs 1006. In some embodiments, the user's selection from add costs 1006 specifies a data source used by the GUI to configure CPM 1010E or percentile cost 1010F.

Figure 11A:
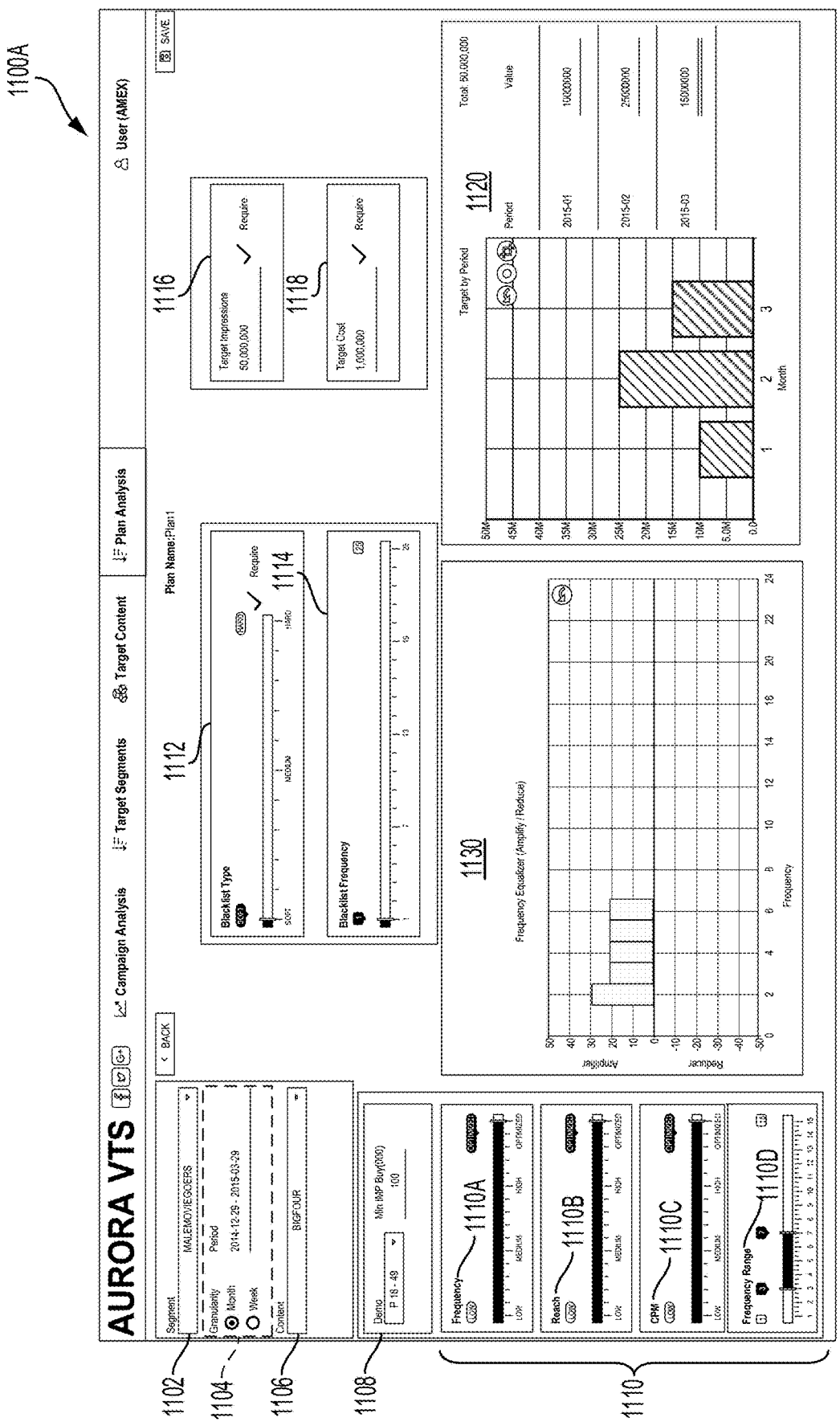

FIG. 11A is an example diagram 1100A that illustrates how a GUI enables the user to configure a plan for an advertisement campaign, according to some embodiments. In some embodiments, the GUI allows the user to configure the plan for a user-selected target segment 1102 as applied to user-selected target content 1106 for a user-selected date range 1104. In some embodiments, the GUI enables the user to set a minimum impressions cutoff buy for each installment period as selected in user-selected date range 1104. For example, as shown, the user may select a monthly installment period or a weekly installment period. In some embodiments, the plan may be optimized based on a plurality of KPI criteria 1110 whose corresponding weights are selected by the user. For example, KPI criteria 1110 may include a level of frequency optimization 1110A, a level of CPM optimization 1110B, a level of CPM optimization 1110C, and a frequency range 1110D. In some embodiments, the GUI provides the user chart 1130 for weighting one or more frequencies. In particular, the GUI enables the user to emphasize one or more frequencies by adding a bar above the x-axis to amplify a weight of a corresponding frequency. Also, the GUI enables the user to deemphasize one or more frequencies by adding a bar below the x-axis to add a negative weight to a corresponding frequency.

In some embodiments, the GUI provides the user with the capability to specify target impressions 1116 or target cost 1118 used to generate the plan. Further, the GUI may provide the user chart 1120 to set target impressions or target costs per installment period. In diagram 1100A, the user has selected a monthly installment plan and the GUI enables the user to set target impressions for each month in the date range selected by the user. In some embodiments, the user may drag the height of the bars for each installment period in chart 1120 to adjust the target impressions/cost or set specific values in the table in chart 1120. In some embodiments, setting the target impressions/cost using the bars automatically adjusts the values in the table and vice versa. In some embodiments, the adjustable bars and the table each enable the user to select a proportion of target impressions/ cost across the installment periods of the target date range. In some embodiments, the GUI enables the user to select a balance icon (e.g., the upper right icon in the graph of chart 1120) to automatically adjust the bars and the values in the table to sum to the desired target impressions 1116 or target cost 1118 while maintaining the selected proportions.

Figure 11B:
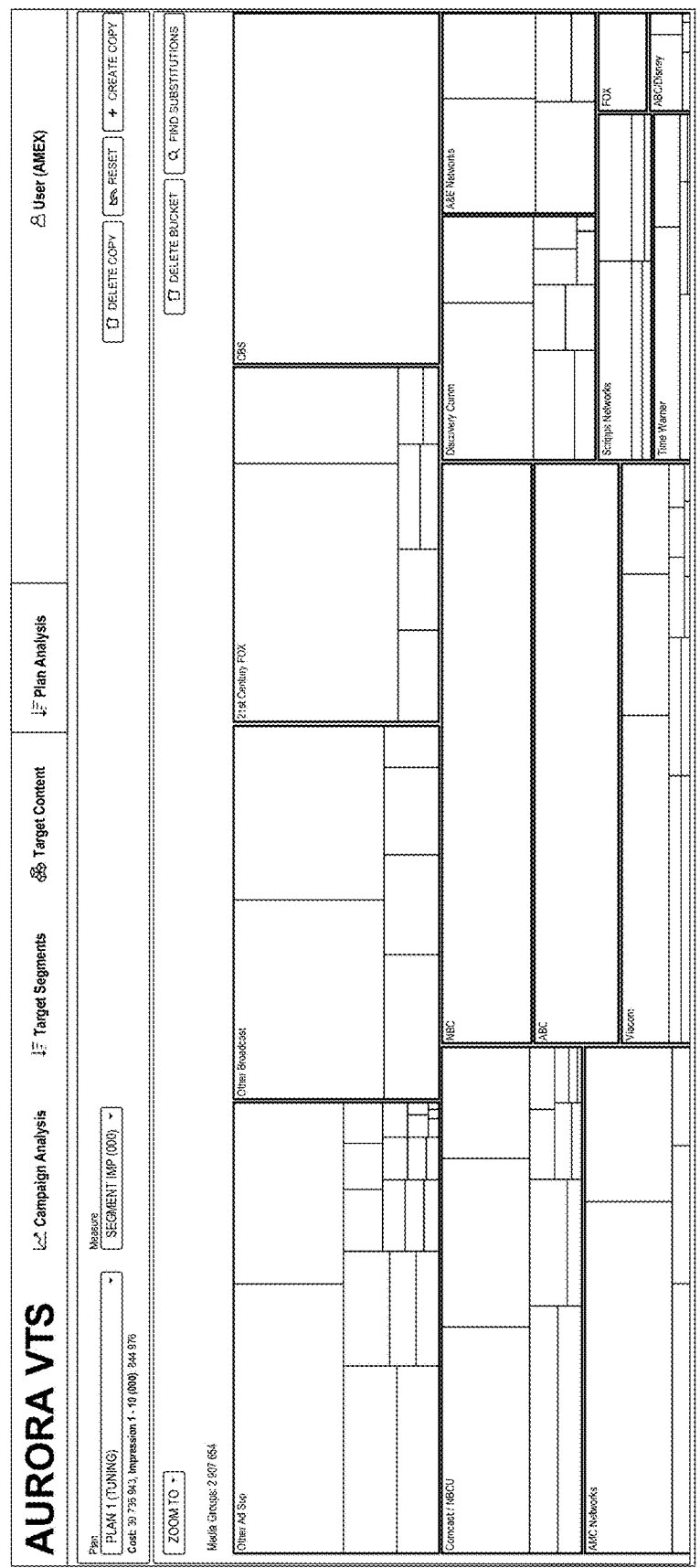
Figure 11C:
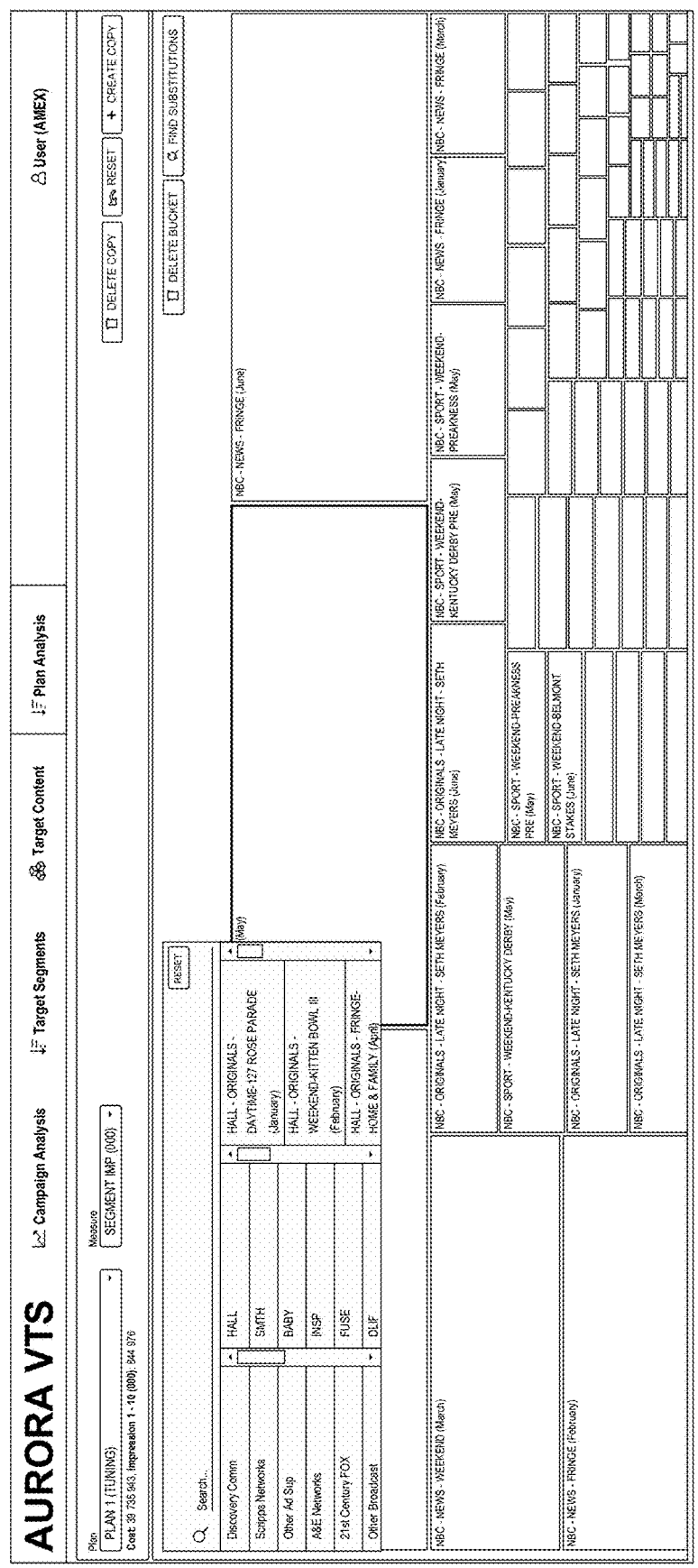
Figure 11D:
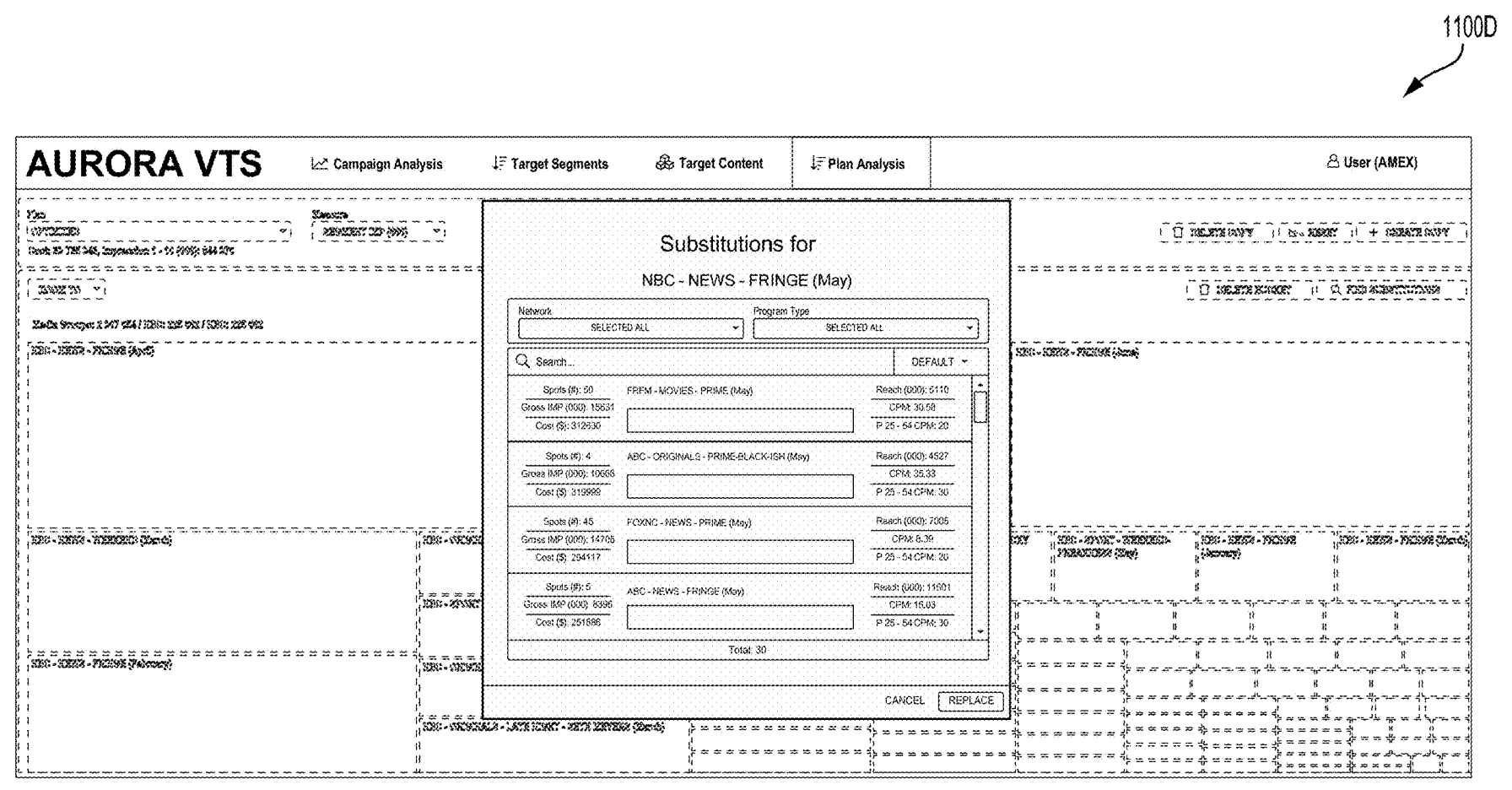

FIGS. 11B-D are example diagrams 1100B-D that illustrate how a GUI enables the user to configure a plan for an advertisement campaign, according to some embodiments. In some embodiments, the GUI allows the user to fine tune the plan as generated by the GUI according to diagram 1100A as described with respect to FIG. 11A. As shown in diagram 1100B, the GUI can enable the user to select the plan based on name and can display a configurable treemap of the spots that were generated in the plan. In some embodiments, the treemap displays the spots selected within the plan in a hierarchy of rectangles. For example, the treemap may display a plurality of first rectangles corresponding to networks and a plurality of second rectangles within each of the first rectangles. The second rectangles may represent a finer granularity of grouped spots associated with a network. For example, the groupings may include an installment period, a program type, a daypart, a specific TV program, or a combination thereof. In some embodiments, the size of a first rectangle depends on the sum of the sizes of the second rectangles within that first rectangle. In some embodiments, the size of each second rectangle corresponds to a measure as selected by the user. In some embodiments, the selected measure can be gross impressions, target segment impressions, cost, or a number of spots. In some embodiments, the GUI enables the user to select any of the first rectangles to fine tune the plan as generated by the GUI.

FIG. 11C is an example diagram 1100C that illustrates how the GUI processes a user's selection of a first rectangle such as the NBC rectangle in FIG. 11B. As shown in diagram 1100C, the GUI may display the plurality of second triangles associated with the NBC rectangle of FIG. 11B. These second triangles may include, for example, NBC-NEWS-FRANCE (June) or NBC-NEW-WEEKEND (March). In some embodiments, like diagram 1100B, the GUI provides the user the capability to select a measure in diagram 1100C. Upon a user's selection of a measure, such as target segment impressions, the GUI configures the size of each of the second rectangles as shown in diagram 1100C to correspond to the selected measure. In some embodiments, diagram 1100C includes a search bar that enables the user to select first rectangles without returning to the GUI as shown in diagram 1100B. In some embodiments, the GUI enables the user to select one or more second rectangles (for example, as shown by the yellow box) in diagram 1100B to fine tune the plan such as the plan generated according to FIG. 11A. In some embodiments, upon selecting one or more of the second rectangles, the GUI enables the user to delete the grouped spots from the plan. If the user deletes the selected grouped spots, the GUI updates the plan in real time to exclude the deleted spots and can automatically recalculate the plurality of KPIs, according to some embodiments.

FIG. 11D is an example diagram 1100D that illustrates how the GUI enables the user to substitute one or more selected second rectangles of diagram 1100C with one or more grouped spots. In some embodiments, as shown in diagram 1100D, the GUI shows a plurality of alternative spot groupings and corresponding KPIs. For example, for the spot grouping of FOXNC-NERWS-PRIME (May), the GUI may display a number of spots, gross impressions, total cost, a reach, a CPM, a CPM for age range 25-54, or a combination thereof. In some embodiments, the GUI enables the user to select the types of spot groupings based one or more selected networks, one or more selected program types, or a combination thereof. In some embodiments, upon receiving the user's confirmation to replace the selected second rectangle(s) of diagram 1100C with one or more grouped spots as shown in diagram 1100D, the GUI reconfigures the treemap as shown in diagrams 1100A and 1100B to include the one or more selected grouped spots of diagram 1100D.

In some embodiments, the GUI provides the user a capability to specify a "blacklist" frequency range 1114 and a corresponding weight 1112. The graphical elements of weight 1112 allows the user to specify a maximum frequency criteria such that a plan is generated to minimize the instances in which one or more TV viewers are shown a specific content or advertisement more than the selected maximum frequency. In some embodiments, the plan can be generated such that no TV viewers are shown the specific content or advertisement more than the selected maximum frequency.

In some embodiments, upon receiving a user's selections and configurations as described above, the GUI forwards the user's selections and configurations to a data processor such as data processor 122 of FIG. 1 to generate the plan.

Figure 12A:
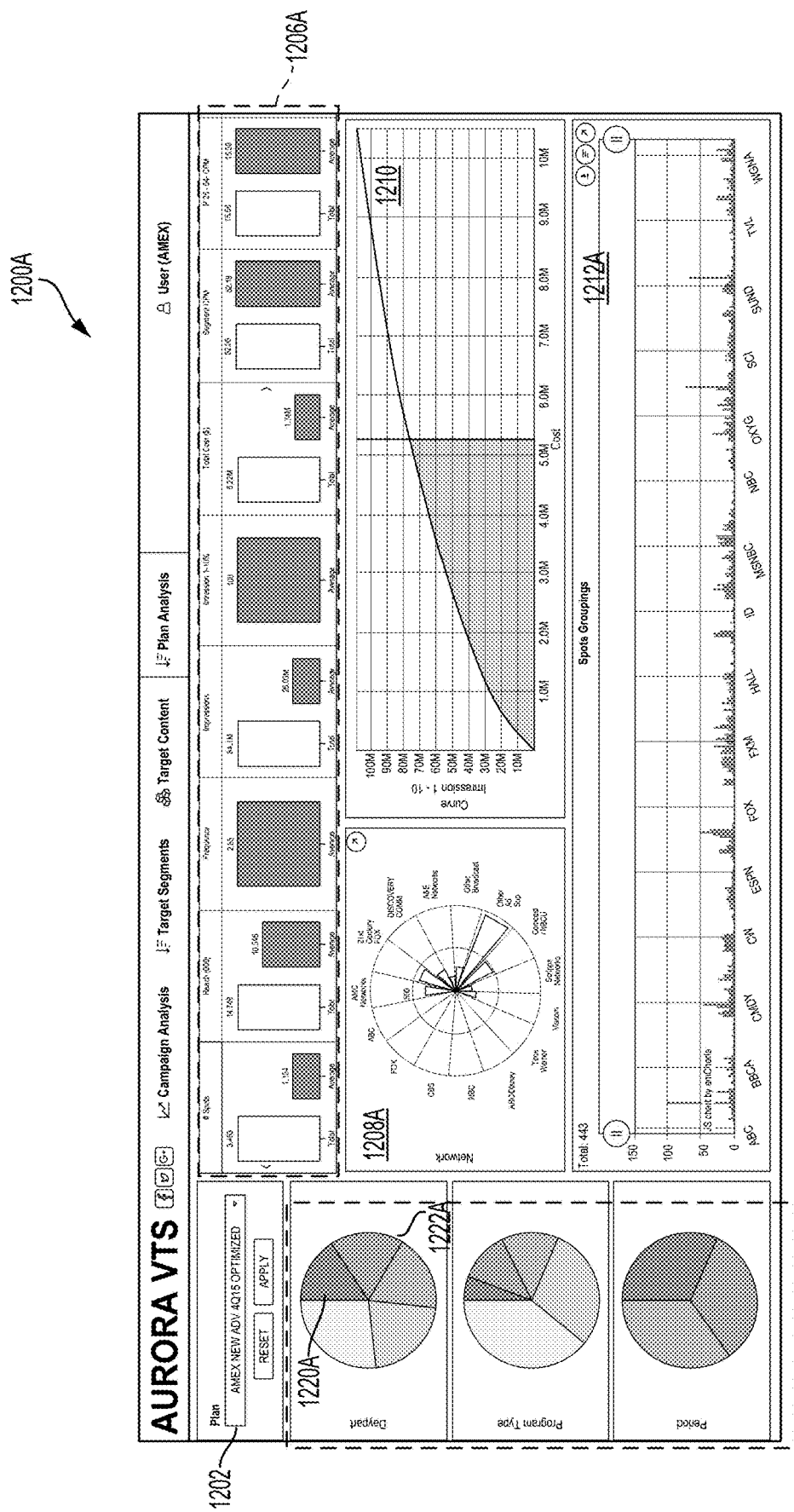
FIGS. 12A-B are example diagrams that illustrates how a GUI configures a plurality of charts for graphically displaying a plan for an advertisement campaign, according to some embodiments.

FIG. 12A is an example diagram 1200A that illustrates how the GUI configures a plurality of charts for graphically displaying a plan 1202 for an advertisement campaign, according to some embodiments. In some embodiments, plan 1202 may be selected by the user and generated according to the user's selections and configurations as described with respect to FIG. 11. In some embodiments, the plan includes a plurality of spots and the plurality of charts graphically displays the KPIs or characteristics of the plurality of spots.

In some embodiments, the GUI displays three pie charts 1204 that compare a quantity of spots in the plan with respect to daypart, a program type, and a time period (e.g., a month, a year, a week, etc.), respectively.

In some embodiments, the GUI displays a plurality of bar charts 1206 that display KPIs calculated with respect to the plurality of spots selected for the plan. For example, the KPIs include a number of spots, a reach, a frequency, impressions, impressions 1-10% representing percent impressions within a specific frequency range, total cost, segment CPM, and P 25-54 CPM. Segment CPM may represent a CPM for the target audience segment selected by the user in generating the selected plan 1202 as described with respect to FIG. 11. P 25-54 CPM may represent a CPM for a default demographic segment including all TV viewers between 25 and 54 years old.

In some embodiments, the GUI displays a polar area diagram 1208 to graphically depict a quantity of spots across a plurality of TV networks. Further, the GUI may display a bar chart 1212 to graphically depict a quantity of spots across a plurality of TV programs for each of the TV networks in polar area diagram 1208.

In some embodiments, one or more of the graphical elements in one or more charts displayed in diagram 1200 may be selected by the user. Upon detecting a user's selection of a graphical element, the GUI reconfigures one or more charts to correspond to the user's selection. For example, the user may select one of the bars in bar charts 1206A corresponding to a specific KPI. Upon receiving the user's selection of a bar corresponding to the specific KPI, the GUI reconfigures pie charts 1204, polar area diagram 1208A, and bar chart 1212A to show the specific KPI. In another example, the user may select sectors 1220A and 1222A corresponding to "Daytime" and "Weekend" daypart types in pie charts 1204. In some embodiments, upon receiving the user's selection of sectors 1220A and 122A, the GUI reconfigures the plurality of charts as shown in diagram 1200B of FIG. 12B.

In some embodiments, the GUI displays a chart 1210 including a curve that represents a relationship between impressions and costs corresponding to the selected plan 1202. Similar to the selectable graphical elements in bar charts 1206A, chart 1210 may include a selectable graphical element that allows the user to view KPIs for the generated plan at a specific cost or impressions. For example, the selectable graphical element may be the line in chart 1210 that designates the current cost and corresponding impressions for the plan.

Figure 12B:
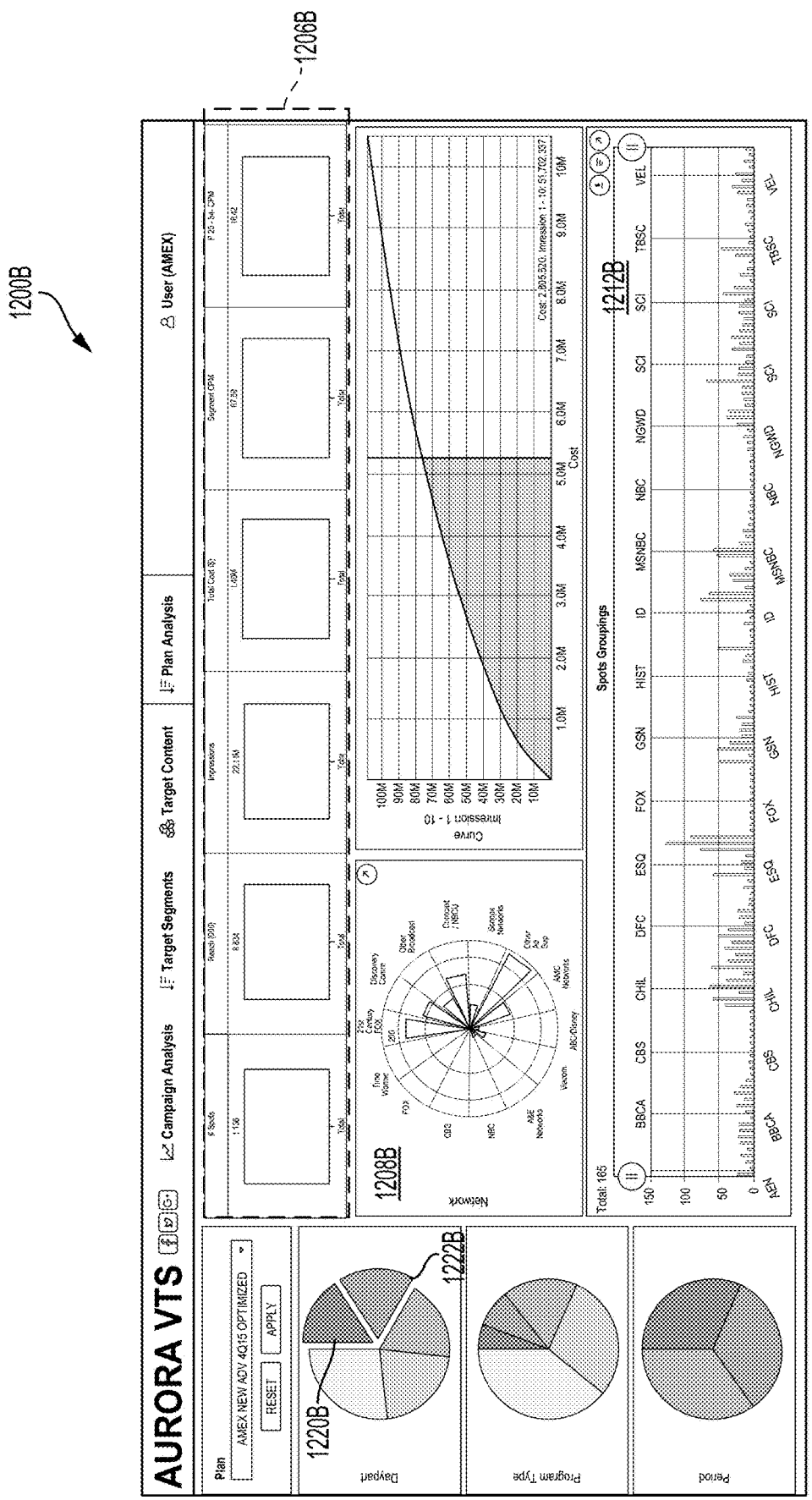

In some embodiments, as shown in FIG. 12B, the GUI emphasizes the selected sectors 1220B and 1222B and updates the bar charts 1206B of KPIs, polar area chart 1208B, and bar chart 1212B to correspond to spots that are associated with sectors 1220B or 1222B.

Figure 13:
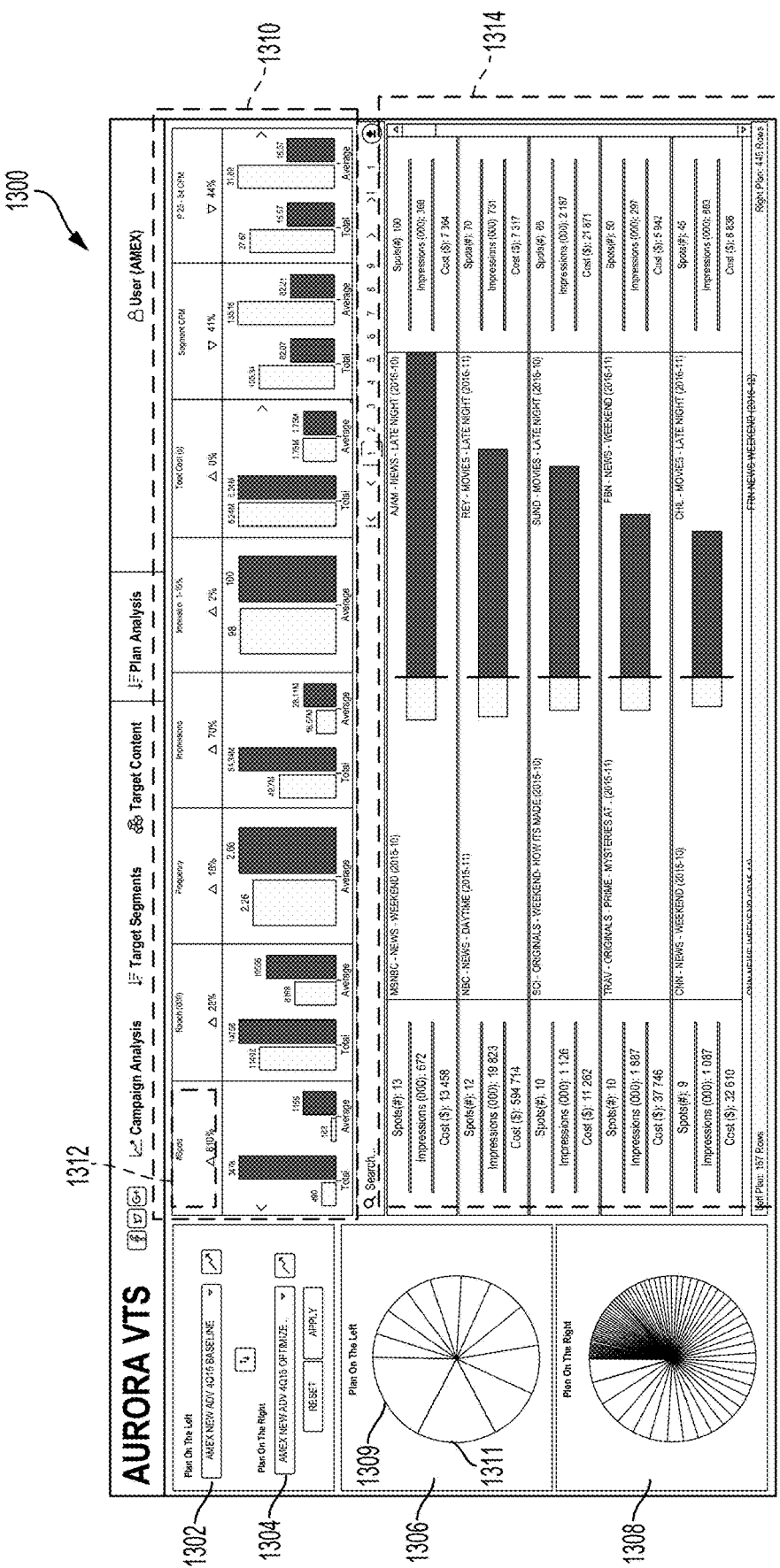
FIG. 13 is an example diagram that illustrates how a GUI configures a plurality of charts for graphically comparing two plans for an advertisement campaign, according to some embodiments.

FIG. 13 is an example diagram 1300 that illustrates how the GUI configures a plurality of charts for graphically comparing two plans for an advertisement campaign, according to some embodiments. In some embodiments, the GUI enables the user to select plans 1302 and 1304 for comparison. In some embodiments, the GUI displays a plurality of bar charts 1310 to graphically compare a plurality of KPIs between plan 1302 (light bar in each bar chart) and plan 1304 (dark bar in each bar chart). As described with respect to FIGS. 12A-B, the plurality of KPIs may include without limitation spots, reach, frequency, impressions, impression 1-10%, total cost, segment CPM, or P15-54 CPM. As shown in bar charts 1310, selected KPI 1312 may represent a KPI currently selected by the user. In some embodiments, selected KPI 1312 may be a default, selected KPI.

In some embodiments, the GUI displays pie charts 1306 and 1308 corresponding to plans 1302 and 1304, respectively. Each sector of pie charts 1306 and 1308 may represent a TV network selected within respective plan 1302 and 1304. In some embodiments, a size of a sector within pie charts 1306 and 1308 represents a quantity of selected KPI 1312. For example, sector 1309 may represent the SCI TV network selected for plan 1302 and having the largest number of spots, which corresponds to the selected KPI 1312 for spots. In some embodiments, the GUI configures pie charts 1306 and 1308 to show sectors in order of decreasing size.

In some embodiments, the GUI displays tornado chart 1314 that graphically depicts quantities for selected KPI 1312 across a plurality of TV networks. For example, the light bars may represent a quantity of spots for each TV program of plan 1302 and the dark bars may represent a quantity of spots for each TV program of plan 1304. In some embodiments, the GUI configures tornado chart 1314 to prioritize TV programs with higher quantities. Also indicated in tornado chart 1314 are the number of TV programs selected in each plan 1302 and 1304. In the example depicted in diagram 1300, plan 1302 includes 490 spots distributed across 157 TV programs (i.e., 157 rows), and plan 1304 includes 3463 spots distributed across 443 TV programs (i.e., 443 rows).

In some embodiments, one or more of the graphical elements in pie charts 1306 and 1308 may be selected by the user to filter the TV viewership data for display. Upon detecting a user's selection of a graphical element, the GUI reconfigures one or more charts to correspond to the user's selection. For example, the user may select sectors 1309 and 1311 corresponding to TV networks SCI and CNN, respectively. Then, the GUI may reconfigure tornado chart 1314 to depict chart 1414A, an updated version of tornado chart 1314, as shown in diagram 1400A of FIG. 14A.

FIGS. 14A-H are example diagrams 1400A-H that illustrate how the GUI configures a plurality of charts for graphically comparing two plans for an advertisement campaign, according to some embodiments. The two plans 1402 and 1404 selected by the user for comparison may correspond to plans 1302 and 1304 as described with respect to FIG. 13. In some embodiments, the GUI configures chart 1414A-H to represent quantities associated with a selected KPI 1412A-H. In some embodiments, the GUI may further configure charts 1414A-F based on one or more sectors selected from pie charts 1416A-F. For example, the GUI may apply a filter to charts 1414A-F where the one or more selected sectors represent the filter criteria.

Figure 14A:
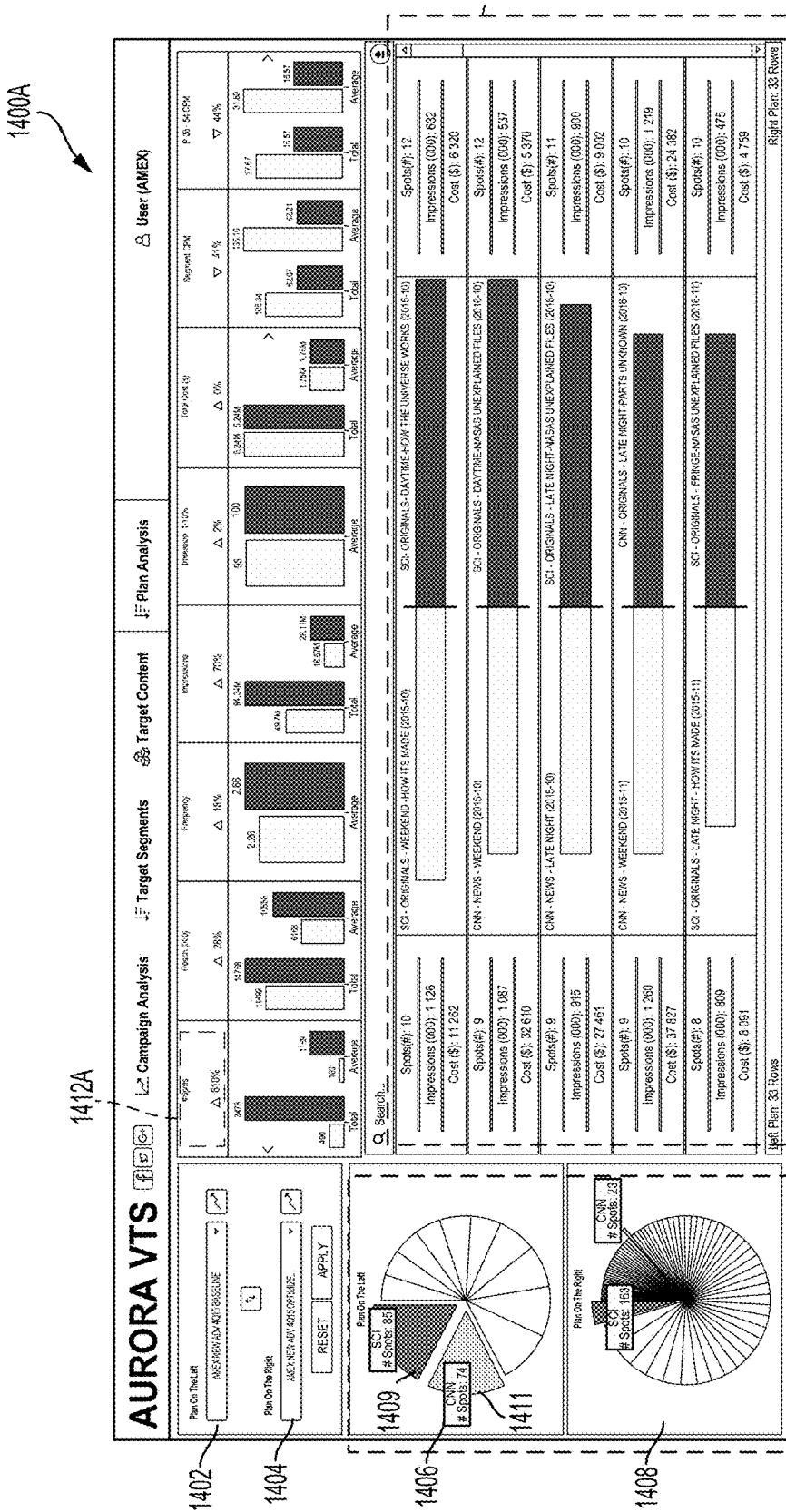
FIG. 14A is an example diagram that illustrates how a GUI configures a plurality of charts for graphically comparing two plans for an advertisement campaign, according to some embodiments.
Figure 14B:
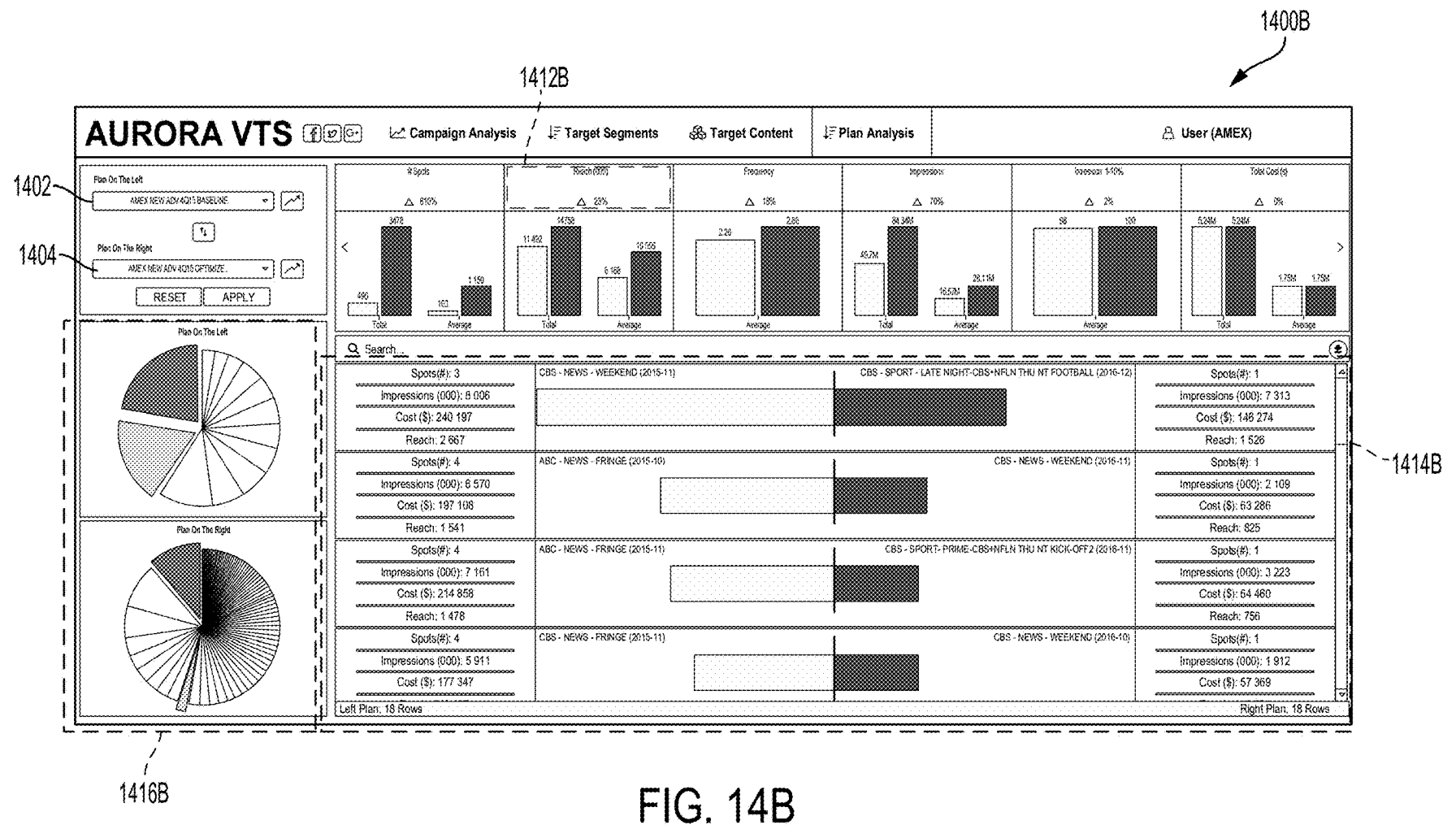

For example, FIG. 14A is an example diagram 1400A that includes chart 1414A for selected KPI 1412A of number of spots. Therefore, the GUI may configure chart 1414A as a tornado chart that graphically depicts a number of spots selected by the two plans for a plurality of selected TV networks. Further, as shown in pie chart 1406 of diagram 1400A, the user may select sectors 1409 and 1411 corresponding to the TV networks SCI and CNN. In some embodiments, the GUI filters the results shown in chart 1414A based on the selected one or more sectors. Accordingly, while tornado chart 1314 from FIG. 13 includes TV programs from a plurality of TV networks including, for example, MSNBC, NBC, SCI, TRAV, and CNN, chart 1414A may include only TV programs broadcasted by SCI or CNN.

In some embodiments, in response to receiving a user's selection of a sector, the GUI emphasizes the selected sector. For example, the GUI may separate selected sectors 1409 and 1411 from pie chart 1406. In some embodiments, the GUI may similarly emphasize corresponding sectors in pie chart 1408. As discussed with respect to FIG. 13, pie charts 1406 and 1408 may correspond to plans 1402 and 1404, respectively.

Similar to FIG. 14A, FIGS. 14B-F are example diagrams 1400B-F that illustrate how the GUI configures respective charts 1414B—F based on respective selected KPIs 1412B-F and filtered according to one or more sectors selected from pie charts 1416B-1416-F. For example, in diagram 1400B of FIG. 14B, selected KPI 1412B may be reach. In this example, the GUI configures chart 1414B to display a tornado chart that compares the reach quantities for TV programs selected by plan 1402 and for TV programs selected by plan 1404. Further, the GUI may configure pie charts 1416B to proportionally compare reach quantities across a plurality of TV networks selected in each plan. For example, the upper pie chart shows proportional reach for TV networks selected by plan 1402. As shown in diagram 1400B, plan 1404 has a higher total and average reach compared to plan 1402 at similar total costs.

Figure 14C:
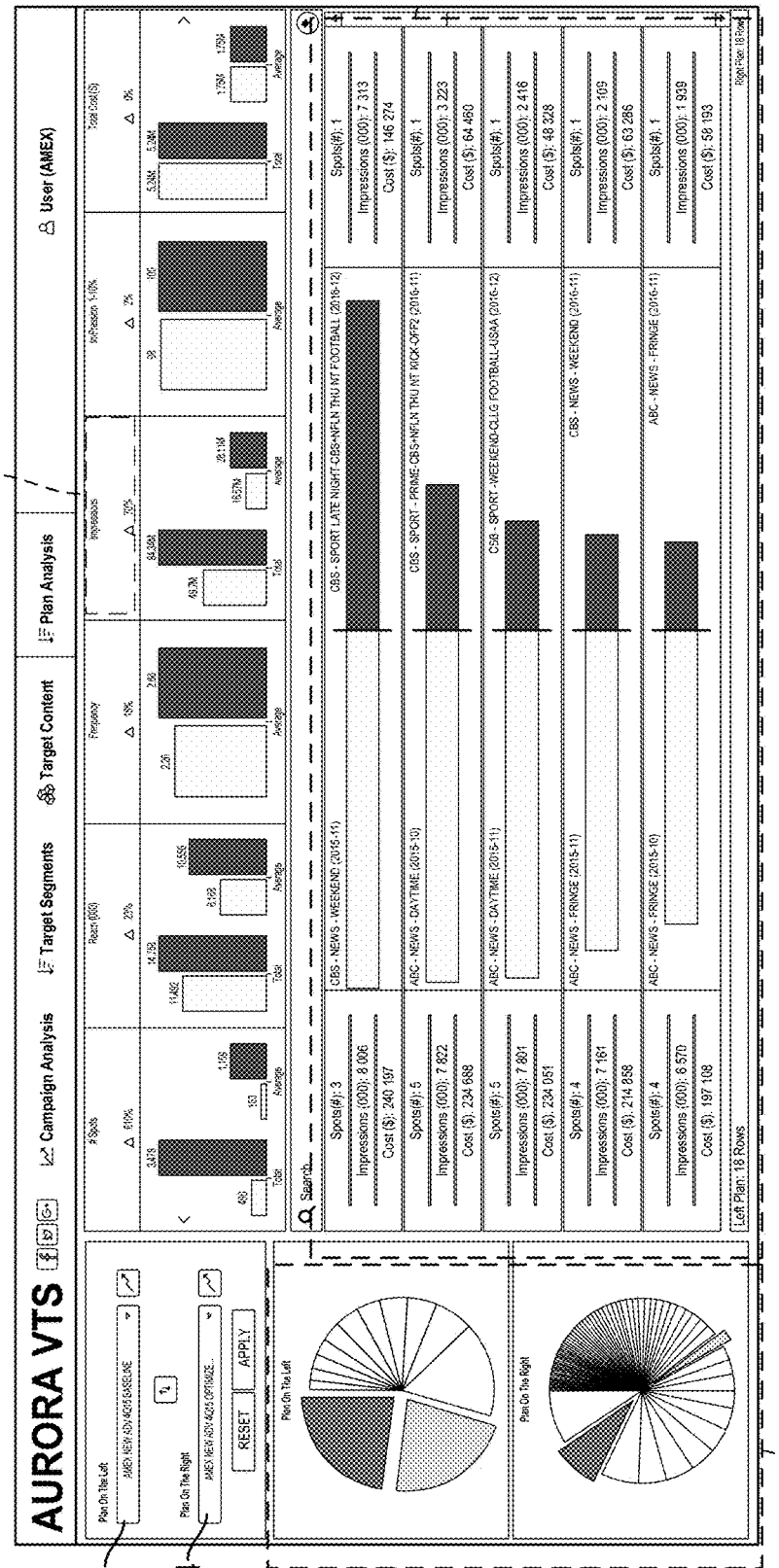

In example diagram 1400C of FIG. 14C, selected KPI 1412C may be impressions and the GUI may configure chart 1414C and pie charts 1416C with respect to impressions. As shown in diagram 1400C, plan 1404 has a higher total and average impressions compared to plan 1402 at similar total costs.

Figure 14D:
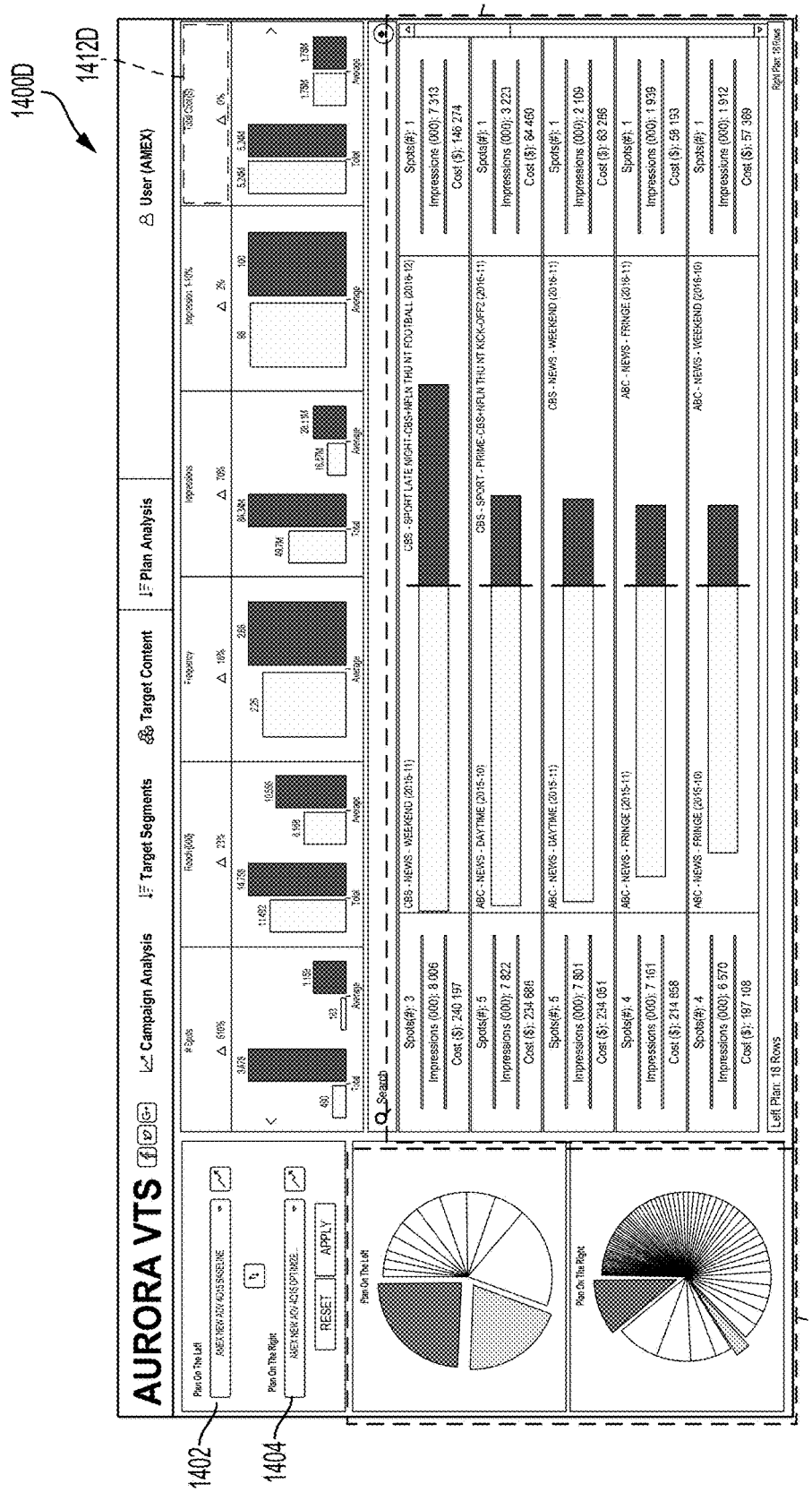

In example diagram 1400D of FIG. 14D, selected KPI 1412D may be total cost and the GUI may configure chart 1414C and pie charts 1416C with respect to total costs.

Figure 14E:
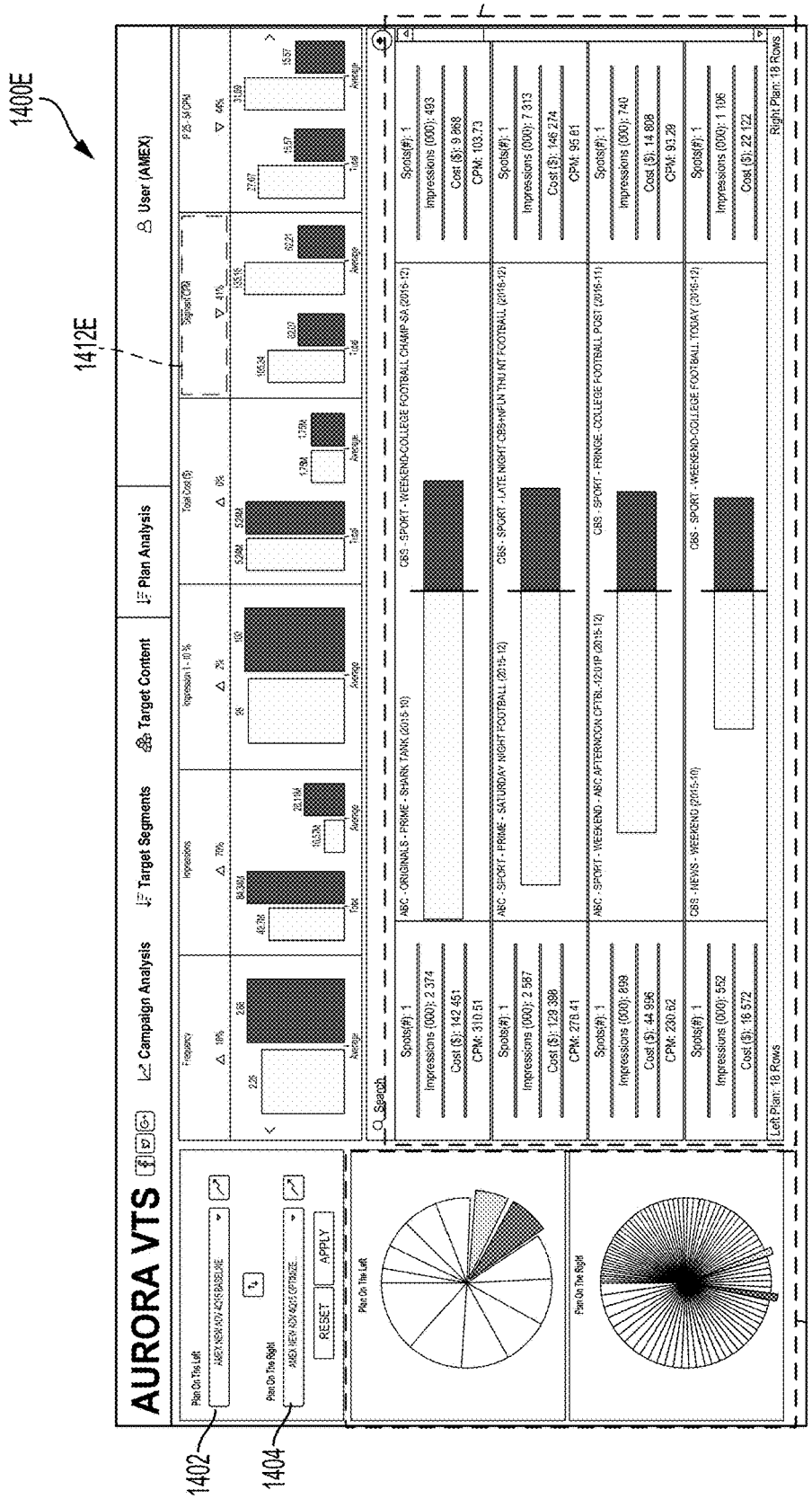

In example diagram 1400E of FIG. 14E, selected KPI 1412E may be segment CPM and the GUI may configure chart 1414E and pie charts 1416E with respect to segment CPM. As shown in diagram 1400E, plan 1404 has a lower total and average segment CPM compared to plan 1402 at similar total costs.

Figure 14F:
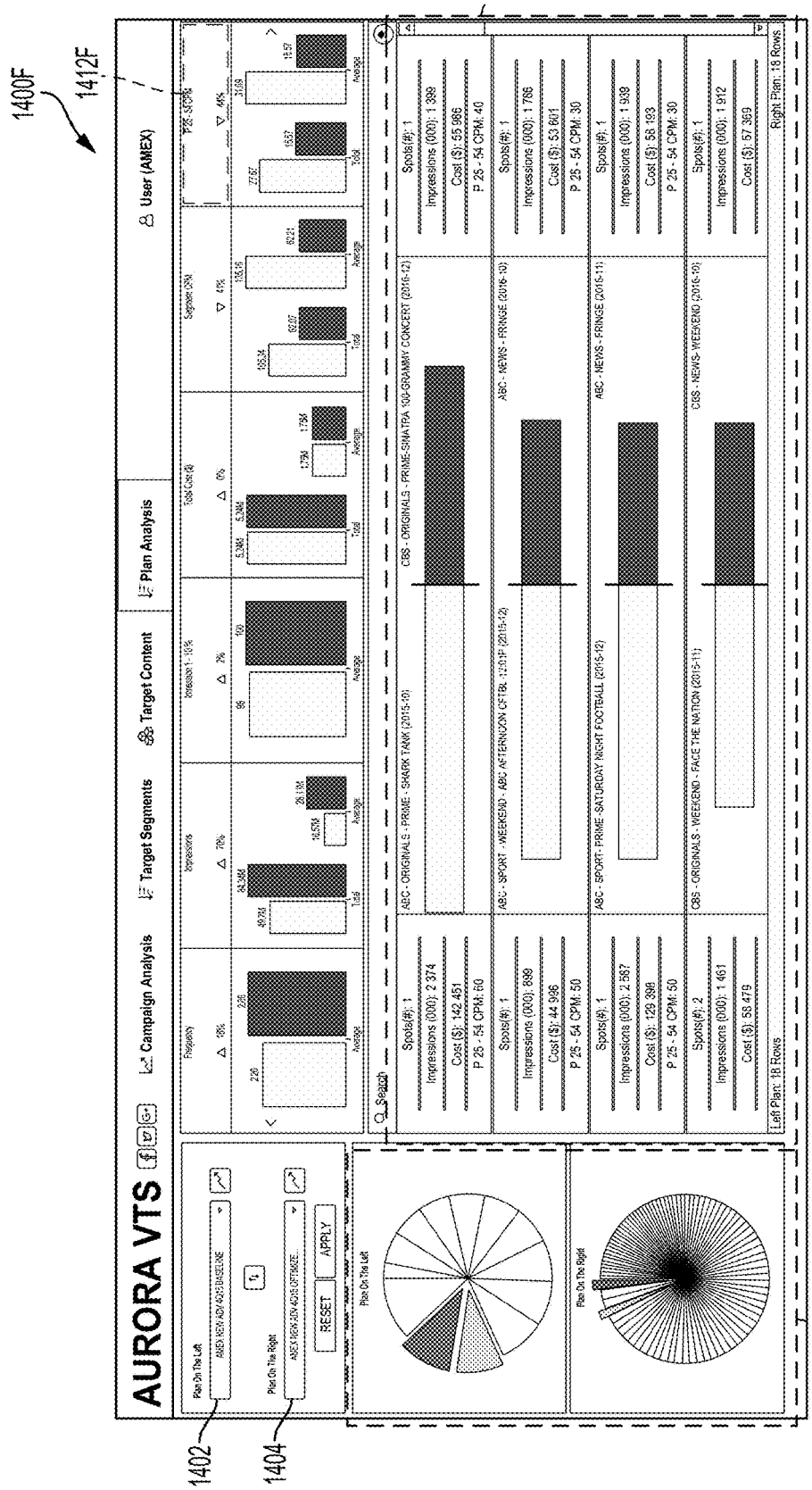

In example diagram 1400F of FIG. 14F, selected KPI 1412F may be P25-54 CPM and the GUI may configure chart 1414C and pie charts 1416C with respect to P25-54 CPM. As shown in diagram 1400F, plan 1404 has a lower total and average P25-54 CPM compared to plan 1402 at similar total costs.

Figure 14G:
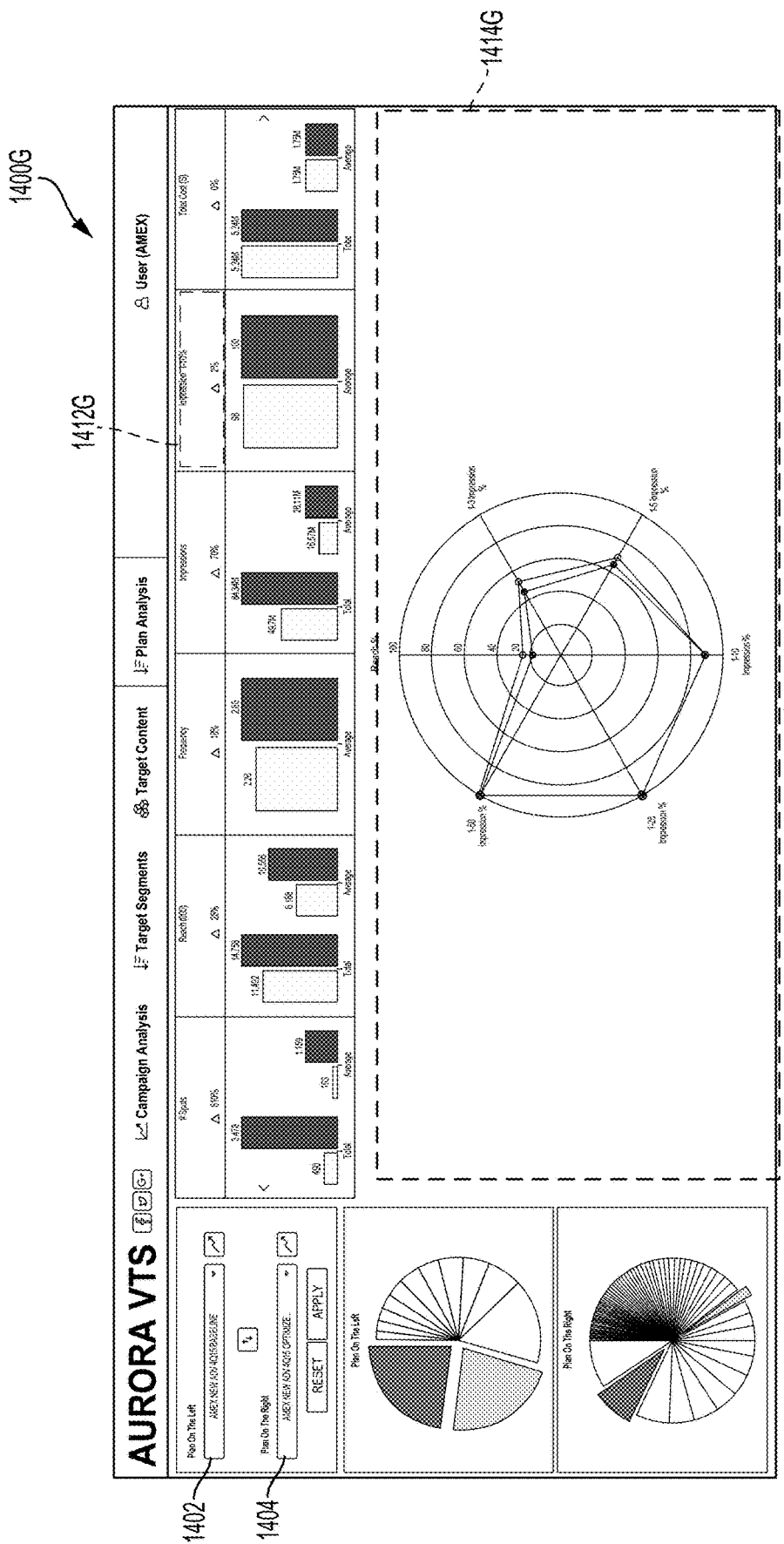

In FIG. 14G, diagram 1400G shows selected KPI 1412G as impression 1-10%, according to some embodiments. In this embodiment, the GUI configures radar chart 1414G to graphically compare the impression 1-10% between plans 1402 and 1404.

Figure 14H:
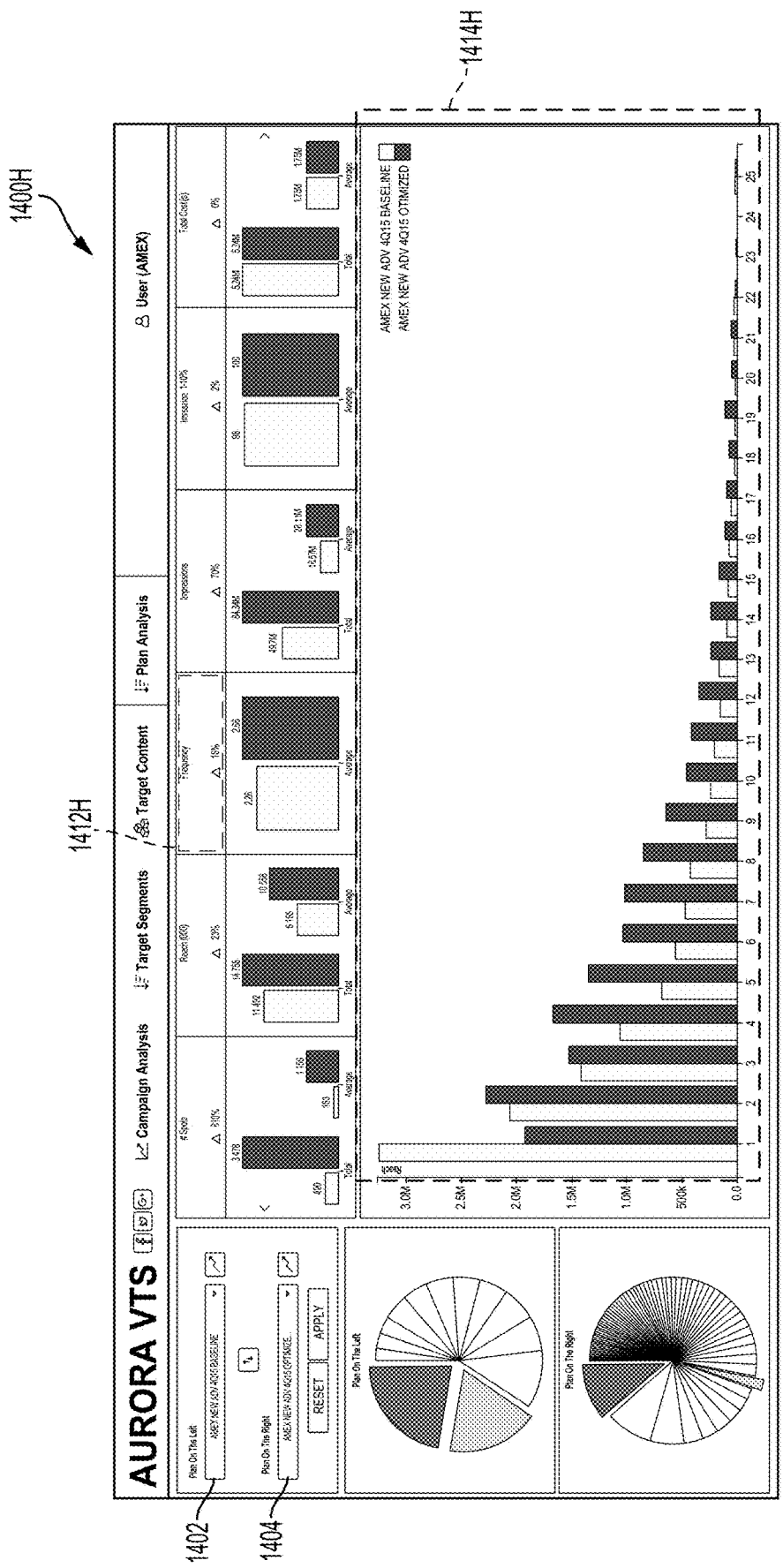

In FIG. 14H, diagram 1400H shows selected KPI 1412G as frequency, according to some embodiments. In this embodiment, the GUI configures bar chart 1414H to graphically compare the frequencies between plans 1402 and 1404. As shown in diagram 1400H, plan 1404 has a higher average frequency compared to plan 1402 at similar total costs.

Figure 15:
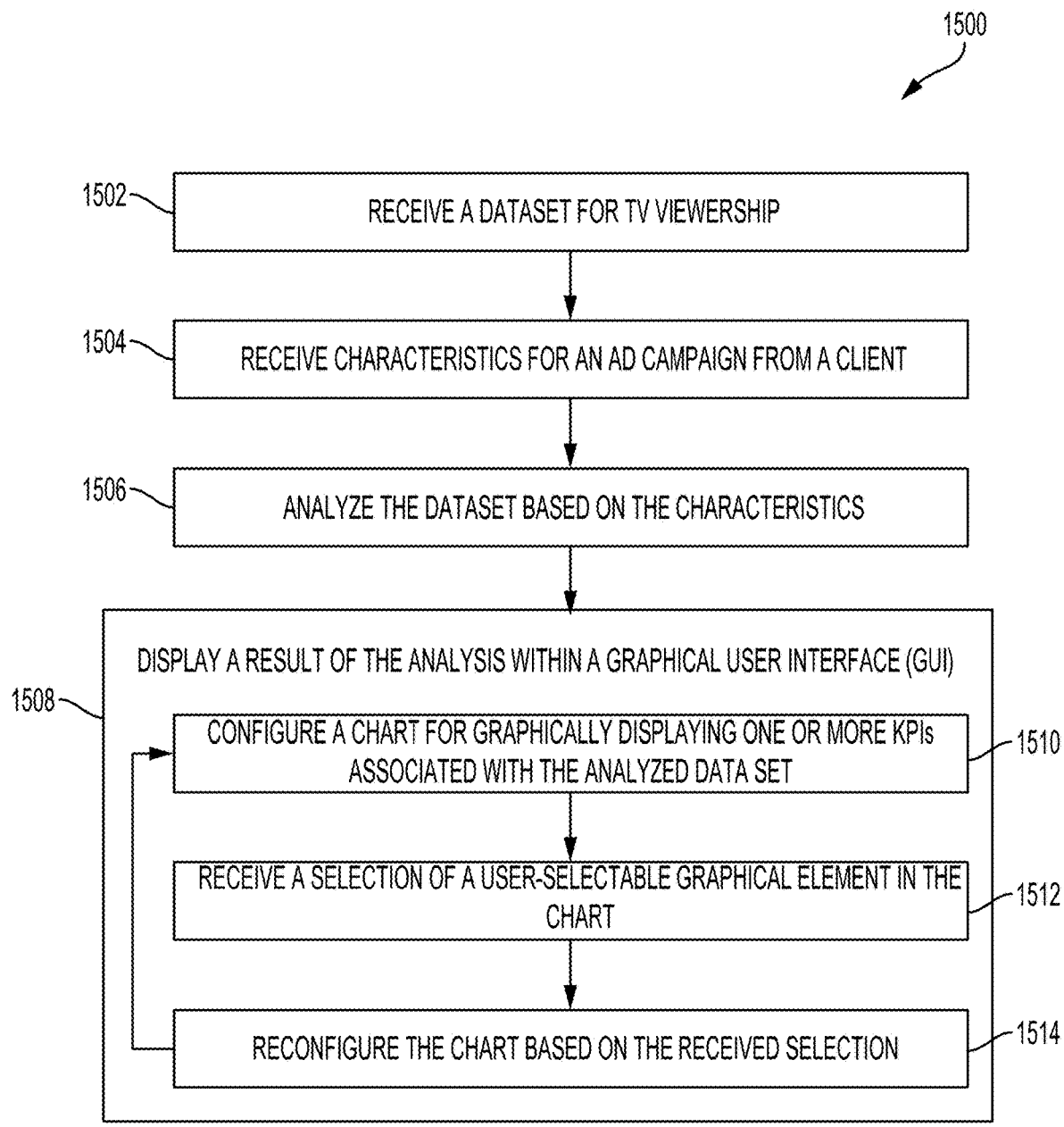
FIG. 15 is a flowchart illustrating a method for graphically displaying TV viewership data, according to some embodiments.

FIG. 15 is a flowchart illustrating a method 1500 for graphically displaying TV viewership data, according to some embodiments. Method 1500 may, for example, be implemented by components within a TV viewership data management system (DMS) such as DMS 120 of FIG. 1. In some embodiments, a non-transitory computer readable storage medium stores one or more programs configured to be executed by one or more processors of the DMS, the one or more programs including instructions for implementing any of the steps described with respect to FIG. 15.

In step 1502, the DMS receives a dataset for TV viewership. For example, the dataset may be received from a TV viewership data source 140 of FIG. 1, such as Nielsen, Acxiom, and the like.

In step 1504, the DMS receives characteristics for an ad campaign from a client (e.g., client 102). In some embodiments, the characteristics include campaign attributes or audience attributes, as described with respect to FIGS. 2A-B.

In step 1506, the DMS analyzes the dataset based on the received characteristics. In some embodiments, the DMS filters the dataset based on the received characteristics.

In step 1508, the DMS displays results of the analysis within a graphical user interface (e.g., GUIs described with respect to FIGS. 2-14). In some embodiments, step 1508 includes steps 1510-1514.

In general, in step 1510, the GUI configures a chart for graphically displaying one or more KPIs associated with the analyzed dataset of TV viewership data. In step 1512, the GUI receives a selection of a user-selectable graphical element within the chart. For example, the GUI may receive the selection from a user operating the GUI. In step 1516, the GUI reconfigures the chart based on the received selection of the user-selectable graphical element. In some embodiments, the GUI filters data for displaying in the chart based on the received selection. In some embodiments, the GUI configures a plurality of charts based on the received selection. Examples for a GUI that reconfigures one or more charts based on a user's selection of a user-selectable graphical element are described with respect to FIGS. 2-14.

Figure 16:
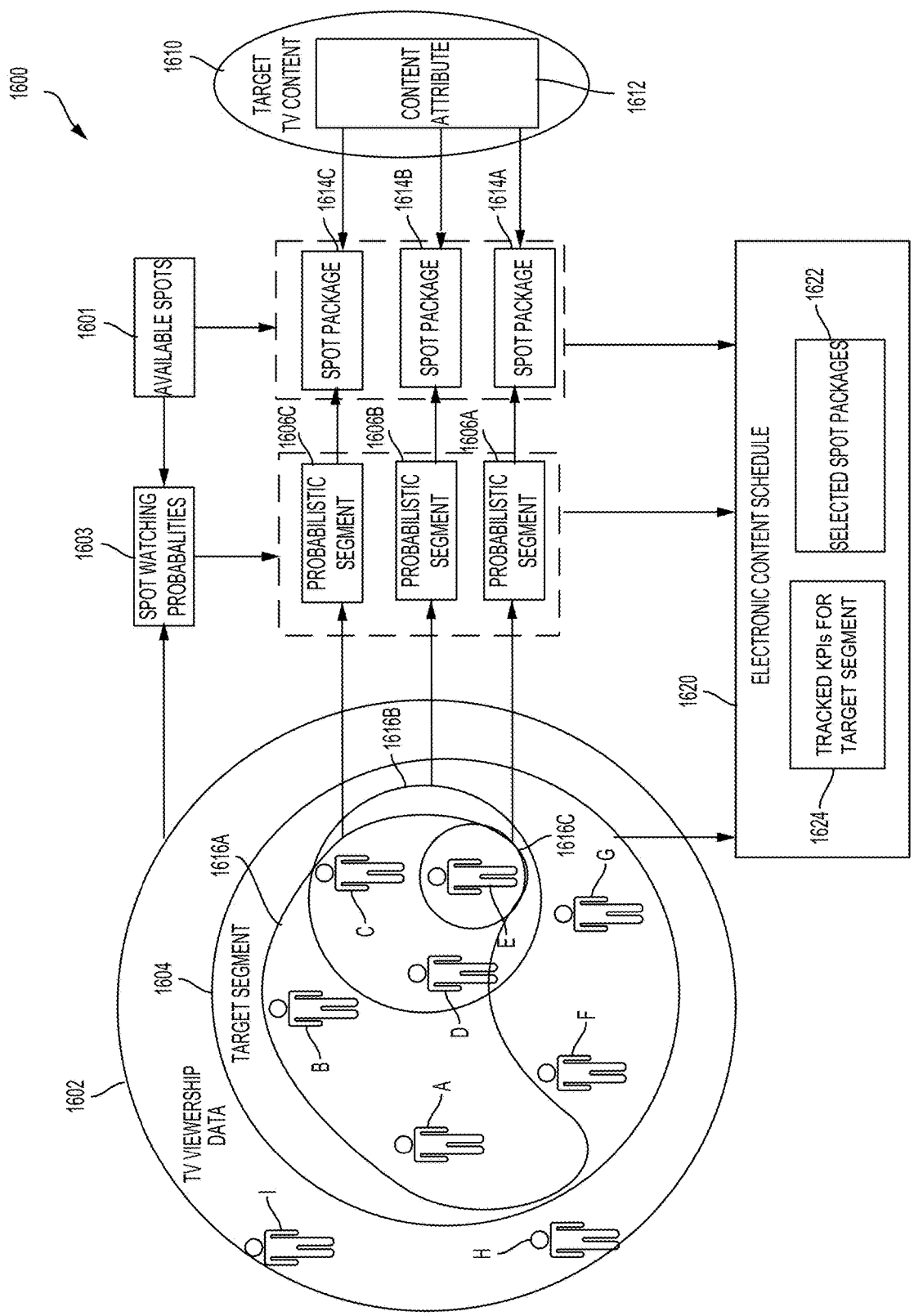
FIG. 16 is a diagram that shows how a DMS processes TV viewership data to generate an electronic content schedule based on target TV content, according to some embodiments.

FIG. 16 is a diagram 1600 that shows how a DMS processes TV viewership data 1602 to generate an electronic content schedule 1620 based on target TV content 1610 and available spots 1601, according to some embodiments. As shown in diagram 1600, electronic content schedule 1620 includes selected spot packages 1622 comprising one or more of available spots 1601. In some embodiments, TV viewership data 1602 can be received from TV viewership data source 104 as described with respect to FIG. 1. In some embodiments, TV viewership data 1602 includes one or more data files storing historic TV viewing data of a plurality of individuals A-I. In some embodiments, TV viewership data 1602 can include one or more files that store descriptive data for individuals A-I.

In some embodiments, TV viewing data can include the TV program or network that each individual is watching per predefined period of time. For example, the TV viewing data may include minute-by-minute TV viewing data or second-by-second TV viewing data for each individual. In some embodiments, the descriptive data can include demographic and behavioral data for each individual. For example, demographic data may include one or more of the following: an age, an age range, a geographic territory, a time zone, an income, an income range, a gender, an education level, a race, an occupation, a job title, a spoken language, a telephone status, a head of household status, etc. In some embodiments, behavioral data can include buying behavior, preferences for particular products, or level of usage of types of goods or services (e.g., frequency or heavy vs light user etc.). For example, behavioral data may include whether an individual visits the doctor's office, movie theatres, fast food restaurants, among other types of services and the frequency of such visits. Further, behavioral data may include the individual's preference or use of specific brands of household goods, cell carriers, hotels, grocery stores, etc. as well as the level of usage of such goods.

In some embodiments, each of individuals A-I shown in TV viewership data 1602 represents a plurality of records associated with that individual. For example, a record may include an ID specifying an individual and the record may include TV viewing behavior (e.g., which TV program being watched) of the individual in a specified time period (e.g., in a specific minute).

In some embodiments, TV viewership data 1602 includes a scaling factor for each of individuals A-I that represents how many people each of individuals A-I represents. For example, a scaling factor of 3 associated with individual I may indicate that the data stored for individual I may be representative of 3 million people. In some embodiments, the scaling factor for each of individuals A-I can be adjusted on a periodic basis (e.g., daily or weekly, etc.).

In some embodiments, the DMS receives target audience criteria that indicate the type of individual a user wishes to reach. For example, the DMS may receive the target audience criteria from the user via client 102 as described with respect to FIG. 1. In some embodiments, the user can select the target audience criteria via a GUI generated by GUI generator 124 as described with respect to FIGS. 1, 2B, and 7A-D.

In some embodiments, the DMS analyzes TV viewership data 1602 based on the received target audience criteria to identify a target segment 1604 representing the viewers the user wishes to broadcast content. For example, the DMS may select individuals A-G from individuals A-I based on the target audience criteria to comprise target segment 1604. In some embodiments, an individual from TV viewership is selected if descriptive data associated with that individual matches the target audience criteria. As described above, an individual in TV viewership data 1602 may be representative of a plurality of records. So, selecting individuals A-G to generate target segment 1604 can be selecting records associated with individuals A-G, according to some embodiments.

In some embodiments, the DMS receives target TV content 1610 selected by a user and used by DMS to generate electronic content schedule 1620. In some embodiments, target TV content 1610 includes a plurality of content attributes such as content attribute 1612. Content attribute 1612 may include one or more criteria that describe the type of TV program the user wishes to broadcast content-of-interest. In some embodiments, a content attribute can specify a TV network, a program type on the TV network, a specific TV program on the TV network, or a combination thereof. In some embodiments, a content attribute can specify a daypart type or a time interval within a day. For example, content attribute 1612 may indicate a Game of Thrones TV series being broadcast on the TV network HBO. In some embodiments, content attributes such as content attribute 1612 may be input by the user via a GUI such as the GUI as described with respect to FIG. 10.

In some embodiments, the DMS generates a plurality of spot packages for each content attribute in target TV content 1610 where each spot package includes a portion of spots from a plurality of available spots 1601 for broadcasting content-of-interest. In some embodiments, target TV content 1610 specified by the user can be used by the DMS to filter the plurality of available spots 1601 to reduce the amount of computation needed to generate electronic content schedule 1620. In some embodiments, the plurality of available spots 1601 can be received from TV slot suppliers 110 as described with respect to FIG. 1. In some embodiments, the DMS generates a plurality of spot packages 1614A-C associated with content attribute 1612 and each having a different predefined number of spots selected from available spots associated with content attribute 1612. For example, content attribute 1612 may indicate the Game of Thrones TV series having 100 available spots for broadcasting content-of-interest. The DMS may generate spot packages 1614A, 1614B, and 1614C to include respective selections of one, two, and three spots from the 100 available spots.

In some embodiments, to enable the DMS to select one or more spot packages to form electronic content schedule 1620, based on the historic TV viewing data of TV viewership data 1602, the DMS can calculate and store spot watching probabilistic 1603 for each of individuals A-I for each of available spots 1601. For example, available spots 1601 may include: a first spot associated with Game of Thrones, and a second spot associated with Thursday night football. In this example, the DMS may calculate and store spot watching probabilistic 1603 of 5% and 90% for the likelihood of individual A watching the first and second spots, respectively. In some embodiments, spot watching probabilities 1603 include probabilities calculated for each of individuals A-I for each TV program associated with available spots 1601.

In some embodiments, to determine whether to add a specific spot package to electronic content schedule 1620, the DMS analyzes the incremental value of adding each of spot packages 1614A-C to electronic content schedule 1620. To analyze the incremental value, the DMS creates probabilistic segments 1606A-C for corresponding spot packages 1614A-C based on spot watching probabilities 1603, according to some embodiments. In some embodiments, a probabilistic segment represents a statistically calculated group of individuals that will watch one or more spots from the spot package. Further, the probabilistic segment includes statistically calculated KPIs for the group of individuals. In some embodiments, the KPIs can include the following indicators calculated for the group of individuals: a reach, a frequency distribution, a gross impressions, a CPM, a total cost of the spot package, minutes of spots watched, an average minutes of spots watched, or a combination thereof. In some embodiments, the KPIs include at least a reach, a frequency distribution, a CPM, and gross impressions. In some embodiments, probabilistic segments 1606A-C include independent KPIs that are calculated independent of selected spot packages 1622 in electronic content schedule 1620.

For example, a probabilistic segment 1606A calculated for spot package 1614A (e.g., selecting one spot from 100 available spots) may include individual E (i.e., selection 1616C) watching that one spot. In this example, the reach is 1, the frequency distribution is 1, and gross impressions is 1. In some embodiments, the calculated KPIs may be adjusted based on a scaling factor associated with the individual. Similarly, a probabilistic segment 1606B calculated for spot package 1614B (e.g., selecting two spots from the same 100 available spots) may include individuals C-E (i.e., selection 1616B) and a probabilistic segment 1606C (e.g., selecting three spots from the same 100 available spots) calculated for spot package 1614C may include individuals A-E (i.e., selection 1616A). In this example, probabilistic segment 1606B, may include individual E that watched both spots in the spot package, individual D that watched a first spot from the spot package, and individual C that watched a second spot from the spot package. Therefore, KPIs for this exemplary probabilistic segment 1606B may be a reach of 3, a frequency distribution of reaching 3 individuals C-E at least once and reaching 1 individual E twice, and gross impressions of 4. Again, these values may be scaled based on the scaling factors associated with the selection of individuals 1616B in probabilistic segment 1606B.

In some embodiments, the DMS analyzes spot packages 1614A-C by generating corresponding scores representing an incremental value for adding a spot package to electronic content schedule 1620. In some embodiments, the DMS can calculate a score for spot package 1614A based on dependent KPIs calculated based on the KPIs stored in corresponding probabilistic segment 1606A and based on tracked KPIs for target segment 1624. For example, the DMS may combine tracked KPIs 1624 with KPIs in probabilistic segment 1606A. Then, the DMS may weigh and sum each of the combined KPIs to generate the score. For example, the DMS may sum one or more of a weighted gross impressions, a weighted CPM, a weighted reach, or a weighted frequency distribution among other weighted KPIs. In some embodiments, the DMS may generate the weightings for the KPIs based on priorities for KPIs received from the user, as described with respect to FIG. 11A. Note that the weighted CPM may have a negative value because a higher cost is undesirable.

Based on the methodology discussed above, the DMS may generate scores of 0.2, 0.75, and 0.50 for respective spot packages 1614A, 1614B, and 1614C. As discussed above, spot packages 1614A-C may correspond to respective selections of 1, 2, and 3 spots from 100 available spots. Therefore, spot package 1614B may have a higher score than spot package 1614A because more viewers are likely to watch at least one of two spots, which results in higher reach, frequency, and gross impressions. However, in this example, spot package 1614B may also have a higher score than spot package 1614C because the additional reach, frequency, and gross impressions provided by selecting 3 instead of 2 spots may not outweigh the costs associated with spot package 1614C as compared to spot package 1614B. Therefore, in this example, the DMS may add spot package 1614B having the highest score to selected spot packages 1622 in electronic content schedule. In some embodiments, the DMS updates tracked KPIs 1624 for selection of individuals 1616B associated with spot package 1614B. For example, the DMS may add KPIs stored in probabilistic segment 1606B to tracked KPIs for target segment 1624.

In some embodiments, to improve the processing speed of DMS, the DMS may compute pre-selection scores corresponding to spot packages 1614A-C. In these embodiments, the pre-selection scores for spot packages 1614A-C may be computed based on the KPIs stored in probabilistic segments 1606A-C alone without considering tracked KPIs for target segment 1624. In these embodiments, the DMS may reduce a number of spot packages 1614A-C for assessment based on a pre-selection score threshold or selecting a predefined number of spot packages from spot packages 1614A-C having the highest pre-selection scores.

Figure 17:
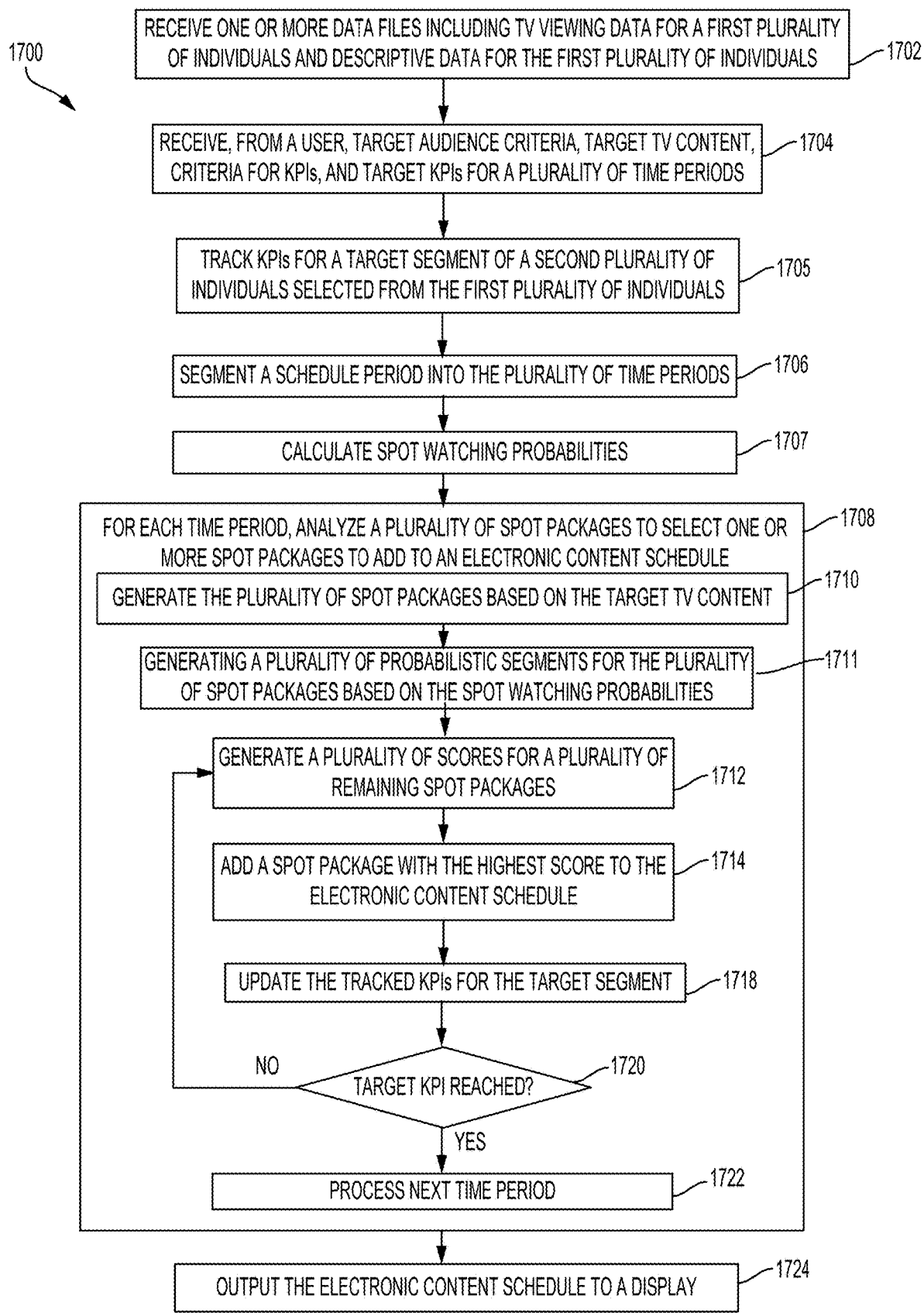
FIG. 17 is a flowchart of a method for creating an electronic content schedule, according to some embodiments.

FIG. 17 is a flowchart of a method 1700 for creating an electronic content schedule, according to some embodiments. In some embodiments, DMS 120 from FIG. 1 can perform method 1700. In some embodiments, the electronic content schedule being created includes one or more spots within one or more TV programs for broadcasting a specific content (i.e., content-of-interest). In some embodiments, the specific content includes a video content such as an advertisement. Method 1700 is described with respect to diagram 1600 of FIG. 16 for ease of explanation. In some embodiments, steps of method 1700 may not necessarily be performed in the order shown. For example, step 1707 may be performed before or after step 1706.

In step 1702, a DMS receives one or more data files including TV viewing data for a first plurality of individuals and descriptive data for the first plurality of individuals. For example, DMS 120 may receive the one or more data files from TV viewership data source 104 as described with respect to FIG. 1. For example, the one or more data files may comprise TV viewership data 1602 described with respect to FIG. 16. In some embodiments, the DMS receives one or more updated data files on a periodic basis (e.g., hourly, daily, weekly, etc.) so that the DMS can create the electronic content schedule 1620 based on the most recent data.

In step 1704, the DMS receives, from a user, target audience criteria, target TV content 1610, criteria for KPIs, and target KPIs for a plurality of time periods. In some embodiments, DMS 120 can receive inputs from the user via client 102, as described with respect to FIG. 1. In some embodiments, the user may input a target KPI for each time period from the plurality of time periods as described with respect to FIG. 11A. The target KPI for a time period may represent target impressions from the target audience or a target cost.

In some embodiments, the target audience criteria can include one or more attributes of the types of individuals the user wishes to show specific content. For example, the one or more attributes may be selected from the types of descriptive data stored for each individual in the one or more data files, as described in step 1702. In some embodiments, the DMS enables the user to inputting target audience criteria as described with respect to FIGS. 2B and 7A-D.

In some embodiments, the target TV content 1610 can be selected by the user and received by the DMS as described with respect to FIGS. 6 and 10. In some embodiments, target TV content 1610 includes a plurality of content attributes such as content attribute 1612 that may specify the TV network, the TV program type, or specific TV programs in which the user may be interested in broadcasting content-of-interest, as described with respect to FIG. 6.

In some embodiments, the criteria for KPIs can be selected by the user and received by the DMS as described with respect to FIGS. 6 and 10. In some embodiments, the criteria for KPIs include target values or ranges of CPM, frequency, reach, impressions, or a combination thereof. For example, criteria for frequency may include a target frequency distribution having target values for each frequency in the frequency distribution. In some embodiments, the criteria for KPIs can include a respective weight for each KPI that is selected by the user and used by the DMS in prioritizing certain KPIs in generating electronic content schedule 1622.

In step 1705, the DMS tracks KPIs 1624 for a target segment of a second plurality of individuals selected from the first plurality of individuals described with respect to step 1702. In some embodiments, the second plurality of individuals in target segment 1604 are individuals whose descriptive data matches the target audience criteria input by the user in step 1704. In some embodiments, the KPIs being tracked may include one or more of the following indicators calculated with respect to the second plurality of individuals: a frequency distribution, a reach, gross impressions, and a CPM.

In step 1706, the DMS segments a schedule period into a plurality of time periods. In some embodiments, the DMS can receive the schedule period (e.g., a campaign period) from the user, for example, via GUI 200 as described with respect to FIG. 2. In some embodiments, the plurality of time periods may be determined based on a time interval selected by the user. For example, based on the user's selection, each time period may be a week or a month, etc. In some embodiments, the DMS segments the schedule period to calculate certain KPIs such as frequency which may represent a number of times a viewer watches a specific content per time period.

In step 1707, the DMS calculates spot watching probabilities 1603 based on the one or more files (e.g., TV viewership data 1602) and available spots 1601 provided by TV suppliers. For example, the DMS may calculate, for each individual in TV viewership data 1602, a probability for each of available spots 1601 where the probability represents a likelihood of that individual watching that spot. In some embodiments, spot watching probabilities 1603 include a plurality of probabilities for each individual where each probability represents a likelihood that the individual watches a TV program associated with available spots 1601.

In step 1708, for each time period, the DMS analyzes a plurality of spot packages 1614A-C to select one or more spot package to add to electronic content schedule 1620. In some embodiments, the one or more spot packages may be stored as selected spot packages 1622 in electronic content schedule 1620. In some embodiments, the KPIs being tracked in step 1705 can be updated based on the one or more spot packages being selected and added to electronic content schedule 1620. In some embodiments, steps 1710-1722 can be performed for each time period.

In step 1710, the DMS generates the plurality of spot packages based on the target TV content received in step 1704. In some embodiments, the DMS generates spot packages 1614A-C to include a specific number of spots, within the time period being analyzed, associated with a content attribute from target TV content 1610. The spots may be selected from a plurality of available spots 1601 received from a TV slot supplier, e.g., TV slot suppliers 110. In some embodiments, as discussed above, a spot package may include one or more spots within or associated with a TV program or TV network. In some embodiments, the spot package specifies a predefined number of spots within or associated with the TV program or the TV network.

In step 1711, the DMS calculates a plurality of probabilistic segments for the plurality of spot packages based on spot watching probabilities 1603 calculated in step 1707. In some embodiments, the DMS calculates a probabilistic segment for each spot package. In some embodiments, as described with respect to FIG. 16, a probabilistic segment associated with a spot package includes a statistically generated group of individuals from target segment 1604 that will watch one or more spots in the spot package. Further, the probabilistic segment includes KPIs calculated for the group of individuals.

In step 1712, the DMS generates a plurality of scores for a plurality of corresponding, remaining spot packages from the plurality of spot packages generated in step 1710. In some embodiments, to generate a score for a spot package, the DMS can calculate the score with respect to KPIs in a probabilistic segment of the spot package and with respect to the KPIs of the target segment tracked in step 1705. In some embodiments, the score can be calculated by the DMS based on weighted values of a reach, a frequency distribution, and a CPM.

In some embodiments, to reduce the number of spot packages to analyze from the plurality of spot packages generated in step 1710, the DMS can first generate a pre-assessment score for each spot package where the pre-assessment score is generated independent of the spot packages 1622 already added to electronic content schedule 1620. Then, the DMS may filter out spot packages with pre-assessment scores below a threshold, in some embodiments. In some embodiments, the DMS may select a predetermined number of spot packages having the highest pre-assessment scores for further processing.

In step 1714, the DMS adds a spot package, from the plurality of spot packages, with the highest score to electronic content schedule 1620. The added spot package may be stored as selected spot packages 1622 in electronic content schedule 1620.

In step 1718, the DMS updates the tracked KPIs 1624 for the target segment based on the spot package being added to electronic content schedule 1620.

In step 1720, the DMS determines whether the target KPI (e.g., gross impressions for target segment, cost etc.) for the time period is reached. If the target KPI is not reached, method 1700 returns to step 1712 where scores are generated for the remaining spot packages (i.e., excluding the spot package selected and added in step 1714). If the target value is reached, method 1700 processes the next time period in step 1722. In some embodiments, upon processing each time period, method 1700 proceeds to step 1724.

In step 1724, the DMS outputs electronic content schedule 1620 to a display. In some embodiments, electronic content schedule 1620 can be output on a display of client 102 as described with respect to FIG. 1. In some embodiments, electronic content schedule 1620 can be output by the DMS via a GUI such as GUIs 1200A-B as described with respect to FIGS. 12A-B. In some embodiments, one or more electronic content schedules can be generated based on different target audience criteria, target TV content, criteria for KPIs, or a combination thereof selected by the user. In some embodiments, the DMS can enable the user to compare the one or more generated electronic content schedules via a GUI such as GUI 1300 and GUIs 1400A-F as described with respect to FIG. 13 and FIGS. 14A-F, respectively.

Figure 18:
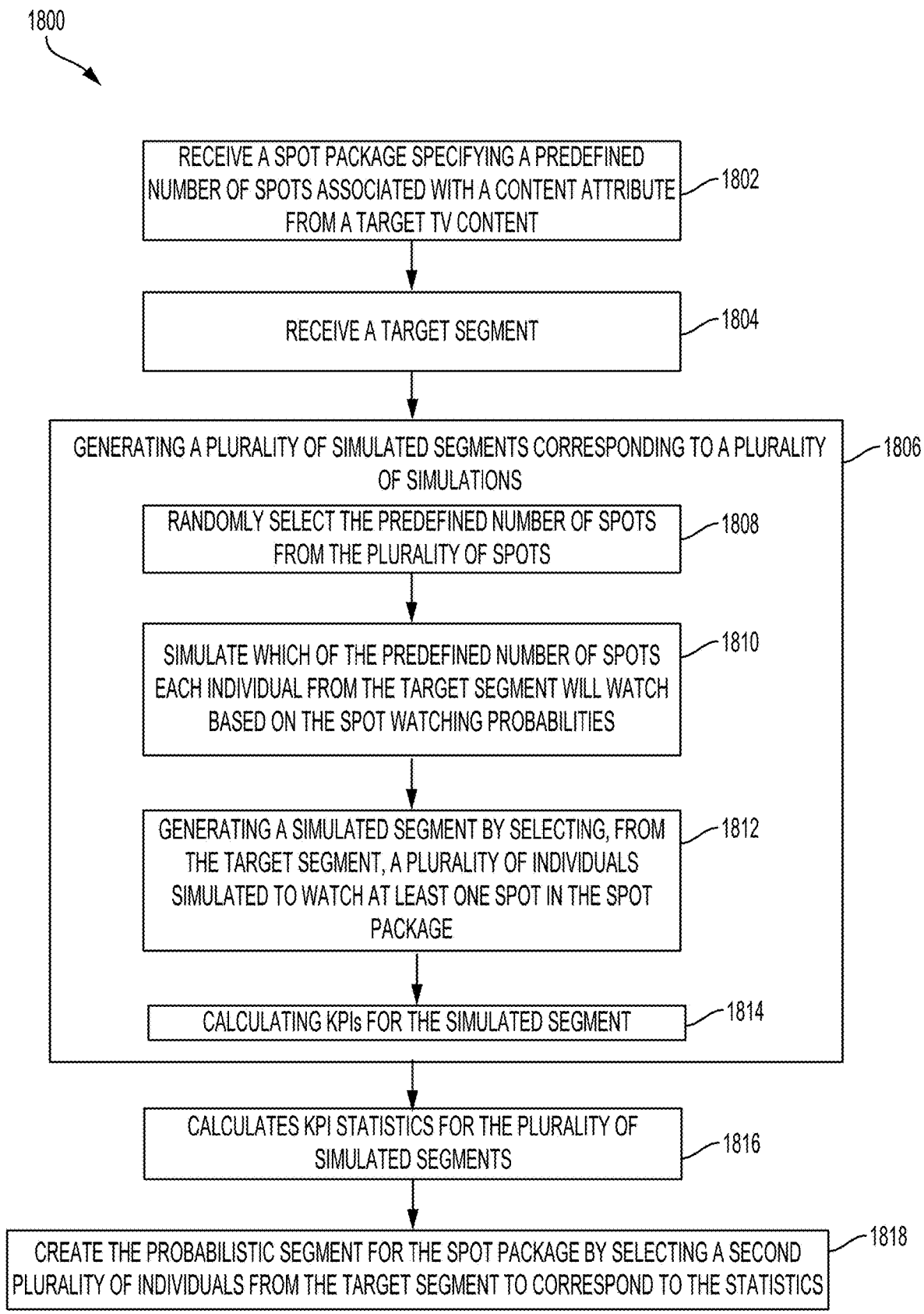
FIG. 18 is a flowchart of a method for generating a probabilistic segment for a spot package, according to some embodiments.

FIG. 18 is a flowchart of a method 1800 for generating a probabilistic segment for a spot package, according to some embodiments. In some embodiments, DMS 120 from FIG. 1 can perform method 1800. For clarity, steps of method 1800 may be described with respect to steps of method 1700 described with respect to FIG. 17. In some embodiments, method 1900 corresponds to creating the probabilistic segment as described in step 1711 of FIG. 17. In some embodiments, a DMS can implement Monte Carlo methods involving random simulations, as described below, to generate the probabilistic segment. In some embodiments, the probabilistic segment includes a subset of individuals selected from a target segment and KPIs calculated for that subset of individuals.

In step 1802, a DMS receives a spot package specifying a predefined number of spots from a plurality of spots associated with a content attribute from a target TV content. For example, step 1802 may correspond to a spot package generated in step 1710 as described with respect to FIG. 17. In some embodiments, the content attribute can be a TV program in the target TV content selected by the user.

In step 1804, the DMS receives a target segment. For example, the target segment may correspond to the target segment as described with respect to step 1705 of FIG. 17. In some embodiments, the target segment specifies a second plurality of individuals that are selected from a first plurality of individuals associated with TV viewing data received by the DMS, as described with respect to FIG. 16.

In step 1806, the DMS generates a plurality of simulated segments corresponding to a plurality of simulations. In some embodiments, the plurality of simulations corresponds to a predefined number of simulations set by the DMS or entered by the user. In some embodiments, the DMS performs steps 1808-1814 to generate each of the plurality of simulated segments. In some embodiments, the DMS performs Monte Carlo simulations based on spot watching probabilities calculated for each individual from the target segment.

In step 1808, the DMS randomly selects the predefined number of spots from a plurality of available spots associated with the spot package.

In step 1810, the DMS simulates which of the predefined number of spots, if any, each individual from the target segment will watch based on the spot watching probabilities. As described with respect to FIG. 16, spot watching probabilities for individuals in the target segment can be calculated based on historic TV viewership data. For example, for a spot from the predefined number of spots, the spot watching probabilities may include a probability of 90% that an individual A will watch that spot. Therefore, it may be possible that in a simulation, individual A may be simulated to not watch that spot. However, on average, over many simulations, individual A will be simulated to watch that spot 90% of the time.

In step 1812, the DMS generates a simulated segment for a simulation by selecting, from the target segment, a plurality of individuals simulated to watch at least one spot in the spot package.

In step 1814, the DMS calculates KPIs for the simulated segment of step 1812. In some embodiments, as described with respect to FIG. 16, the DMS can calculate reach, frequency distribution, CPM, gross impressions, among other KPIs for the plurality of individuals in the simulated segment.

In step 1816, the DMS calculates KPI statistics for the plurality of simulated segments based on the KPIs calculated for each simulated segment. In some embodiments, the statistics include average and variance values for reach, frequency, gross impressions, CPM, among other types of KPIs for the plurality of individuals in the simulated segment. In some embodiments, the statistics can include average and variance values for reach, frequency, gross impressions, CPM, among other types of KPIs for each individual in the simulated segment.

In step 1818, the DMS creates the probabilistic segment for the spot package by selecting a second plurality of individuals from the target segment to correspond to the statistics. For example, a target segment may include individuals A, B, and C. For a spot package having, for example, three selected spots, the calculated KPI statistics across 100 simulation runs may indicate average impressions of 2.7, 0.3, and 0.6 for individuals A, B, and C respectively. In this example, the DMS may determine expected impressions for the target segment watching one or more spots in the spot package to be 3, 0, and 1 for individuals A, B, and C, respectively. Therefore, the second plurality of individuals selected from the target segment may include individuals A and C watching at least one spot. In some embodiments, the created probabilistic segment includes KPIs for the second plurality of individuals. For example, in the example above, the DMS may calculate the KPIs to include gross impressions of 4 (i.e., 3 impressions from individual A and 1 impression from individual C), a reach of 2 (i.e., individuals A and C), and a frequency distribution of 2-1-1 (i.e., two individuals A and C watching at least one spot, one individual A watching at least two spots, and one individual C watching at least 3 spots).

Figure 19:
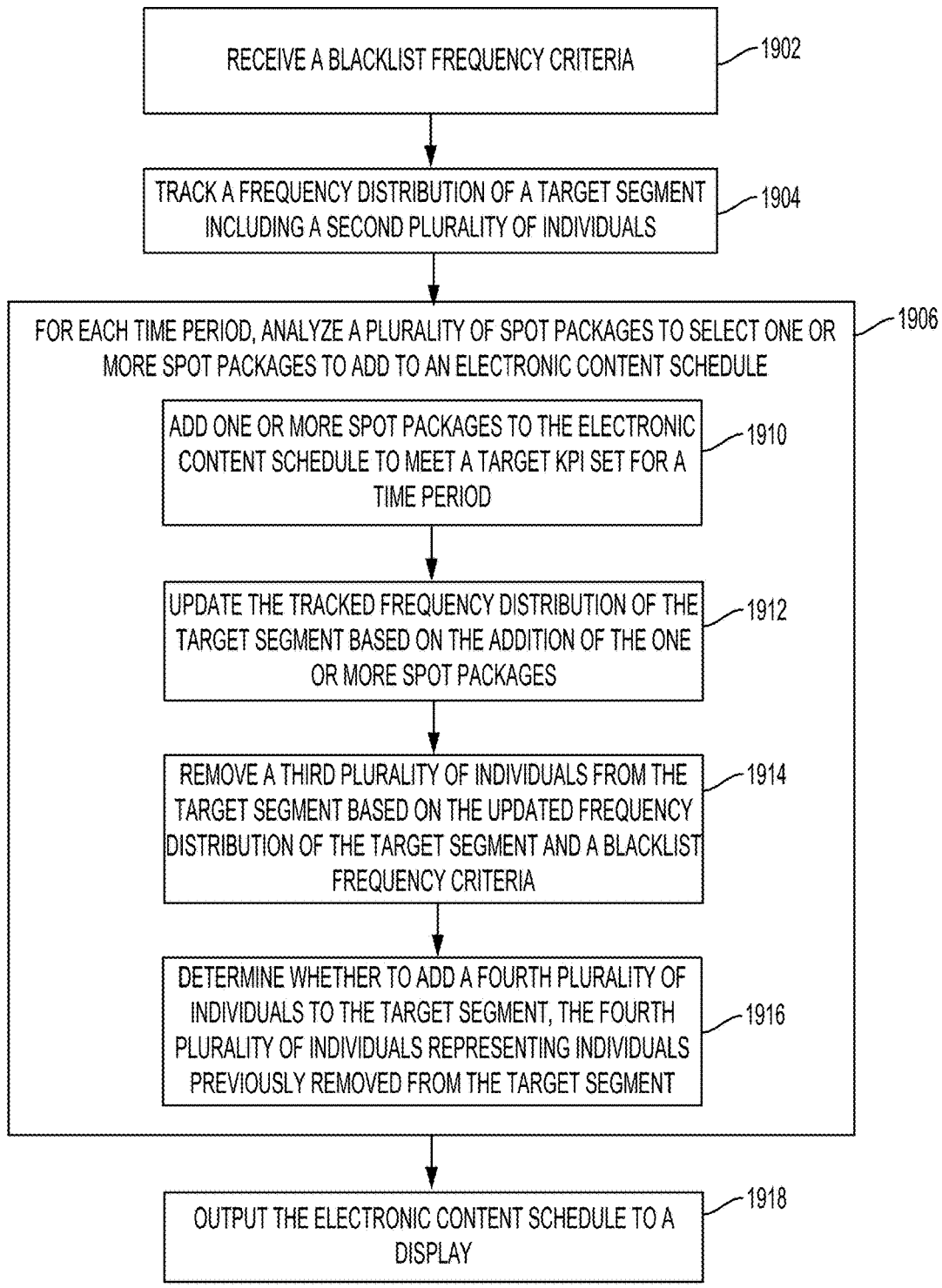
FIG. 19 is a flowchart of a method for generating an electronic content schedule based on blacklist frequency criteria, according to some embodiments.

FIG. 19 is a flowchart of a method 1900 for generating an electronic content schedule based on blacklist frequency criteria, according to some embodiments. In some embodiments, the blacklist frequency criteria include a frequency threshold to limit the frequency that content-of-interest is shown to TV viewers. In some embodiments, by considering the blacklist frequency criteria, the DMS can generate an electronic content schedule that reduces the overexposure of content-of-interest to one or more individuals in a target segment of individuals. In some embodiments, DMS 120 from FIG. 1 can perform method 1900. In some embodiments, method 1900 expands upon method 1700 described with respect to FIG. 17.

In some embodiments, similar to method 1700, the DMS may perform steps (not shown) that correspond to steps 1702-1707 described with respect to FIG. 17. In step 1902, the DMS receives blacklist frequency criteria, which may include a frequency threshold and a weight for the blacklist frequency criteria. In some embodiments, the blacklist frequency criteria may be one of the target KPIs received from the user in step 1704 of FIG. 17. In step 1904, the DMS tracks a frequency distribution of a target segment including a second plurality of individuals selected from a first plurality of individuals representing individuals in TV viewership data 1602. In some embodiments, the frequency distribution being tracked can be one of the tracked KPIs as described in step 1705 of FIG. 17.

In step 1906, for each time period, the DMS analyzes a plurality of spot packages to select one or more spot packages to add to an electronic content schedule. In some embodiments, the one or more spot packages may be stored as selected spot packages 1622 in electronic content schedule 1620. In some embodiments, the frequency distribution being tracked in step 1904 can be updated based on the one or more spot packages being selected and the frequency distribution can be stored in tracked KPIs for target segment 1624 of FIG. 16. In some embodiments, to perform step 1906, steps 1910-1916 can be performed for each time period.

In step 1910, the DMS adds one or more spot packages to the electronic content schedule to meet a target KPI set for a time period. In some embodiments, step 1910 corresponds to steps 1710-1722 as described with respect to FIG. 17.

In step 1912, the DMS updates the tracked frequency distribution of the target segment based on the addition of the one or more spot packages of step 1910. In some embodiments, the DMS can update the tracked frequency distribution by updating a frequency for each individual in the second plurality of individuals that make up the target segment.

In step 1914, the DMS removes a third plurality of individuals from the target segment based on the updated frequency distribution of the target segment and based on the blacklist frequency criteria input by the user. For example, the DMS may determine whether to remove an individual from the target segment based on whether a frequency being tracked for that individual exceeds a frequency threshold included in the blacklist frequency criteria. In some embodiments, the user can input the blacklist frequency criteria in GUI 1100, as described with respect to FIG. 11.

In step 1916, the DMS determines whether to add a fourth plurality of individuals to the target segment, the fourth plurality of individuals representing individuals previously removed from the target segment. In some embodiments, the third plurality of individuals removed in step 1914 can be removed for a predefined number of time periods (e.g., 1, 2, or 3 time periods). In these embodiments, the fourth plurality of individuals may include the third plurality of individuals after processing the predefined number of time periods. In some embodiments, by removing the third plurality of individuals from the target segment for a temporary period of time, the DMS does not consider these individuals when analyzing spot packages to add to the electronic content schedule in step 1910. Accordingly, the frequency for each individual in the third plurality of individuals can be reduced across the schedule period.

In step 1918, the DMS outputs the electronic content schedule to a display. In some embodiments, step 1918 corresponds to step 1724 as described with respect to FIG. 17.

Figure 20:
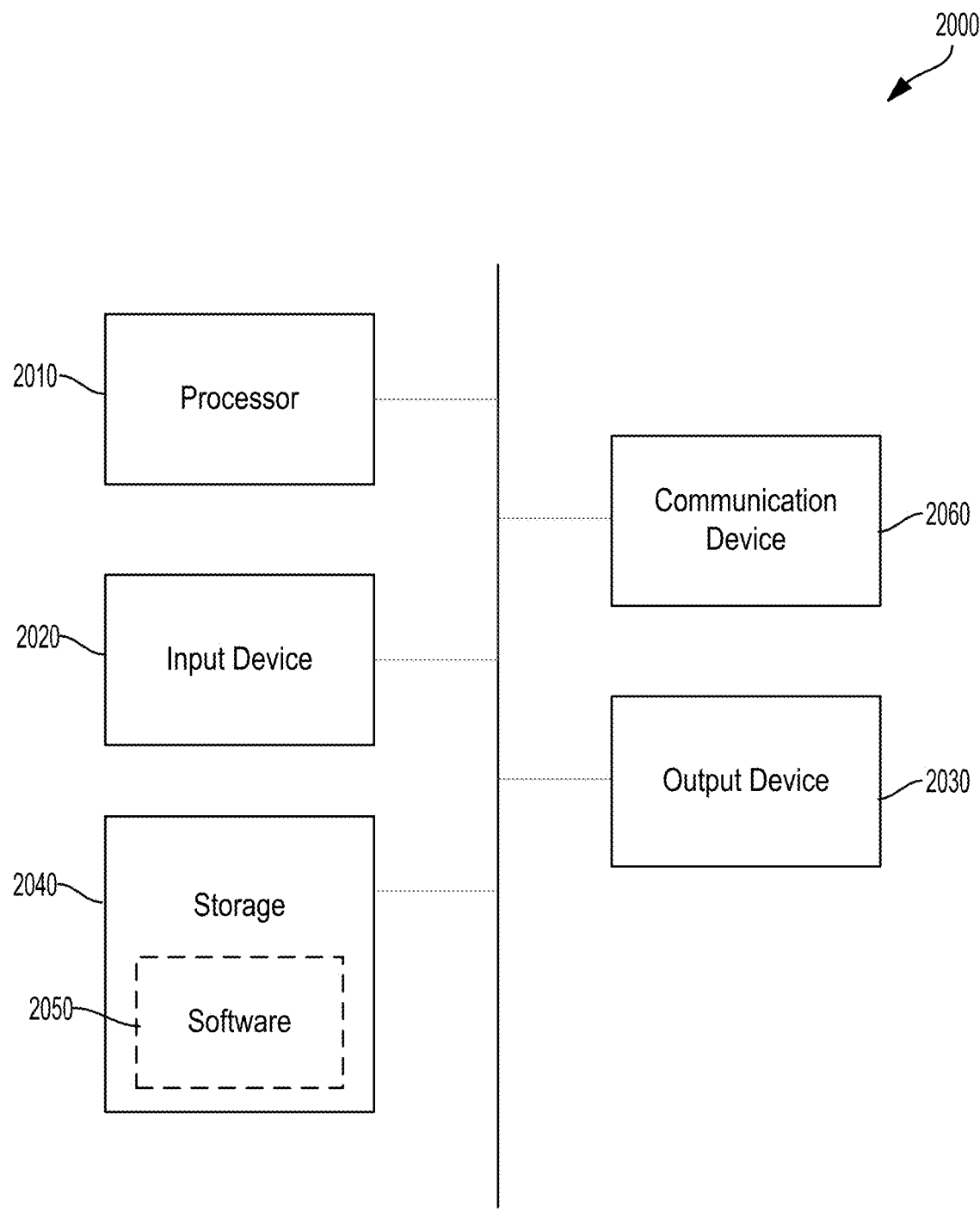
FIG. 20 is a functional block diagram of a computer in accordance with some embodiments.

FIG. 20 illustrates an example of a computer in accordance with one embodiment. Computer 2000 can be a component of a DMS for graphically displaying TV viewership data or generating an electronic content schedule according to the systems and methods described above, or can include the entire system itself. In some embodiments, computer 2000 is configured to execute methods 1500, 1700, 1800, and 1900 of FIGS. 15, 17, 18, and 19, respectively.

Computer 2000 can be a host computer connected to a network. Computer 2000 can be a client computer or a server. As shown in FIG. 20, computer 2000 can be any suitable type of microprocessor-based device, such as a personal computer, workstation, server, videogame console, or handheld computing device, such as a phone or tablet. The computer can include, for example, one or more of processor 2010, input device 2020, output device 2030, storage 2040, and communication device 2060. Input device 2020 and output device 2030 can generally correspond to those described above and can either be connectable or integrated with the computer.

Input device 2020 can be any suitable device that provides input, such as a touch screen or monitor, keyboard, mouse, or voice-recognition device. Output device 2030 can be any suitable device that provides output, such as a touch screen, monitor, printer, disk drive, or speaker.

Storage 2040 can be any suitable device that provides storage, such as an electrical, magnetic, or optical memory, including a RAM, cache, hard drive, CD-ROM drive, tape drive, or removable storage disk. Communication device 2060 can include any suitable device capable of transmitting and receiving signals over a network, such as a network interface chip or card. The components of the computer can be connected in any suitable manner, such as via a physical bus or wirelessly. Storage 2040 can be a non-transitory computer-readable storage medium comprising one or more programs, which, when executed by one or more processors, such as processor 2010, cause the one or more processors to execute methods described herein, such as methods 1500, 1700, 1800, and 1900 of FIGS. 15, 17, 18, and 19, respectively.

Software 2050, which can be stored in storage 2040 and executed by processor 2010, can include, for example, the programming that embodies the functionality of the present disclosure (e.g., as embodied in the systems, computers, servers, and/or devices as described above). In some embodiments, software 2050 can be implemented and executed on a combination of servers such as application servers and database servers.

Software 2050, or part thereof, can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 2040, that can contain or store programming for use by or in connection with an instruction execution system, apparatus, or device.

Software 2050 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 2000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 2000 can implement any operating system suitable for operating on the network. Software 2050 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description sets forth exemplary methods, parameters and the like. It should be recognized, however, that such description is not intended as a limitation on the scope of the present disclosure but is instead provided as a description of exemplary embodiments. The illustrative embodiments described above are not intended to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. In the foregoing description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the foregoing description uses terms first, second, etc. to describe various elements, these elements should not be limited by the terms. These terms are only used to distinguish one element from another. In addition, it is also to be understood that the singular forms "a," "an," and "the" used in the foregoing description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present disclosure also relates to a device for performing the operations herein. This device may be specially constructed for the required purposes, or it may include a general purpose computer selectively activated or reconfigured by a computer program stored in the computer. Such a computer program may be stored in a non-transitory, computer readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

What is claimed is:

1. A method implemented on a processor to generate an electronic content schedule, the method comprising:
   receiving one or more data files comprising television (TV) viewing data for a first plurality of individuals and descriptive data for the first plurality of individuals, the descriptive data comprising demographic and behavioral data for each individual;
   receiving, from a user, target audience criteria, target TV content, and criteria for key performance indicators (KPIs);
   tracking KPIs for a target segment including a second plurality of individuals selected from the first plurality of individuals based on matching the target audience criteria to the descriptive data;
   calculating spot watching probabilities for each individual in the target segment;
   generating a plurality of spot packages based on the target TV content;
   for each spot package in the plurality of spot packages:
      generating a probabilistic segment by statistically selecting a third plurality of individuals from the target segment based on the spot watching probabilities, and
      calculating a plurality of KPIs for the probabilistic segment;
   generating a plurality of scores corresponding to the plurality of spot packages based on the plurality of KPIs calculated for each spot package and based on the tracked KPIs for the target segment;
   generating a content schedule that includes a spot package selected from the plurality of spot packages based on the plurality of scores; and
   outputting the electronic content schedule to a display.

2. The method of claim 1, wherein the KPIs comprise a frequency distribution, a reach, gross impressions, a cost per thousand impressions (CPM), or a combination thereof.

3. The method of claim 1, wherein the spot package from the plurality of spot packages comprises a predefined number of spots in a plurality of spots, and wherein creating the probabilistic segment for the spot package comprises:
   generating a plurality of simulated segments, wherein each simulated segment is generated by:
      randomly selecting the predefined number of spots from the plurality of spots, and
      statistically selecting a fourth plurality of individuals from the target segment based on the spot watching probabilities;
   generating statistics for the plurality of simulated segments; and
   creating the probabilistic segment by selecting the third plurality of individuals to correspond to the statistics.

4. The method of claim 1, wherein the TV viewing data comprises minute-by-minute viewing behavior or second-by-second viewing behavior of each individual from the first plurality of individuals.

5. The method of claim 1, wherein the criteria for KPIs comprise weights corresponding to the KPIs, and wherein a weighted decision matrix is used to generate a score for the spot package.

6. The method of claim 1, wherein calculating the plurality of KPIs for each spot package comprises:
   calculating the plurality of KPIs based on one or more spot packages currently selected for the content schedule.

7. A system for generating an electronic content schedule, comprising:
   one or more processors;
   memory; and
   one or more programs, wherein the one or more programs are stored in the memory and configured to be executed by the one or more processors, the one or more programs including instructions for:
      receiving one or more data files comprising television (TV) viewing data for a first plurality of individuals and descriptive data for the first plurality of individuals, the descriptive data comprising demographic and behavioral data for each individual;
      receiving, from a user, target audience criteria, target TV content, and criteria for key performance indicators (KPIs);
      tracking KPIs for a target segment including a second plurality of individuals selected from the first plurality of individuals based on matching the target audience criteria to the descriptive data;
      calculating spot watching probabilities for each individual in the target segment;
      generating a plurality of spot packages based on the target TV content;
      for each spot package in the plurality of spot packages:
         generating a probabilistic segment by statistically selecting a third plurality of individuals from the target segment based on the spot watching probability, and
         calculating a plurality of KPIs for the probabilistic segment;
      generating a plurality of scores corresponding to the plurality of spot packages based on the plurality of KPIs calculated for each spot package and based on the tracked KPIs for the target segment;
      generating a content schedule that includes a spot package selected from the plurality of spot packages based on the plurality of scores; and
      outputting the electronic content schedule to a display.

8. The system of claim 7, wherein the KPIs comprise a frequency distribution, a reach, gross impressions, a cost per thousand impressions (CPM), or a combination thereof.

9. The system of claim 7, wherein the spot package from the plurality of spot packages comprises a predefined number of spots in a plurality of spots, and wherein to create the probabilistic segment for the spot package, the instructions comprise:
   generating a plurality of simulated segments, wherein each simulated segment is generated by:
      randomly selecting the predefined number of spots from the plurality of spots, and statistically selecting a fourth plurality of individuals from the target segment based on the spot watching probabilities;

generating statistics for the plurality of simulated segments; and creating the probabilistic segment by selecting the third plurality of individuals to correspond to the statistics.

10. The system of claim 7, wherein the TV viewing data comprises minute-by-minute viewing behavior or second-by-second viewing behavior of each individual from the first plurality of individuals.

11. The system of claim 7, wherein the criteria for KPIs comprise weights corresponding to the KPIs, and wherein a weighted decision matrix is used to generate a score for the spot package.

12. The system of claim 7, wherein to calculate the plurality of KPIs for each spot package, the instructions comprise:

calculating the plurality of KPIs based on one or more spot packages currently selected for the content schedule.

13. A non-transitory computer-readable storage medium comprising one or more programs for generating an electronic content schedule, wherein the one or more programs, when executed by one or more processors, cause the one or more processors to perform operations comprising:

receiving one or more data files comprising television (TV) viewing data for a first plurality of individuals and descriptive data for the first plurality of individuals, the descriptive data comprising demographic and behavioral data for each individual;

receiving, from a user, target audience criteria, target TV content, and criteria for key performance indicators (KPIs);

tracking KPIs for a target segment including a second plurality of individuals selected from the first plurality of individuals based on matching the target audience criteria to the descriptive data;

calculating spot watching probabilities for each individual in the target segment;

generating a plurality of spot packages based on the target TV content;

for each spot package in the plurality of spot packages:
generating a probabilistic segment by statistically selecting a third plurality of individuals from the target segment based on the sot watching probabilities, and calculating a plurality of KPIs for the probabilistic segment;

generating a plurality of scores corresponding to the plurality of spot packages based on the plurality of KPIs calculated for each spot package and based on the tracked KPIs for the target segment;

generating a content schedule that includes a spot package selected from the plurality of spot packages based on the plurality of scores; and outputting the electronic content schedule to a display.

14. The non-transitory computer-readable storage medium of claim 13, wherein the KPIs comprise a frequency distribution, a reach, gross impressions, a cost per thousand impressions (CPM), or a combination thereof.

15. The non-transitory computer-readable storage medium of claim 13, wherein the spot package from the plurality of spot packages comprises a predefined number of spots in a plurality of spots, and wherein to create the probabilistic segment for the spot package, the operations comprise:

generating a plurality of simulated segments, wherein each simulated segment is generated by:
randomly selecting the predefined number of spots from the plurality of spots,
statistically selecting a fourth plurality of individuals from the target segment based on the spot watching probabilities;

generating statistics for the plurality of simulated segments; and creating the probabilistic segment by selecting the third plurality of individuals to correspond to the statistics.

16. The non-transitory computer-readable storage medium of claim 13, wherein the TV viewing data comprises minute-by-minute viewing behavior or second-by-second viewing behavior of each individual from the first plurality of individuals.

17. The non-transitory computer-readable storage medium of claim 13, wherein the criteria for KPIs comprise weights corresponding to the KPIs, and wherein a weighted decision matrix is used to generate a score for the spot package.

18. The non-transitory computer-readable storage medium of claim 13, wherein to calculate the plurality of KPIs for each spot package, the operations comprise:

calculating the plurality of KPIs based on one or more spot packages currently selected for the content schedule.

* * * * *